United States Patent [19]

Ikeno

[11] Patent Number: 6,128,635
[45] Date of Patent: Oct. 3, 2000

[54] DOCUMENT DISPLAY SYSTEM AND ELECTRONIC DICTIONARY

[75] Inventor: Atsushi Ikeno, Tokyo, Japan

[73] Assignee: Oki Electric Industry Co., Ltd., Tokyo, Japan

[21] Appl. No.: 08/855,593

[22] Filed: May 13, 1997

[30] Foreign Application Priority Data

| May 13, 1996 | [JP] | Japan | 8-117415 |
| May 13, 1996 | [JP] | Japan | 8-117661 |
| May 14, 1996 | [JP] | Japan | 8-118766 |
| May 14, 1996 | [JP] | Japan | 8-118795 |

[51] Int. Cl.[7] ................................ G06F 17/24
[52] U.S. Cl. .................. 707/532; 707/501; 707/513
[58] Field of Search .................. 707/532, 501, 707/513

[56] References Cited

U.S. PATENT DOCUMENTS

| 5,359,514 | 10/1994 | Manthuruthil et al. | 364/419.11 |
| 5,475,586 | 12/1995 | Sata | 364/419.02 |
| 5,822,720 | 10/1998 | Bookman et al. | 704/3 |
| 5,930,787 | 7/1999 | Minakuchi et al. | 707/4 |
| 5,940,614 | 8/1999 | Allen et al. | 395/701 |
| 5,963,205 | 10/1999 | Sotomayor | 345/333 |
| 6,009,382 | 12/1999 | Martino et al. | 704/1 |
| 6,011,554 | 1/2000 | King et al. | 345/352 |

FOREIGN PATENT DOCUMENTS

| 0483576 | 5/1992 | European Pat. Off. . |
| 28240 | 2/1993 | Japan . |
| 325081 | 11/1994 | Japan . |

OTHER PUBLICATIONS

Mejis, Inferring grammar from lexis, Applications and Alternatives, IEE Colloquium, pp. 3/1–3/5, 1993.

WordPerfect 6.1 Screen Thesaurus Dumps, Nov. 4, 1994.

WordNet: a lexical database for English, Miller, G.A, Communications of the ACM, abstract, Nov. 1995.

A Hypertext Based Software–Engineering Environment, Cybulsky et al, IEEE software, p. 62–68, Mar. 1992.

"Implicit Reader Links in Online Information", IBM Technical Disclosure Bulletin, US, IBM Corp. New York, vol. 37, No. 3, Mar. 1, 1994 , pp. 511–512.

"Dictionary Access Method with Word Occurrence", IBM Technical Disclosure Bulletin, US, IBM Corp. New York, vol. 38, No. 8, Aug. 1995, pp. 365–366.

"Automatic Hypermedia Link Generation", IBM Technical Disclosure Bulletin, US, IBM Corp. New York, vol. 35, No. 1A, Jun. 1, 1992, pp. 447–448.

"The Art of Navigating", Communications of the Association for Computing Machinery, US, Jakob Nielsen Association for Computing Machinery New York, vol. 33, No. 3, Mar. 1, 1990, pp. 296–310.

*Primary Examiner*—Stephen S. Hong
*Assistant Examiner*—Cesar B. Paula
*Attorney, Agent, or Firm*—Wenderoth, Lind & Ponack, L.L.P.

[57] ABSTRACT

A document display system displays the contents of an electronic document. If the user requests dictionary access, the electronic document is modified by attaching invisible dictionary access information to words in the document. The modified document is then displayed, the words to which the dictionary access information is attached being visibly marked. If the user selects a word to which dictionary access information is attached, an electronic dictionary entry for the word is automatically retrieved and displayed.

42 Claims, 44 Drawing Sheets

```
[ BACK ] ( FORWARD ) ( RELOAD ) ( QUIT )
                            DICTIONARY MODE
We draw on vast storehouses of technological
expertise, from semiconductors to information
and communication systems, to provide a range
of products, from terminals to systems.
```

```
[ BACK ] ( FORWARD ) ( RELOAD ) ( QUIT )
                              ORDINARY MODE
We draw on vast storehouses of technological
expertise, from semiconductors to information
and communication systems, to provide a range
of products, from terminals to systems.
```

11   < A NAME = " storehouse" >
12 { storehouse
    n. (c) 1倉庫 2(知識などの)宝庫
13   < / A >

< A NAME = " storekeeper" >
storekeeper
n. (c) 1店主、小売商人 2倉庫管理人
< / A >

< A NAME = " storeroom" >
storeroom
n. (c) 1貯蔵室、物置き
< / A >

22
⤹ <A HREF = "/cgi-bin/into_the_dic"> DICTIONARY MODE </A>

21 { We draw on vast storehouses of technological
expertise, from semiconductors to information
⋮

FIG.6

32
⤹ <A HREF = "slogan"> ORDINARY MODE </A>

31 {
<A HREF = "tagED#we"> We </A>
<A HREF = "tagED#draw"> draw </A>
<A HREF = "tagED#on"> on </A>
<A HREF = "tagED#vast"> vast </A>
<A HREF = "tagED#storehouse"> storehouses </A>
⋮

FIG.8

\< A  HREF = "tagED#we" \> We  \< /A \>
\< A  HREF = "tagED#draw" \> draw  \< /A \>
\< A  HREF = "tagED#on" \> on  \< /A \>
\< A  HREF = "tagED#vast" \> vast  \< /A \>
\< A  HREF = "tagED#storehouse" \> storehouses  \< /A \>

\< A  HREF = "tagED#we" \> We  \< /A \>
\< A  HREF = "tagED#draw" \> draw  \< /A \>
\< A  HREF = "tagED#on" \> on  \< /A \>
 vast
\< A  HREF = "tagED#storehouse" \> storehouses  \< /A \>

\< A  NAME = "UNKNOWN_WORDS" \>
その単語は辞書にありません。
\< /A \>

FIG.11

\< A  HREF = "tagED#we" \> We  \< /A \>
\< A  HREF = "tagED#draw" \> draw  \< /A \>
\< A  HREF = "tagED#on" \> on  \< /A \>
\< A  HREF = "tagED#UNKNOWN_WORDS" \> vast  \< /A \>
\< A  HREF = "tagED#storehouse" \> storehouses  \< /A \>

⋮

⋮ storehouse
n. (c) 1倉庫 2 (知識などの)宝庫 ☐ storekeeper
n. (c) 1店主、小売商人 2 倉庫管理人 ☐ storeroom
n. (c) 1貯蔵室、物置き ☐

⋮

```
< A  HREF = "/dic/keep/we" >  We  </A>
< A  HREF = "/dic/keep/draw" >  draw  </A>
< A  HREF = "/dic/keep/on" >  on  </A>
< A  HREF = "/dic/keep/vast" >  vast  </A>
< A  HREF = "/dic/keep/storehouse" >  storehouses  </A>
                          ⋮
```

```
< A  HREF = "/dic/keep/we" >  We  </A>
< A  HREF = "/dic/keep/draw" >  draw  </A>
< A  HREF = "/dic/keep/on" >  on  </A>
 vast
< A  HREF = "/dic/keep/storehouse" >  storehouses  </A>
                    .
                    .
                    .
```

```
< A  HREF = "/cgi-bin/pick_dic?we" >  We  </A>
< A  HREF = "/cgi-bin/pick_dic?draw" >  draw  </A>
< A  HREF = "/cgi-bin/pick_dic?on" >  on  </A>
< A  HREF = "/cgi-bin/pick_dic?vast" >  vast  </A>
< A  HREF = "/cgi-bin/pick_dic?storehouse" >  storehouses  </A>
                       ⋮
```

```
< A  HREF = "/dic/keep/we" >  We  </A>
< A  HREF = "/cgi-bin/pick_dic?draw" >  draw  </A>
< A  HREF = "/dic/keep/on">on  </A>
< A  HREF = "/cgi-bin/pick_dic?vast" >  vast  </A>
< A  HREF = "/cgi-bin/pick_dic?storehouse" >  storehouses  </A>
                                ⋮
```

22
  <A HREF = "/cgi-bin/into_the_dic"> DICTIONARY MODE </A>

```
Corporate Glance <BR>

<DL>
<DD><A HREF = "message"> Message from the President </A>
<DD><A HREF = "slogan"> Global Slogan </A>
<DD><A HREF = "glance"> OKI Electric at a Glance </A>
<DL>
                                    .
                                    .
                                    .
```

FIG.48

35
<A HREF = " guidance"> ORDINARY MODE </A>

34
<A HREF = "/cgi-bin/look_up?corporate"> Corporate </A>
<A HREF = "/cgi-bin/look_up?guidance"> Guidance </A><BR>

<DL>
<DD>
<SELECT name = " select1 " onFocus = 'ref(message)' onChange = 'lookdic(option) >
<OPTION> message (dic)
<OPTION> from (dic)
<OPTION> the (dic)
<OPTION> President (dic)
<OPTION SELECTED> Message from the President
</SELECT>
<DD>

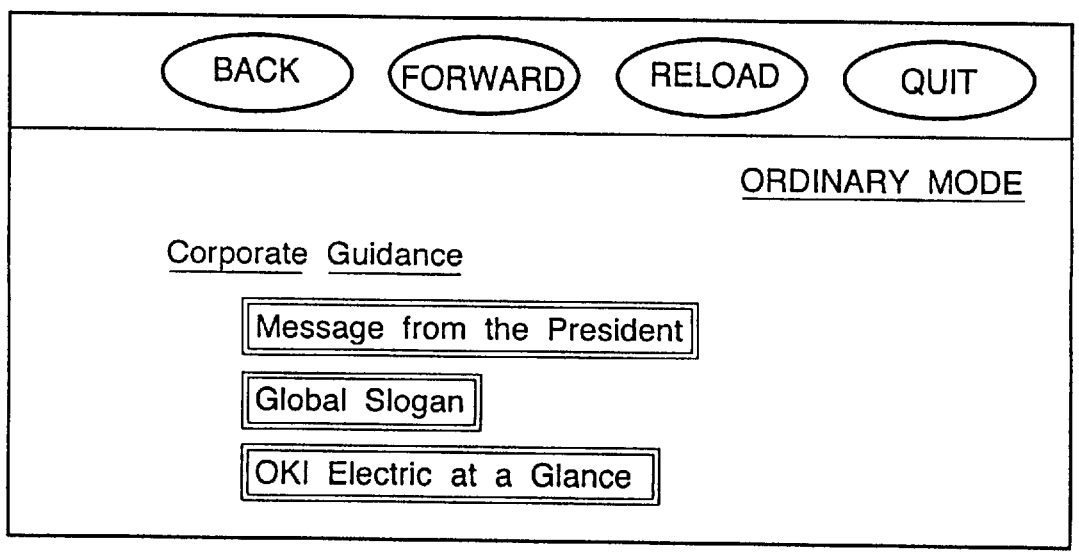

| WORD | LOOK-UP COUNT |
|---|---|
| we | 1 |
| draw | 3 |
| on | 1 |
| vast | 5 |
| storehouse | 10 |
| ⋮ | ⋮ |

< A  HREF = "slogan" > ORDINARY MODE < /A >

We
< A  HREF = "/cgi-bin/look_up?draw" > draw < /A >
on
< A  HREF = "/cgi-bin/look_up?vast" > vast < /A >
< A  HREF = "/cgi-bin/look_up?storehouse" > storehouses < /A >

⋮

```
< FONT = BLUE >
< A HREF = "/cgi-bin/look_up?we" > We < /A >
< /FONT >
< FONT = GREEN >
< A HREF = "/cgi-bin/look_up?draw" > draw < /A >
< /FONT >
< FONT = BLUE >
< A HREF = "/cgi-bin/look_up?on" > on < /A >
< /FONT >
< FONT = RED >
< A HREF = "/cgi-bin/look_up?vast" > vast < /A >
< /FONT >
< FONT = GREEN >
< A HREF = "/cgi-bin/look_up?storehouse" > storehouses < /A >
< /FONT >
          ⋮
```

DOCUMENT DISPLAY SYSTEM AND ELECTRONIC DICTIONARY

BACKGROUND OF THE INVENTION

The present invention relates to a document display system and an electronic dictionary, more particularly to a document display system that enables words in an electronic document to be looked up easily in an electronic dictionary.

Dictionaries have recently become available on media, such as disks, that make the dictionary entries accessible to a personal computer or other electronic device. To look up a word in such an electronic dictionary, the user types the word on a keyboard; the meaning of the word then appears on a display screen. Various types of electronic dictionaries are available, including dictionaries of foreign languages.

Among the users of electronic dictionaries are people who retrieve electronic documents from computer networks. The retrieval of such documents has recently been greatly facilitated by the emergence of hypertext. In a hypertext document, certain items (e.g. words) are marked as being linked to other documents, and the user can proceed from one document to another simply by selecting the indicated items with a pointing device. The linking of computer resources throughout the world into a so-called world-wide web, and the commercial availability of software that facilitates browsing through hypertext documents, have brought many users into contact with documents in many languages, and documents on many specialized subjects.

Electronic dictionaries can be an extremely useful aid to the comprehension of such documents, but unfortunately, the ease with which a person can proceed from one document to another is not matched by the ease with which the person can look up an unknown word in a document. Conventional systems that display hypertext documents are not designed for displaying entries in electronic dictionaries, so to find the meaning of a word, the user must access the electronic dictionary in the usual manner, by typing the word separately. When there are many words to be looked up, this can become an irksome and time-consuming process.

The problem could be solved by browsing software that incorporated an electronic dictionary internally, but it is not practical to equip browsing software with all the dictionaries that might be required by all potential users, nor is it reasonable to expect a person who purchases browsing software also to pay for a large number of electronic dictionaries, or even for one electronic dictionary. It is furthermore inefficient for each user to have to store a large number of dictionaries on his or her own computer.

SUMMARY OF THE INVENTION

An object of the present invention is accordingly to provide an easy way for the reader of an electronic document to look up words in that document in an electronic dictionary.

A further object is to provide an easy way for the reader of a hypertext document to look up words in that document in an electronic dictionary.

Another object is to indicate to the user which words can be advantageously be looked up.

The invented document display system displays the contents of an electronic document together with a control item enabling the user to request access to an electronic dictionary. If the user requests dictionary access, the electronic document is modified by attaching dictionary access information to character strings such as individual words in the document, and the modified document is displayed. If the user then selects a character string to which such dictionary access information is attached, an electronic dictionary entry defining or describing the character string is automatically retrieved and displayed. If there is no entry in the electronic dictionary for the selected character string, a message to that effect is displayed.

According to one aspect of the invention, the electronic dictionary is provided with hypertext link information making the entries in the dictionary individually accessible via hypertext links from other documents. In this aspect of the invention, the above-mentioned dictionary access information comprises hypertext links pointing to entries in the electronic dictionary.

According to another aspect of the invention, the electronic dictionary is not provided with such hypertext link information. When attaching the above-mentioned dictionary access information, the document display system also extracts the corresponding entries from the electronic dictionary and stores each extracted entry as a separate document, which can be retrieved via a hypertext link. The dictionary access information comprises hypertext links to these separate documents.

According to yet another aspect of the invention, the dictionary access information comprises dictionary look-up commands. When the user selects a character string to which dictionary access information is attached, the document display system receives and executes a command to look up a corresponding entry in the electronic dictionary. If the corresponding entry is found in the electronic dictionary, it is displayed to the user.

According to a further aspect of the invention, when attaching dictionary access information to an item which already has a hypertext link to another document, the document display system attaches information for generating a menu that allows the user to choose whether to retrieve the other document or look up character strings in the item. If the user selects the item, first the menu is displayed; then, if the user chooses to look up a character string in the item, the dictionary entry of the character string is displayed by one of the methods described above.

According to a still further aspect of the invention, the document display system keeps records indicating how frequently different character strings have been looked up in the past, or how frequently dictionary access information has been attached to different character strings and how frequently the different character strings have been looked up, and decides whether to attach dictionary access information to character strings on the basis of these records.

According to a yet further aspect of the invention, the document display system varies the way in which character strings in the modified electronic document are displayed, according to the above records, to help the user decide which character strings to look up.

BRIEF DESCRIPTION OF THE DRAWINGS

In the attached drawings:

FIG. 5 illustrates the addition of a dictionary mode button to a document;

FIG. 6 illustrates the addition of an ordinary mode button to another document;

FIG. 8 illustrates part of a result file output by the dictionary linker in the first embodiment;

FIG. 9 illustrates part of a result file output by the dictionary linker when a word cannot be found in the tagged electronic dictionary;

FIG. 10 illustrates an unknown-word entry provided in the tagged electronic dictionary as an alternate method of handling unknown words;

FIG. 11 illustrates an alternative result file output by the dictionary linker when a word cannot be found in the tagged electronic dictionary;

FIG. 48 illustrates part of a result file output by the dictionary linker and linked document server in the seventh embodiment;

FIG. 49 shows how this result file is displayed by the client device;

DETAILED DESCRIPTION OF THE INVENTION

Various embodiments of the invented display system will be described below with reference to the attached drawings.

First Embodiment

Figures 1, 2:
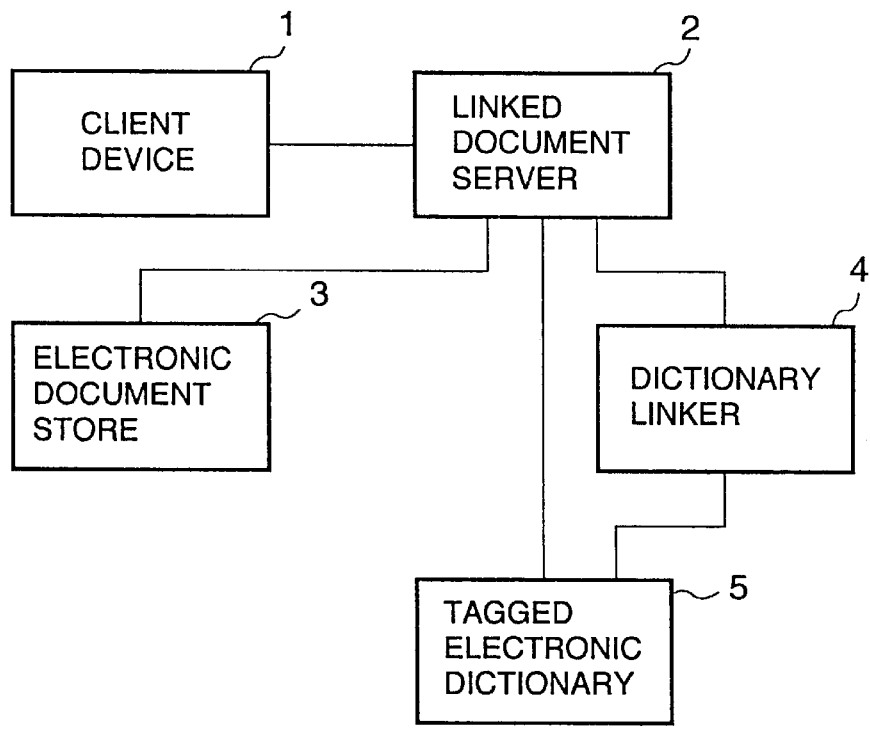
FIG. 1 is a block diagram of a first embodiment of the invented document display system.
FIG. 2 shows part of the contents of the tagged electronic dictionary in the first embodiment.

Referring to FIG. 1, the first embodiment comprises a client device 1, a linked document server 2, an electronic document store 3, a dictionary linker 4, and a tagged electronic dictionary 5, which are interconnected as shown. The client device 1, linked document server 2, and electronic document store 3 are facilities provided in conventional document display systems. The dictionary linker 4 and tagged electronic dictionary 5 are novel features of the present invention.

Although only one linked document server 2 is shown in the drawing, there may be a plurality of linked document servers 2 located at different sites, each with its own electronic document store 3, dictionary linker 4, and tagged electronic dictionary 5. Each linked document server 2 is accessible from the client device 1 through a communication channel, which may include part of a public telephone network. There may also be multiple client devices 1 disposed in different locations.

The client device 1 comprises, for example, a personal computer provided with a client program, such as a browsing program, that interacts with the linked document server 2, thereby enabling the user to enter commands that retrieve arid display documents stored in the electronic document store 3. The client device 1 also has a pointing device such as a so-called mouse, with which the user can select individual words, character strings, or other items in the displayed documents.

The client device 1 of course does not have to comprise a personal computer. Any device that enables the user to enter commands, display retrieved documents, and select character strings can serve as the client device 1.

The linked document server 2 comprises, for example, a workstation or computer system equipped with communication functions and software for retrieving electronic document files from the electronic document store 3 and sending these files to the client device 1, and for other functions that will be described below.

The electronic document store 3 comprises, for example, a magnetic or optical disk drive, which may be physically integrated with the linked document server 2, and which stores a plurality of electronic documents in the form of computer-accessible files.

The dictionary linker 4 comprises, for example, a program running on the same workstation or computer dictionary linker 4 as the linked document server 2. The function of the dictionary linker 4 in the first embodiment is to refer to the tagged electronic dictionary 5 and add hypertext links to a file provided by the linked document server 2 to the client device. The dictionary linker 4 is activated by the linked document server 2.

The tagged electronic dictionary 5 comprises, for example, a file stored on a magnetic or optical disk, or in the memory of the workstation or computer on which the linked document server 2 and dictionary linker 4 operate. The tagged electronic dictionary 5 differs from conventional electronic dictionaries in being provided with tags that can anchor links from hypertext documents. In the following description, it will be assumed that the tagged electronic dictionary 5 is an English-to-Japanese dictionary.

FIG. 2 shows an example of part of the contents of the tagged electronic dictionary 5. The first line in FIG. 2 is an opening tag 11 that anchors a dictionary entry named "storehouse." The next two lines constitute the heading and body of this entry 12, the word "storehouse" appearing as the heading, followed by a Japanese definition of the meaning of the word. The next line is a closing tag 13 indicating the end of the dictionary entry. These tags 11 and 13, incidentally, conform to a well-known hypertext markup language (HTML).

Although the dictionary linker 4 and tagged electronic dictionary 5 may reside in the same workstation or computer system as the linked document server 2 and electronic document store 3, this is not necessary. The dictionary linker 4 can reside in a separate computer system or a specialized system coupled to the system in which the linked document server 2 and electronic document store 3 reside. The dictionary linker 4 and tagged electronic dictionary 5 may also reside in an independent system that is coupled by telecommunication lines to the linked document server 2 and to other linked document servers, making the facilities of the dictionary linker 4 and tagged electronic dictionary 5 available to a plurality of server systems.

Next, the operation of the first embodiment will be described. In the description, the term "electronic document" wilt sometimes be shortened to "document." The term "hypertext document" will refer to an electronic document having embedded hypertext links pointing either to the tagged electronic dictionary 5 or to another document. The tagged electronic dictionary 5 will also be referred to as a hypertext document. Except for the tagged electronic dictionary 5, documents that do not contain embedded links pointing to other documents will not be described as hypertext documents, even though these documents may be the targets of links from hypertext documents.

Figure 3:
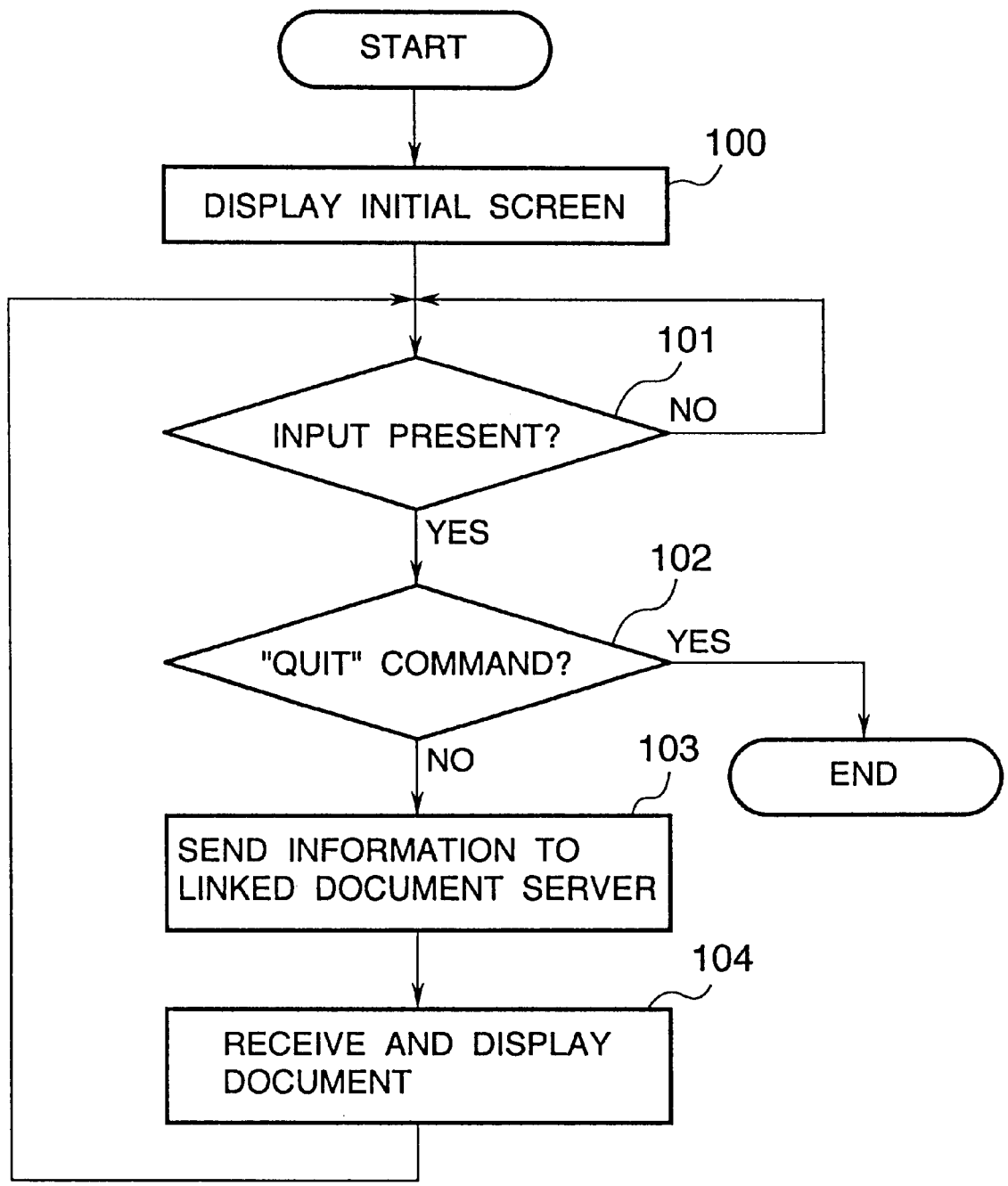
FIG. 3 is a flowchart illustrating the operation of the client device in the first embodiment.

First, the operation of the client device 1 will be described. Referring to FIG. 3, when the user accesses the document display system, the client device 1 first displays an initial input screen (step 100), then waits for input from the user (step 101). The input may be a file descriptor requesting an electronic document, or a command such as "Quit." If the "Quit" command is given, access to the document display system is terminated (step 102). File descriptors and commands other than "Quit" generally cause the client device 1 to send information to the linked document server (step 103). The linked document server 2 generally responds by sending back an electronic document, which the client device 1 receives and displays (step 104). After step 104, the process returns to step 101 to wait for further input: for example, for the user to request a further document linked to the document now on display.

Although the user may give various commands other than "Quit," it will be assumed in the first embodiment that the information sent to the linked document server 2 is always either a file descriptor or one particular command, specifically, a tag attachment command. Details will be given later.

Next, the operation of the linked document server 2 will be described. The linked document server 2 repeatedly executes the process shown in FIG. 4. The process starts with the reception of information from the client device 1

(step 200). The linked document server 2 identifies the information as a file descriptor or tag attachment command (step 201). If the information is a file descriptor, the linked document server 2 reads the requested document from the electronic document store 3 (step 202). If the information is a tag attachment command, the linked document server 2 activates the dictionary linker 4 (step 203), at the same time providing the dictionary linker 4 with a copy of the document currently being displayed by the client device 1.

If the information received in step 200 is a file descriptor, after obtaining the document in step 202, the linked document server 2 decides whether the document is a hypertext document (step 204). If the document is not a hypertext document, the linked document server 2 adds a dictionary-mode control item, referred to below as a dictionary mode button, to the document (step 205), then sends the document to the client device 1 (step 206). If the document is a hypertext document, the linked document server 2 sends the document to the client device 1 (step 206) without adding a dictionary mode button.

If the information received in step 200 is a tag attachment command, the dictionary linker 4 activated in step 203 modifies the provided document by adding dictionary access information. The dictionary access information comprises tags which will be described later. The linked document server 2 then adds an ordinary-mode control item, referred to below as an ordinary mode button, to the resulting modified document (step 207), and sends the document to the client device 1 (step 206).

The dictionary mode button and ordinary mode button are items that the user can select with the pointing device to switch between a dictionary-access mode and an ordinary mode, at the user's own convenience. These control items can be added to the document in various ways, one of which is illustrated in FIG. 5, which shows part of a document 21 that begins with the words "We draw on vast storehouses . . . ." To add a dictionary mode button to this document, the linked document server 2 adds a line 21 containing the command "/cgi-bin/into_the_dic" in a hypertext reference (HREF) tag, followed by the words "Dictionary mode," then a closing tag (</A>). The user sees the words "Dictionary mode." When the user selects these words, the client device 1 sends the character string "/cgi-bin/into_the_dic" to the linked document server 2, "/cgi-bin/into_the_dic" being the tag attachment command mentioned above.

FIG. 6 illustrates the similar addition of an ordinary mode button to a modified document output by the dictionary linker 4. Although the body 31 of the document has much embedded dictionary access information, the body 31 is displayed in nearly the same way as the body of the document in FIG. 5, as will be shown later. The linked document server 2 adds a line 32 in which the hypertext reference "slogan" is the file descriptor of the document in FIG. 5, which was on display at the elient device 1 when the dictionary linker 4 was activated. The user can select the words "Ordinary mode" in line 32 with the pointing device, causing the client device 1 to send the file descriptor "slogan" to the linked document server 2.

Figure 7:
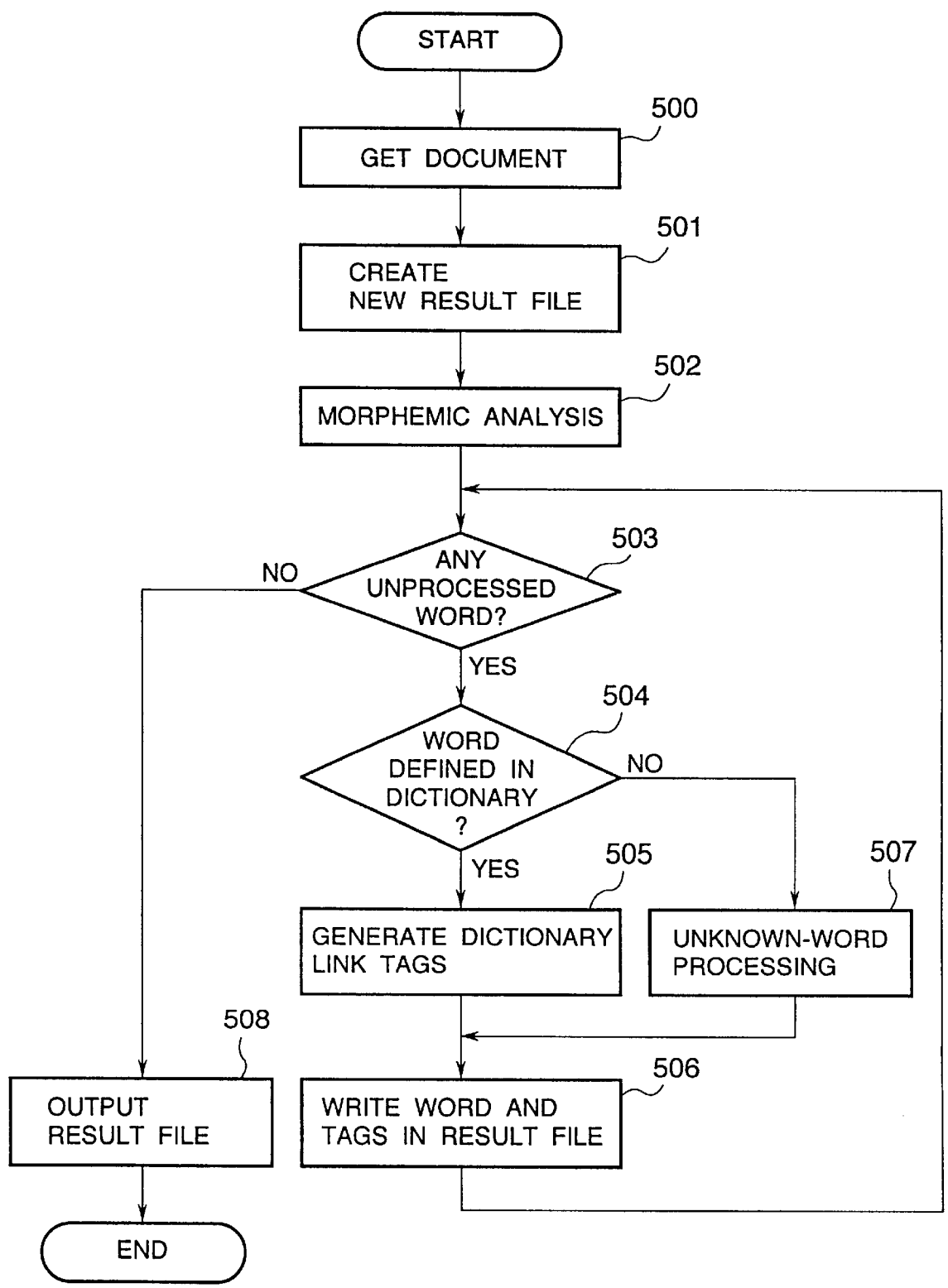
FIG. 7 is a flowchart illustrating the operation of the dictionary linker in the first embodiment.

Next, the operation of the dictionary linker 4 will be described. Referring to FIG. 7, the dictionary linker 4 begins by receiving from the linked document server 3 a copy of the document currently on display at the client device 1, or (equivalently) receives permission to read this document from the electronic document store 3 (step 500). Next, the dictionary linker 4 creates a result file (step 501). The result file is created as a new file, and is initially empty.

The dictionary linker 4 now performs a morphemic analysis of the document obtained in step 500. By means of this analysis, the dictionary linker 4 identifies the words appearing in the document, and the dictionary forms of these words. If the word "storehouses" appears, for example, the dictionary linker 4 identifies "storehouse" as the dictionary form.

The subsequent steps from step 503 to step 507 form a loop that is repeated as long as any unprocessed word remains in the document, each repetition adding one line to the result file. Step 503 is a loop control step in which the dictionary linker 4 determines whether any unprocessed word remains. When no unprocessed word remains, the result file is output to the linked document server 2 as the modified document mentioned above (step 508).

When an unprocessed word is found in step 503, the dictionary linker 4 looks for a definition of the word (i.e. for an entry headed by the dictionary form of the word) in the tagged electronic dictionary 5 (step 504). If the definition is found, the dictionary linker 4 generates dictionary access information comprising tags establishing a link from the word to the dictionary entry defining the word (step 505), writes these tags and the word itself in the result file (step 506), and returns to step 503 to process the next word. If the word is not defined in the tagged electronic dictionary 5, the dictionary linker 4 carries out appropriate unknown-word processing (step 506), two examples of which will be given later. The dictionary linker 4 then writes the unknown word in the result file, together with any tags that may have been generated by the unknown-word processing (step 506), and returns to step 503.

FIG. 8 shows the first five lines of the result file output by the dictionary linker 4 for a document beginning with "We draw on vast storehouses . . . " when all five of these words are defined in the tagged electronic dictionary 5. Each line begins with an opening tag such as <A HREF= "tagED#we">, which is a hypertext reference to the entry for the word "we" in the tagged electronic dictionary 5. This is followed by the word as it appeared in the document (e.g. "We"), then a closing tag (</A>).

FIG. 9 illustrates one possible type of unknown-word processing, taking as an example the case in which the word "vast" is not defined in the tagged electronic dictionary 5. The unknown-word processing in this example consists of doing nothing at all; the dictionary linker 4 writes "vast" in the result file without any opening or closing tags. If this type of unknown-word processing is adopted, step 507 in FIG. 7 is a no-operation step, and can be omitted.

FIGS. 10 and 11 show an example of another possible type of unknown-word processing. Tn this example, the tagged electronic dictionary 5 has a special entry for unknown words, shown in FIG. 10. The body of this entry is a Japanese sentence, read as "Sono tango wa jisho ni arimasen," meaning "That word is not in the dictionary." When the dictionary linker 4 cannot find a word (e.g. "vast") in the tagged electronic dictionary 5, tags linking that word to this special unknown-word entry are generated and written in the result file around the unknown word, as illustrated in the fourth line in FIG. 11.

The result file created by the dictionary linker 4 is a temporary file. After the result file has been output to the linked document server 2 and transferred to the client device 1, the linked document server 2 may delete this file from the memory of the computer system or workstation in which the linked document server 2 resides, so that a copy of the result file remains only at the client device 1. Similarly, if the linked document server 2 and dictionary linker 4 reside in different systems, the dictionary linker 4 may delete the result file from the memory of its own system after the result file has been transferred to the system of the linked document server 2.

Next, the overall operation of the first embodiment will be described, with reference to FIGS. 12 to 18. Three cases of dictionary access will be illustrated: one in which there are no unknown words; another in which an unknown word is processed as in FIG. 9; and another in which an unknown word is processed as in FIGS. 10 and 11.

When first activated by the user, the client device 1 sends certain initial information to the linked document server 2. The linked document server 2 responds by sending back the contents of an initial screen like the one in FIG. 12, which the client device 1 displays. At the top of this screen are four buttons marked "Back," "Forward," "Reload," and "Quit." By selecting the "Quit" button with a pointing device, the user enters the "Quit" command described above. When the "Reload" button is selected, the client device 1 sends the linked document server 2 the file descriptor of the document currently on display, causing the linked document server 2 to send the document again. The "Forward" and "Back" buttons move forward and backward in a series of documents that the user has accessed by means of hypertext links. These four buttons are displayed at the top of all screens in the first embodiment.

Below these buttons, the initial screen has a line on which the user can enter the file descriptor of a desired document. The client device 1 sends the entered file descriptor to the linked document server 2, which sends back the requested document file.

Figure 13:
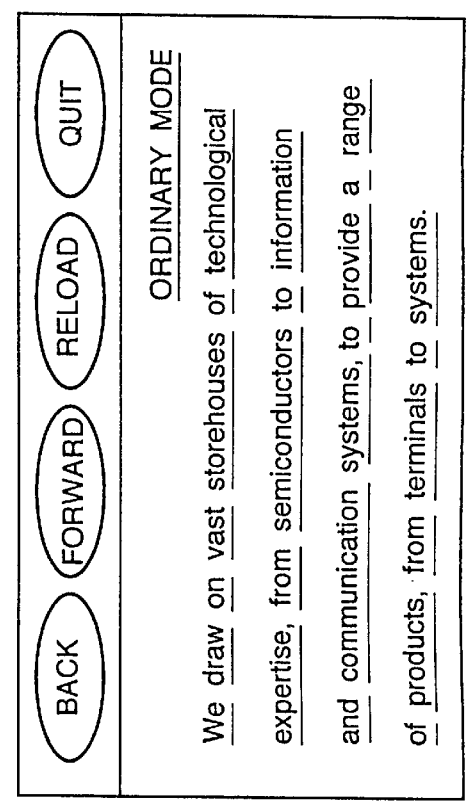
FIG. 13 illustrates a document retrieved from the display in FIG. 12.

In FIG. 13, the user has entered the file descriptor of a hypertext document entitled "Corporate Guidance," which the linked document server 2 has retrieved from the electronic document store 3 and sent to the client device 1, and which is now displayed on the screen of the client device 1. The three lines below the title are hypertext links, and are marked as such with underlines. Since this document is a hypertext document, no dictionary mode button is attached or displayed.

Figure 14:
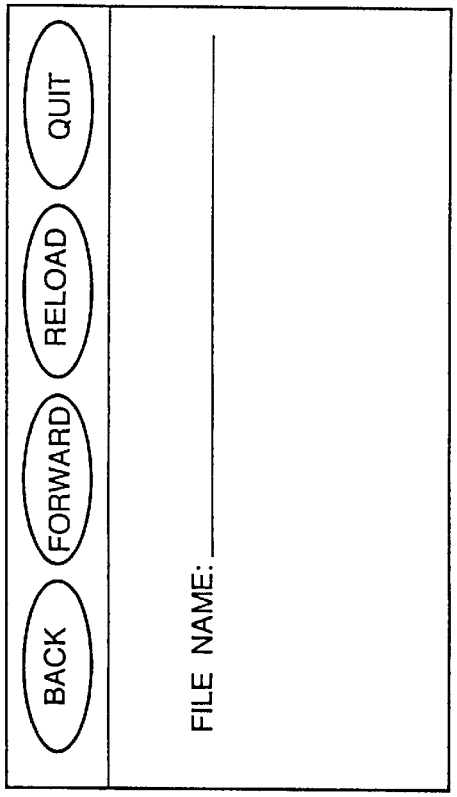
FIG. 14 illustrates a further document retrieved by a hypertext link from the document in FIG. 13.

If the user selects, for example, the "Global Slogan" line with the pointing device, the client device 1 sends the linked document server 2 the file descriptor of a further document. This file descriptor is contained in a hypertext reference tag that precedes the "Global Slogan" line but is not visible to the user. The linked document server 2 retrieves the specified further document from the electronic document store 3 and sends the document back to the client device 1. The client device 1 displays this document as shown in FIG. 14. This document has no links to further documents, so it is not a hypertext document in the sense in which the term is being used herein, and the linked document server 2 attaches a dictionary mode button.

Figure 12:
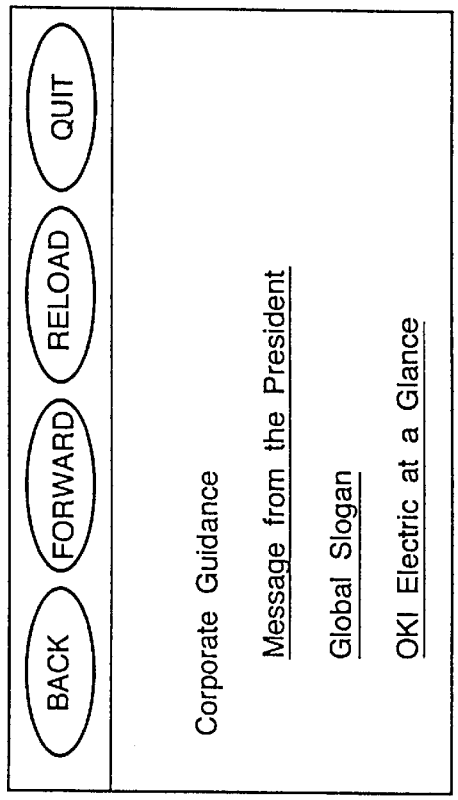
FIG. 12 illustrates an initial document retrieval display.

Incidentally, the user could also retrieve the "Global Slogan" document directly, by entering the file descriptor of this document on the initial screen in FIG. 12, instead of first retrieving the "Corporate Guidance" document.

The operations so far have been carried out in the ordinary mode. If the user selects the dictionary mode button with the pointing device, the client device 1 sends the linked document server 2 the tag attachment command ("/cgi-bin/into_ the_dic") contained in the tag preceding the words "Dictionary mode." The linked document server 2 executes this command, thereby activating the dictionary linker 4.

The dictionary linker 4 has the linked document server 2 retrieve the "Global Slogan" document from the electronic document store 3 again, looks up the words in this document in the tagged electronic dictionary 5, and attaches tags to create a result file as was partially shown, for example, in FIG. 8. When the dictionary linker 4 has looked up all words and completed the result file, the linked document server 2 adds an ordinary mode button to the result file, and sends the resulting modified document to the client device 1. The tag preceding the ordinary mode button contains the file descriptor of the "Global Slogan" document, shown as the word "slogan" in the first line 32 of FIG. 6.

Figure 15:
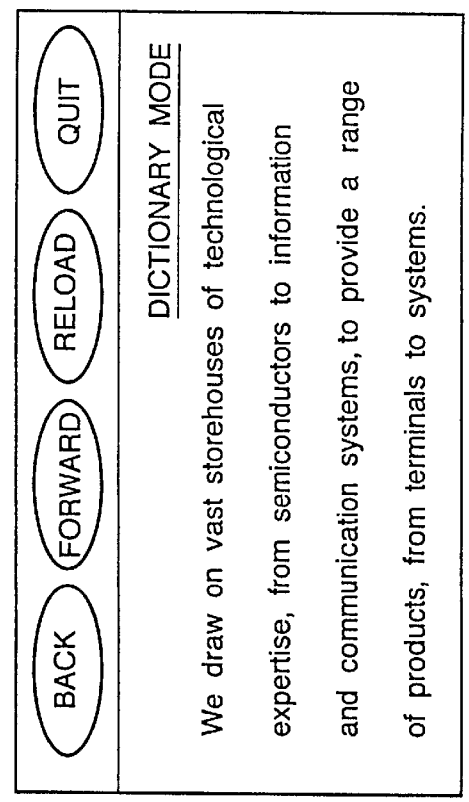
FIG. 15 illustrates the document in FIG. 14 displayed in dictionary-access mode.

If all words in the "Global Slogan" document are defined in the tagged electronic dictionary 5, the user now sees the display shown in FIG. 15. Each word in the document is underlined, the underlines indicating the presence of hypertext links to the tagged electronic dictionary 5 that were added by the dictionary linker 4.

To find the Japanese meaning of, for example, the word "storehouses," the user selects this word with the pointing device. The client device 1 sends the information "tagED#storehouse" contained in the tag attached to this word to the linked document server 2. The linked document server 2 accesses the tagged electronic dictionary 5 at the entry indicated by this information, and sends that entry, together with a certain number of preceding and following entries, back to the client device 1. The client device 1 then displays the screen depicted in FIG. 16, which gives Japanese definitions for "storehouse" and other words. If he wants to, the user can scroll this screen up or down to display the Japanese meanings of other words in alphabetical sequence with "storehouse."

Figure 16:
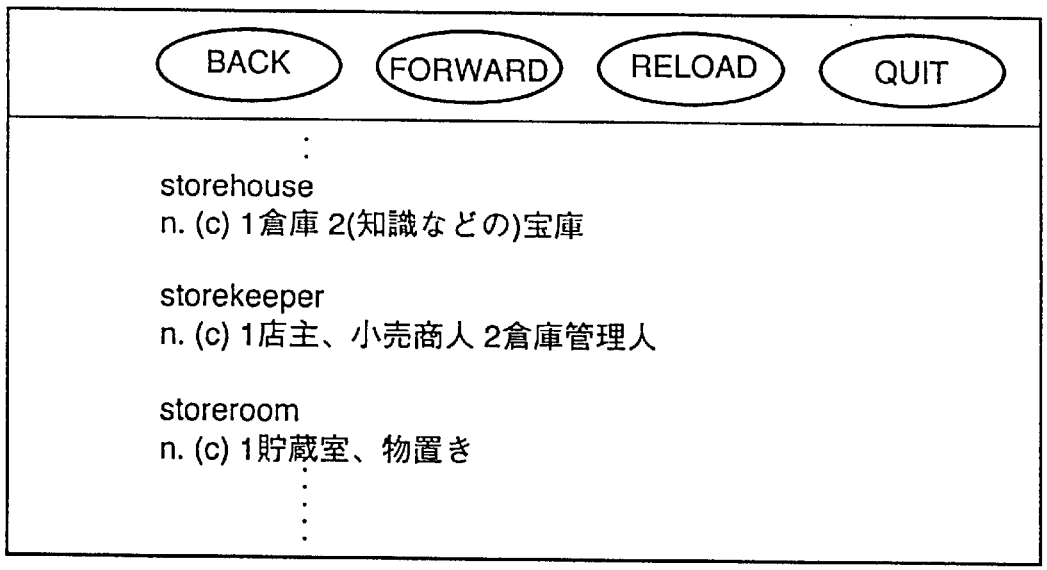
FIG. 16 shows an example of information displayed when dictionary access is performed from the display in FIG. 15.

To return from this display of dictionary meanings to the modified document display, the user selects the "Back" button in FIG. 16. The client device 1 then displays the screen shown in FIG. 15 again, enabling the user to took up other words in the same way that "storehouses" was looked up, by selecting the desired word with the pointing device.

When the user has finished looking up words, he can select the ordinary mode button in FIG. 15 to have the "Global Slogan" document displayed again in the ordinary mode, as shown in FIG. 14. If the client device 1 retains a copy of this document, the client device 1 displays the retained copy; otherwise, the client device 1 sends the file descriptor of the "Global Slogan" document to the linked document server 2 again, receives the unmodified "Global Slogan" document again from the linked document server 2, and displays the received document.

Next, examples in which unknown words appear in the document in FIG. 15 will be shown.

Figure 17:
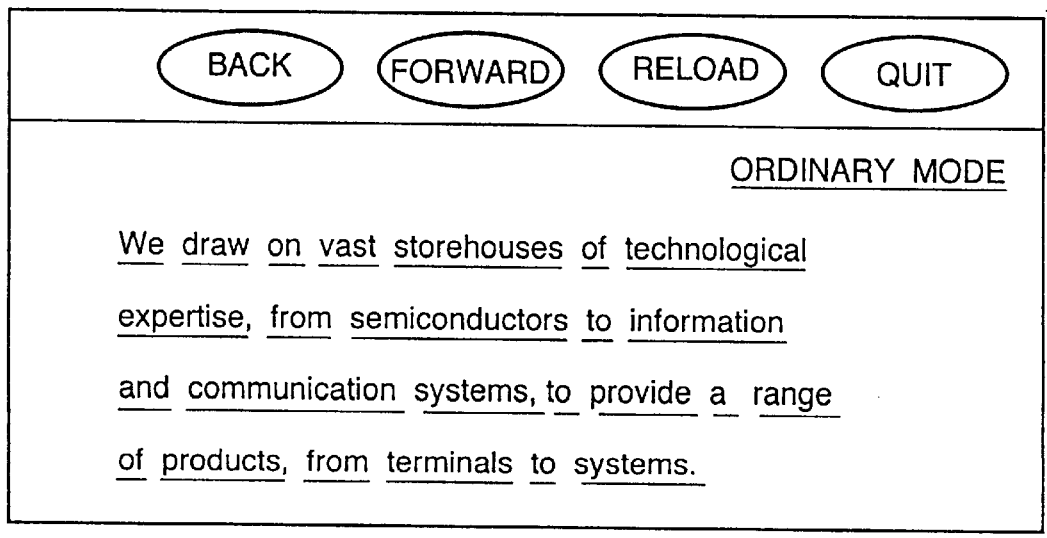
FIG. 17 shows a display obtained from the result file in FIG. 9, illustrating one method of handling unknown words.
Figure 18:
FIG. 18 shows a message displayed when the alternative method of handling unknown words is employed.

If the word "vast" is not defined in the tagged electronic dictionary 5, and the dictionary linker 4 adopts the method shown in FIG. 9 of dealing with unknown words, then when the user selects the dictionary-access mode, instead of the display in FIG. 15, he sees the display in FIG. 17, in which "vast" is not underlined. If the user selects "vast" with the pointing device, nothing happens, because this word has no dictionary access information attached. This method of processing unknown words has the advantage of indicating to the user which words are and which words are not defined in the tagged electronic dictionary 5, so that the user need riot waste time in attempting to look up words that are not defined.

If the method illustrated in FIGS. 10 and 11 of dealing with unknown words is adopted, then even if "vast" is not defined in the tagged electronic dictionary 5, after selecting the dictionary mode button, the user sees the display shown FIG. 15. If the user tries to look up the word "vast," the client device 1 sends the information "tagED#UNKNOWN WORDS" to the linked document server 2, which accordingly accesses the special unknown-word entry in the tagged electronic dictionary 5. As a result, the user sees the screen displayed in FIG. 18, with a Japanese message meaning "That word is not in the dictionary." This method has the advantage of explaining to the user why the word cannot be looked up. The user can use the "Back" button to return from this screen to the display in FIG. 15.

When a user follows a series of hypertext links to a document written in a foreign language, the first embodiment assists the user in reading the document in a natural and intuitive way: to look up words, the user points to the words "Dictionary mode," then simply points to the words to be looked up. The user does riot have to learn any special operations or do any extra typing.

The first embodiment is efficient in that it displays only the definitions the user wants to see, and does not attempt to display the meaning of every word in a document, or translate the entire document. The amount of information transferred between the client device 1 and linked document server 2 can thus be held to a minimum, and needless delays can be avoided. If the tagged electronic dictionary 5 is stored in a semiconductor memory, or is loaded from a disk memory into a semiconductor memory when the linked document server 2 is started up, the tagged electronic dictionary 5 can be accessed by means of internal memory pointers, enabling the user to obtain definitions very quickly.

The first embodiment is also efficient in that it enables dictionary definitions to be accessed without requiring tags with links to dictionary entries to be embedded in the documents stored in the electronic document store 3. Thus users who do not need to use the dictionary will not be distracted by unnecessary underlines in the documents they are reading.

Since the tagged electronic dictionary 5 is located at the site of the linked document server 2, it is not necessary for each user to purchase his own copy of the tagged electronic dictionary 5. Moreover, this site can be provided with a large number of tagged electronic dictionaries of different types, in different languages, for example, and the system can be adapted to provide the user with a choice of dictionaries.

In this case a third type of unknown-word processing is available. If a word is not found in one dictionary, the dictionary linker 4 can link the word to a menu screen offering the user a selection of other dictionaries in which the user might wish to try to look up the word, this screen being provided with links to commands that access the other dictionaries. This menu screen can be built into the tagged electronic dictionary 5, so that both known words and unknown words are initially processed in the same way: by displaying a page from the tagged electronic dictionary 5. The system can then be expanded by adding dictionary-access commands, without having to modify the basic operations of the linked document server 2 and dictionary linker 4.

Second Embodiment

The second embodiment differs from the first embodiment in that the result files generated by the dictionary linker 4 are saved for possible future use.

Figure 19:
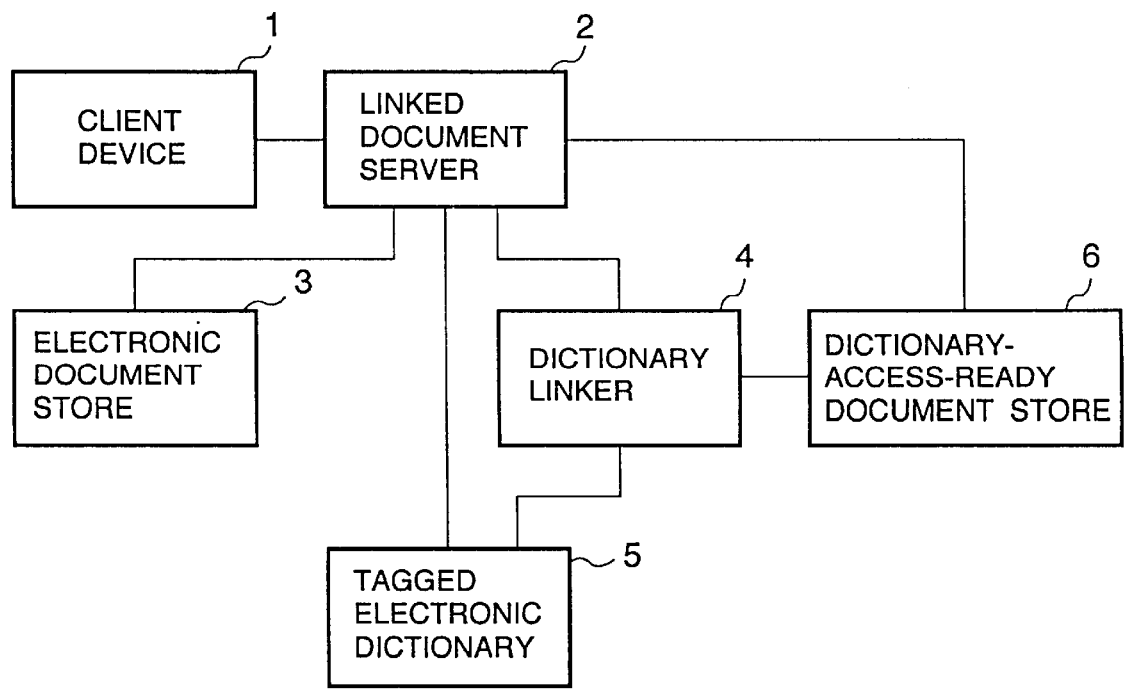
FIG. 19 is a block diagram of a second embodiment of the invented document display system.

Referring to FIG. 19, the second embodiment has the same client device 1, linked document server 2, electronic document store 3, dictionary linker 4, and tagged electronic dictionary 5 as the first embodiment, arid an additional dictionary-access-ready document store 6, which stores the result files generated by the dictionary linker 4. The dictionary-access-ready document store 6 is, for example, a magnetic or optical memory device coupled to the linked document server 2 and dictionary linker 4. This device may be an independent device such as an external disk drive. Alternatively, the (dictionary-access-ready document store 6 may be incorporated into the workstation or computer system in which the linked document server 2 resides, or the system in which the dictionary linker 4 resides, or the system in which both the linked document server 2 and dictionary linker 4 reside.

Next, the operation of the second embodiment will be described.

Figure 4:
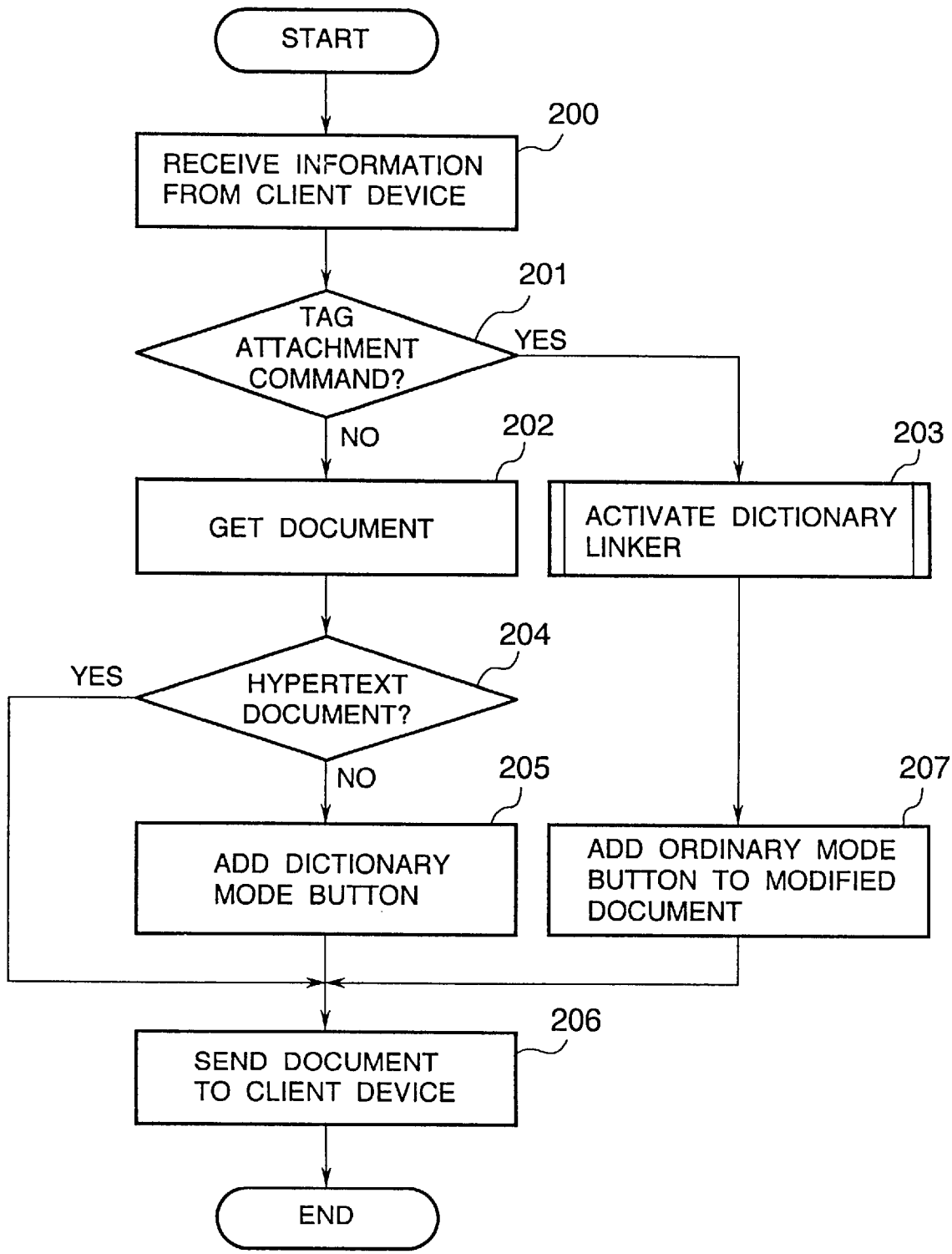
FIG. 4 is a flowchart illustrating the operation of the linked document server in the first embodiment.

The linked document server 2 operates as in the first embodiment, following the flowchart in FIG. 4, except that under certain conditions, the modified document (result file) to which an ordinary mode button is added in step 207 is obtained from the dictionary-access-ready document store 6 instead of from the dictionary linker 4.

Figure 20:
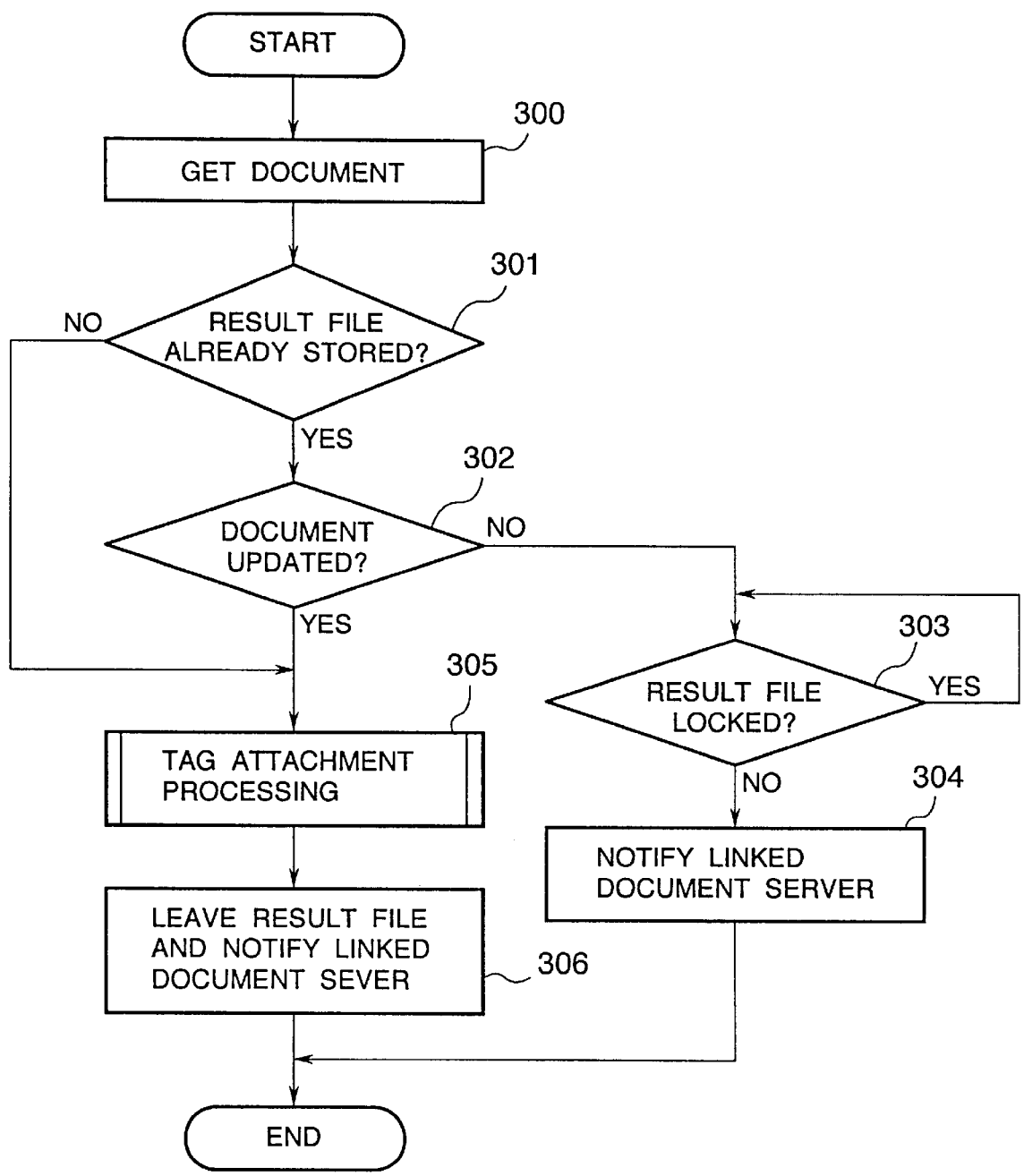
FIG. 20 is a flowchart illustrating the operation of the dictionary linker in the second embodiment.
Figure 21:
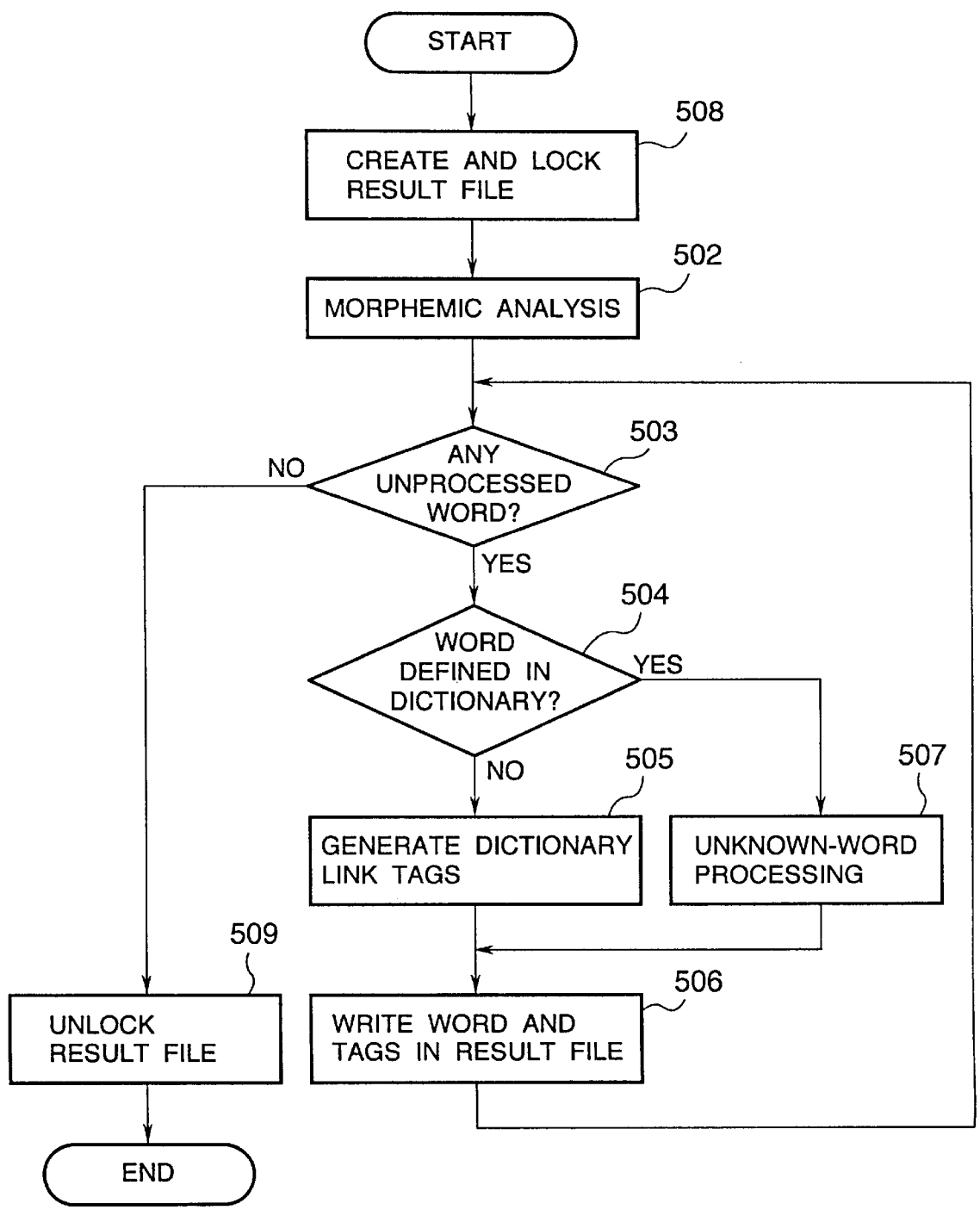
FIG. 21 is a flowchart illustrating the tag attachment step in FIG. 20.

The operation of the dictionary linker 4 differs from the first embodiment, and is illustrated in FIGS. 20 and 21. Referring to FIG. 20, when activated, the FIG. 4 begins by obtaining a copy of the unmodified document currently on display at the client device 1 (step 300). This step is the same as step 500 in FIG. 7.

Next, the dictionary linker 4 searches the directory of the dictionary-access-ready document store 6 to see if the dictionary-access-ready document store 6 already contains a result file for this document (step 301). If it does, the dictionary linker 4 compares the time stamp on the unmodified document with the time stamp on the result file to determine whether the document stored in the electronic document store 3 has been updated since the result file in the dictionary-access-ready document store 6 was created (step 302).

If the document in the electronic document store 3 has not been updated since the result file in the dictionary-access-ready document store 6 was created, the dictionary linker 4 checks whether the result file in the dictionary-access-ready document store 6 is locked (step 303). The locked state occurs if the result file is currently being tagged in response to a request from a different client device. The check in step 303 is repeated until the document is found not to be locked, at which time the dictionary linker 4 notifies the linked document server 2 (step 304), and the linked document server 2 transfers the result file from the dictionary-access-ready document store 6 to the client device 1.

If there is no corresponding result file in the dictionary-access-ready document store 6, giving a negative result in step 301, or if the result file is present in the dictionary-access-ready document store 6 but the original document in the electronic document store 3 has been updated, giving an affirmative result in step 302, the dictionary linker 4 creates a new result file with dictionary access information (step 305), then leaves this new result file in the dictionary-access-ready document store 6 and notifies the linked document server 2 that the result file is ready (step 306). If an old result file for the same document was present in the dictionary-access-ready document store 6, the new result file replaces the old result file.

FIG. 21 illustrates the result file creation step 305 in FIG. 20. The dictionary linker 4 begins by creating and locking the new result file (step 508). The locking and unlocking of the result file can be carried out by, for example, manipulating an access permission bit in the directory information of the result file. When the new result file is created, the old result file, if present, is deleted. The same steps 502, 503, 504, 505, 506, and 507 as described in the first embodiment (FIG. 7) are then carried out to write words and tags into the result file. When no unprocessed words remain, giving a negative result in step 503, the dictionary linker 4 unlocks the result file (step 509), making it available to the linked document server 2.

From the user's point of view, the operation of the second embodiment is identical to the operation of the first embodiment, except that dictionary access is often faster. More precisely, when dictionary access from the same document is requested repeatedly, either by the same user or by different users, the response to the request is speeded up the second and subsequent times, because the result file is already available in the dictionary-access-ready document store 6.

From the system's point of view, additional file storage space is required for the dictionary-access-ready document store 6, but the processing load is reduced, because as long as a document is not updated, a result file is created for that document only once. This advantage becomes particularly significant if words in the document are likely to be looked up by a large number of users.

Third Embodiment

The third embodiment differs from the preceding embodiments in regard to the format of the electronic dictionary.

Figures 22, 23:
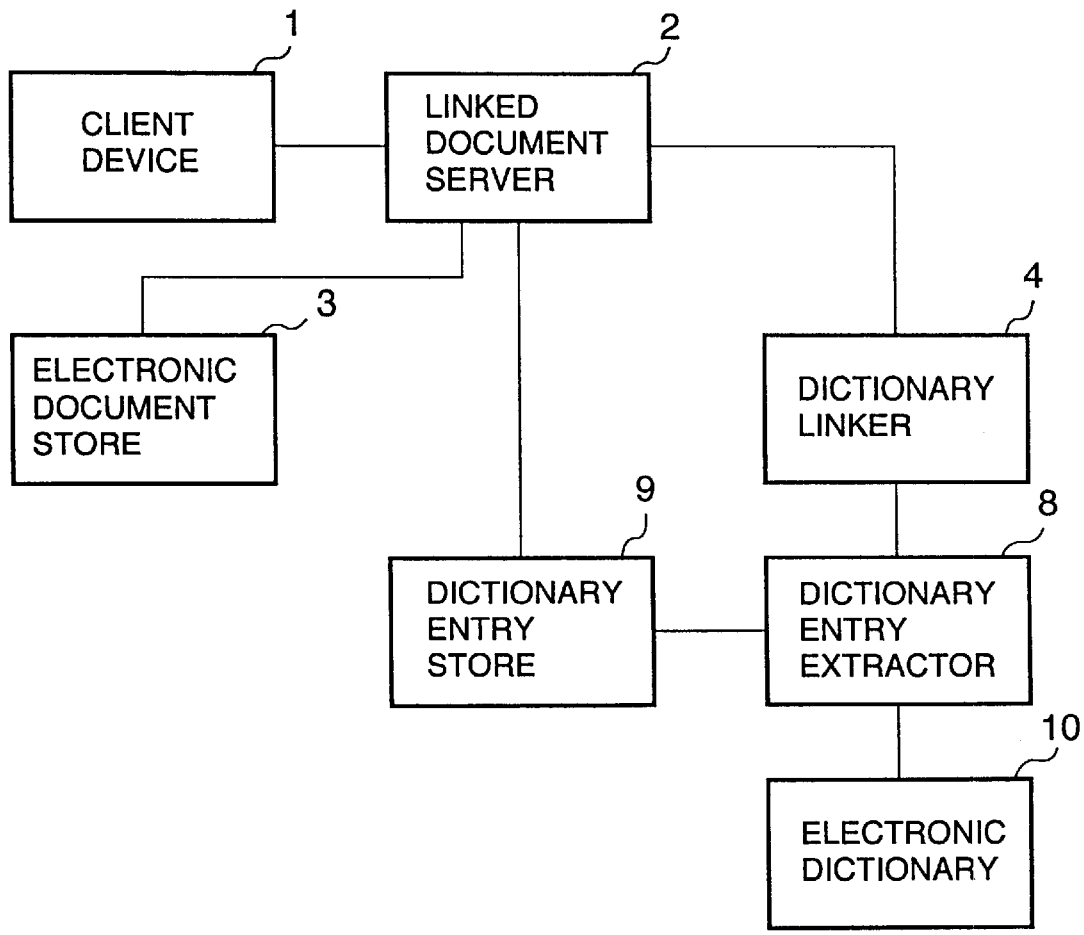
FIG. 22 is a block diagram of a third embodiment of the invented document display system.
FIG. 23 illustrates part of the contents of the electronic dictionary in FIG. 22.

Referring to FIG. 22, the third embodiment has the same client device 1, linked document server 2, and electronic document store 3 as the first embodiment, a generally similar dictionary linker 4, and a dictionary entry extractor 8, a dictionary entry store 9, and an electronic dictionary 10.

The electronic dictionary 10 is an English-to-Japanese dictionary similar to the tagged electronic dictionary 5 of the first embodiment, but has no embedded anchoring tags. A commercially available electronic dictionary can be used as the electronic dictionary 10 FIG. 23 shows an example of part of the electronic dictionary 10, in which each entry comprises an English word, then a Japanese definition. The Japanese definition is terminated by a special code represented in the drawing by a square, followed by a new-line code, then the next entry. The special code indicates that the word on the next line is the heading of a new dictionary entry, and the information on the subsequent line or lines, up to the next special code, is the definition of the word given in the heading.

The electronic dictionary 10 is not limited to the format shown in FIG. 23. electronic dictionaries in other formats can be used, as long as the format enables entry headings and definitions to be recognized.

The dictionary entry extractor 8 receives a word from the dictionary linker 4, looks this word up in the electronic dictionary 10, stores the entry of this word, comprising the word and its definition, as a separate document in the dictionary entry store 9, and provides the dictionary linker 4 with information giving the storage location of the entry in the dictionary entry store 9. For example, the dictionary entry extractor 8 can store each retrieved entry in a separate file in the dictionary entry store 9, and provide the dictionary entry store 9 with the file names. The contents of the dictionary entry store 9 can be read by the linked document server 2. Files stored in the dictionary entry store 9 are treated as hypertext documents, so the linked document server 2 does not add a dictionary mode button.

The electronic dictionary 10 can be stored as a single file on the same type of storage device as the electronic document store 3. The dictionary linker 4, dictionary entry extractor 8, dictionary entry store 9, and electronic dictionary 10 can all be incorporated into the same computer system or workstation as the linked document server 2 and electronic document store 3. Alternatively, the dictionary linker 4, dictionary entry extractor 8, dictionary entry store 9, and electronic dictionary 10 can reside in another computer system, workstation, or special device coupled to the system or workstation in which the linked document server 2 and electronic document store 3 reside, or linked to that system or workstation by a telecommunication line.

The client device 1 and linked document server 2 operate as in the first embodiment, following the flowcharts in FIGS. 3 and 4. Upon retrieving a document that is not a hypertext document from the electronic document store 3, the linked document server 2 adds a dictionary mode button as shown in FIG. 5.

Figure 24:
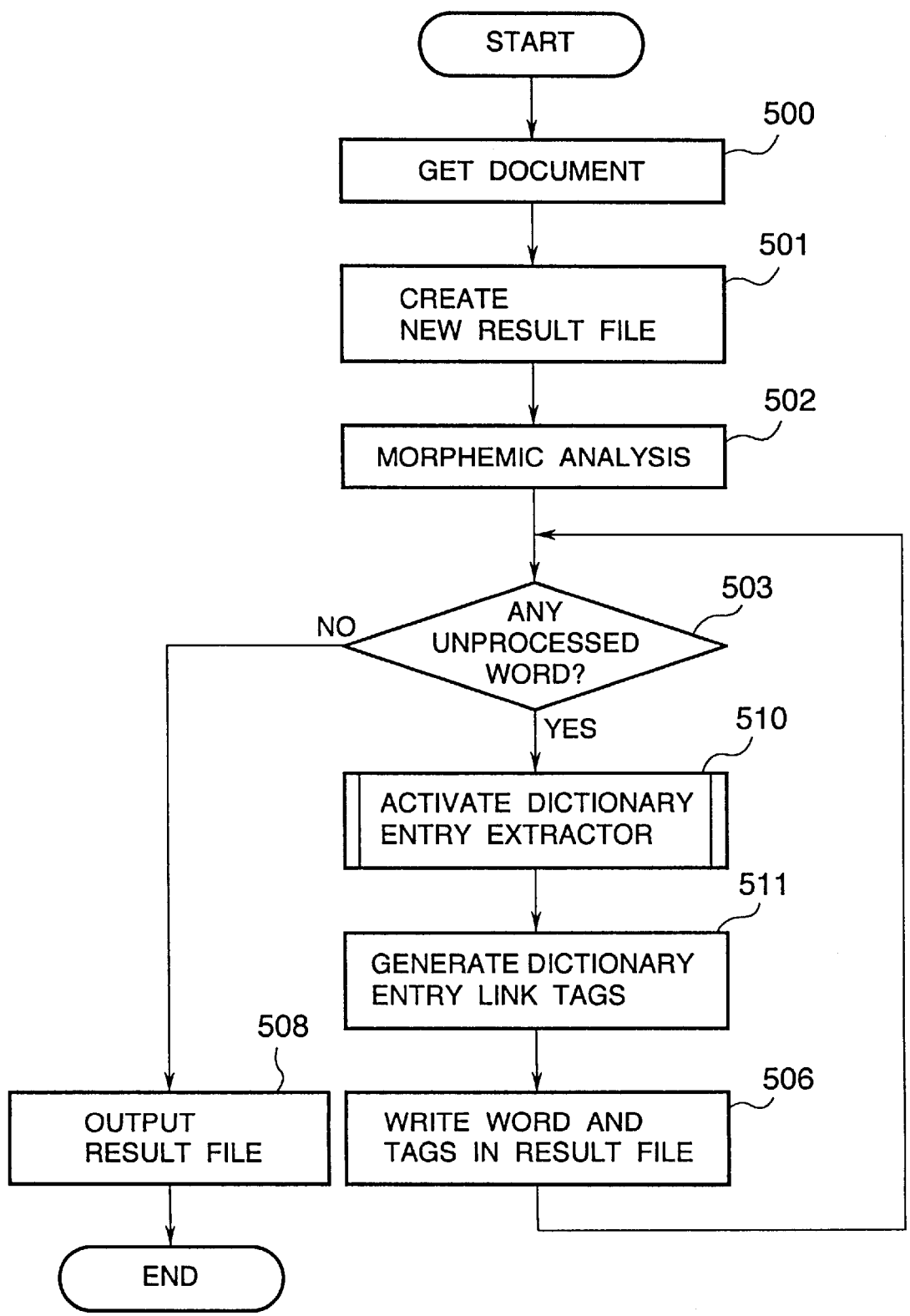
FIG. 24 is a flowchart illustrating the operation of the dictionary linker in the third embodiment.

The dictionary linker 4 now operates according to the flowchart in FIG. 24. Steps 500, 501, 502, and 503 are the same as in the first embodiment, but when an unprocessed word remains in step 503, the dictionary linker 4 commands the dictionary entry extractor 8 to process the word (step 510). This process normally results in the storage of a dictionary entry for the word in the dictionary entry store 9. The dictionary linker 4 then generates hypertext tags linking the word to the dictionary entry in the dictionary entry store 9 (step 511), and writes the word and these tags in the result file (step 506). When no more unprocessed words remain, the result file is output (step 508) as in the first embodiment.

Figures 25, 26:
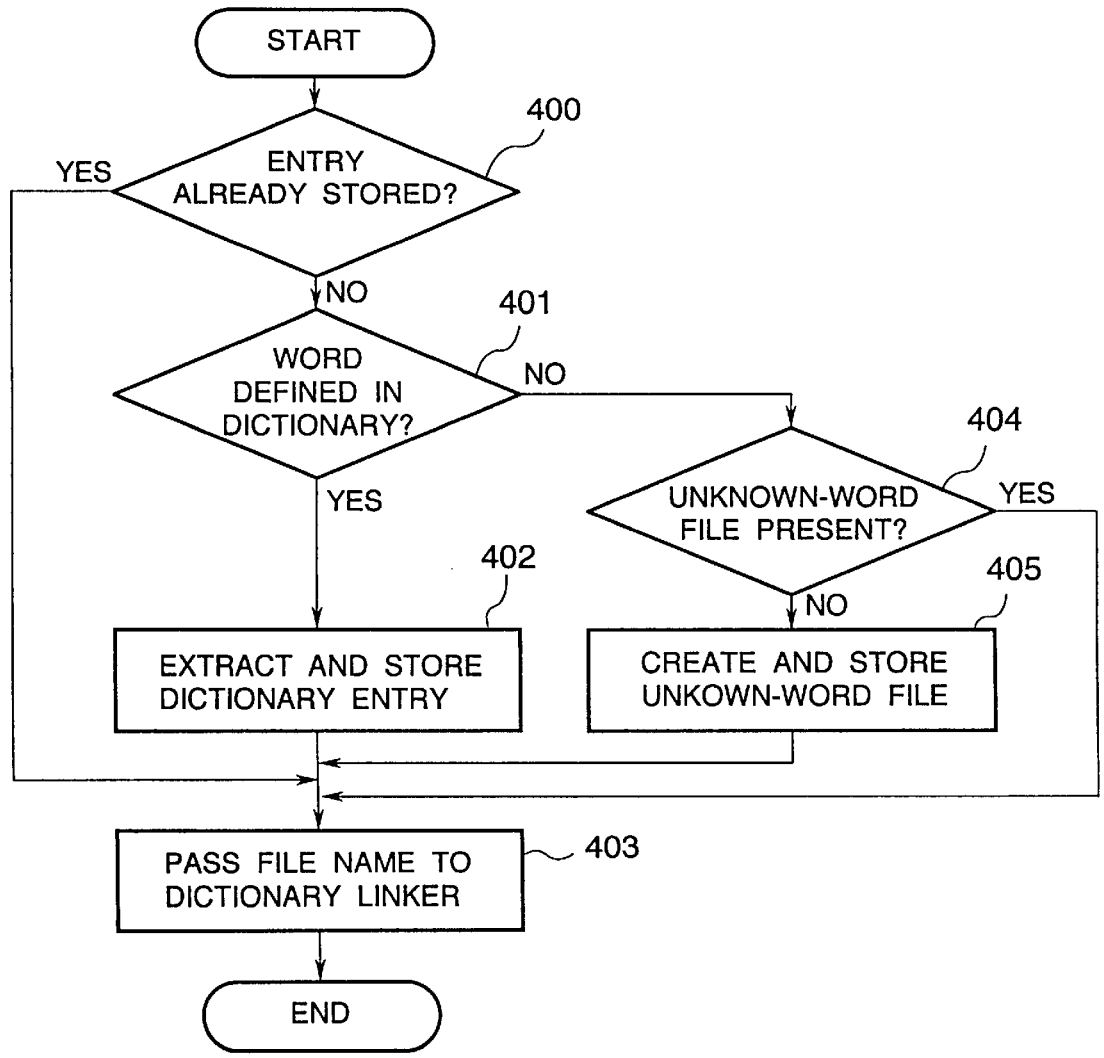
FIG. 25 illustrates part of a result file output by the dictionary linker in the third embodiment.
FIG. 26 is a flowchart illustrating the operation of the dictionary entry extractor in the third embodiment.

FIG. 25 shows part of the result file output by the dictionary linker 4 for the document in FIG. 14. This result file is similar to the one in FIG. 6, except that the hypertext references are the names of files in the dictionary entry store 9, such as "/dic/keep/storehouse" in the last line in FIG. 25. In this reference, "/dic/keep/" is the name of the directory or the dictionary entry store 9, and "storehouse" is the name of a file in which the dictionary entry for the word "storehouse" has been stored.

FIG. 26 illustrates the operation of the dictionary entry extractor 8. When given a word to process, the dictionary entry extractor 8 first determines if the entry for this word is already stored in the dictionary entry store 9 (step 400). If the entry is not already stored, the dictionary entry extractor 8 attempts to look the word up in the electronic dictionary 10 (step 401). If the word is defined in the electronic dictionary 10, the dictionary entry extractor 8 reads the entry headed by the word from the electronic dictionary 10, and stores the entry in a file in the dictionary entry store 9 (step 402). The file name of this file is the word looked up, and the file contents are the entry read from the electronic dictionary 10. The dictionary entry extractor 8 then passes the file name to the dictionary linker 4 (step 403). This completes the processing of the word.

If the word is not defined in the dictionary, giving a negative result in step 401, the dictionary entry extractor 8 checks whether an unknown-word file is present in the dictionary entry store 9 (step 404). The unknown-word file has a predetermined name, such as "unknown_words," for example. Step 404 is carried out by searching for this file name in the directory "/dic/keep/."

If no unknown-word file is present in the dictionary entry store 9, the dictionary entry extractor 8 now creates one (step 405), giving the unknown-word file the above-mentioned predetermined name. The file contents are, for example, a Japanese message stating that the word is riot in the dictionary: more specifically, the message illustrated in FIG. 18.

The dictionary entry extractor 8 then passes the name of the unknown-word file to the dictionary linker 4 in step 403 to complete the processing of the unknown word.

If an unknown-word file already exists, giving an affirmative result in step 404, the dictionary entry extractor 8 passes the name of this file to the dictionary entry store 9 (step 403) without creating a new unknown-word file. If the entry of the word is already stored in the dictionary entry store 9, giving an affirmative result in step 400, the dictionary entry extractor 8 proceeds immediately to step 403 and passes the file name of the entry to the dictionary linker 4, skipping the intermediate steps 401 and 402.

The overall operation of the third embodiment will be described next, focusing on the operations that occur when the user retrieves the "Global Slogan" document shown in FIG. 14 and selects the dictionary mode button on this document with the pointing device. Other operations are carried out as described in the first embodiment. It will be assumed that the dictionary entry store 9 is initially empty. It will also be assumed that the electronic dictionary 10 contains entries for all words in the "Global Slogan" document except the word "vast."

As in the first embodiment, selection of the dictionary mode button causes the client device 1 to send the command "/cgi-bin/into_the_dic" to the linked document server 2, and the linked document server 2 to activate the dictionary linker 4. After obtaining a copy of the "Global Slogan" document from the linked document server 2, creating a new result file, and performing a morphemic analysis, the dictionary linker 4 passes the first word ("we") of this document to the dictionary entry extractor 8.

The dictionary entry extractor 8 checks to see whether an entry for "we" is already stored in the dictionary entry store 9. Specifically, the dictionary linker 4 searches for a file named "we" in the directory "/dic/keep/" of the dictionary entry store 9. By the assumption above, no such file exists, so the dictionary linker 4 next looks up the word "we" in the electronic dictionary 10, reads the entire entry for this word, stores the entry as a new file named "/dic/keep/we" in the dictionary entry store 9, and passes the file descriptor "/dic/keep/we" to the dictionary linker 4. As the first line in the result file, the dictionary linker 4 writes the line <A HREF="/dic/keep/we">We</A>.

The next two words, "draw" and "on," are processed similarly, creating files named "/dic/keep/draw" and "dic/keep/on" in the dictionary entry store 9. The word "vast," however, is not defined in the electronic dictionary 10, so the dictionary entry extractor 8 checks to see whether an unknown-word file is already present in the dictionary entry store 9. By the assumption above, no unknown-word file is present, so the dictionary entry extractor 8 creates a file named "dic/keep/unknown_words" containing the message shown in FIG. 18, and passes the file name to the dictionary linker 4. The dictionary linker 4 writes the line <A HREF="/dic/keep/unknown_words">vast</A> in the result file.

Further words in the "Global Slogan" document are processed in the same way. The word "from" is encountered twice. The first time, the dictionary entry extractor 8 reads the entry for this word from the electronic dictionary 10, creates a new file named "/dic/keep/from" in the dictionary entry store 9, and passes the file name "/dic/keep/from" to the dictionary linker 4. The second time, the dictionary entry extractor 8 only passes the file name "/dic/keep/from" to the dictionary linker 4, without creating a new file. Each time, the dictionary linker 4 writes a new <A HREF="/dic/keep/from">from</A> line in the result file.

When all words have been processed, the result file is transferred from the dictionary linker 4 to the linked document server 2, then to the client device 1, and the user sees the screen shown in FIG. 15. If the user selects the word "storehouses" with the pointing device, the client device 1 sends the file descriptor "/dic/keep/storehouse" contained in the invisible hypertext tag preceding this word to the linked document server 2. The linked document server 2 retrieves the file named "/dic/keep/storehouse" from the dictionary entry store 9, and sends this file to the client device 1. The client device 1 then displays the screen in FIG. 27, showing the Japanese meanings or "storehouse."

Figure 27:
FIG. 27 shows an example of information displayed when dictionary access is performed in the third embodiment.

If the user selects the "Back" button on the screen in FIG. 27, the client device 1 again displays the screen shown in FIG. 15. If the user next selects the word "vast," the client device 1 sends the file descriptor "/dic/keep/unknown_words" to the linked document server 2. The linked document server 2 retrieves the file named "/dic/keep/unknown_words" from the dictionary entry store 9, and sends this file to the client device 1, which now displays the screen shown in FIG. 18, informing the user that the selected word is not in the dictionary.

To the user, the third embodiment appears to operate like the first embodiment, except that when the user looks up words, only one definition appears on the screen at a time. One advantage of this is that less information has to be transferred from the linked document server 2 to the client device 1. Another advantage is that the user is shown only what he want to see, and can quickly read the desired definition without being distracted by definitions of other words. The first embodiment could also be adapted to operate in this way.

In terms of speed and efficiency, the third embodiment is generally intermediate between the first and second embodiments. When the dictionary-access mode is selected repeatedly for the same document, the result file is returned to the client device 1 faster than in the first embodiment, because no actual dictionary look-up is necessary the second time and subsequent times, but not as quickly as in the linked document server 2, because the dictionary linker 4 still has to create a result file each time.

If the dictionary-access mode is selected for a series of different documents, however, the third embodiment may outperform the second embodiment in the second and subsequent documents, because common words will already be stored in the dictionary entry store 9. The electronic document store 3 may also improve on the second embodiment in terms of memory efficiency, because the size of the dictionary entry store 9 in the third embodiment is limited by the size of the electronic dictionary 10, whereas the dictionary-access-ready document store 6 in the second embodiment can grow very large if result files for many documents are stored.

The main advantage of the third embodiment, however, is that the electronic dictionary 10 does not, have to have embedded tags. Commercially available electronic dictionaries can be used in their existing form, greatly increasing the number of dictionaries that can be accessed.

Figure 28:
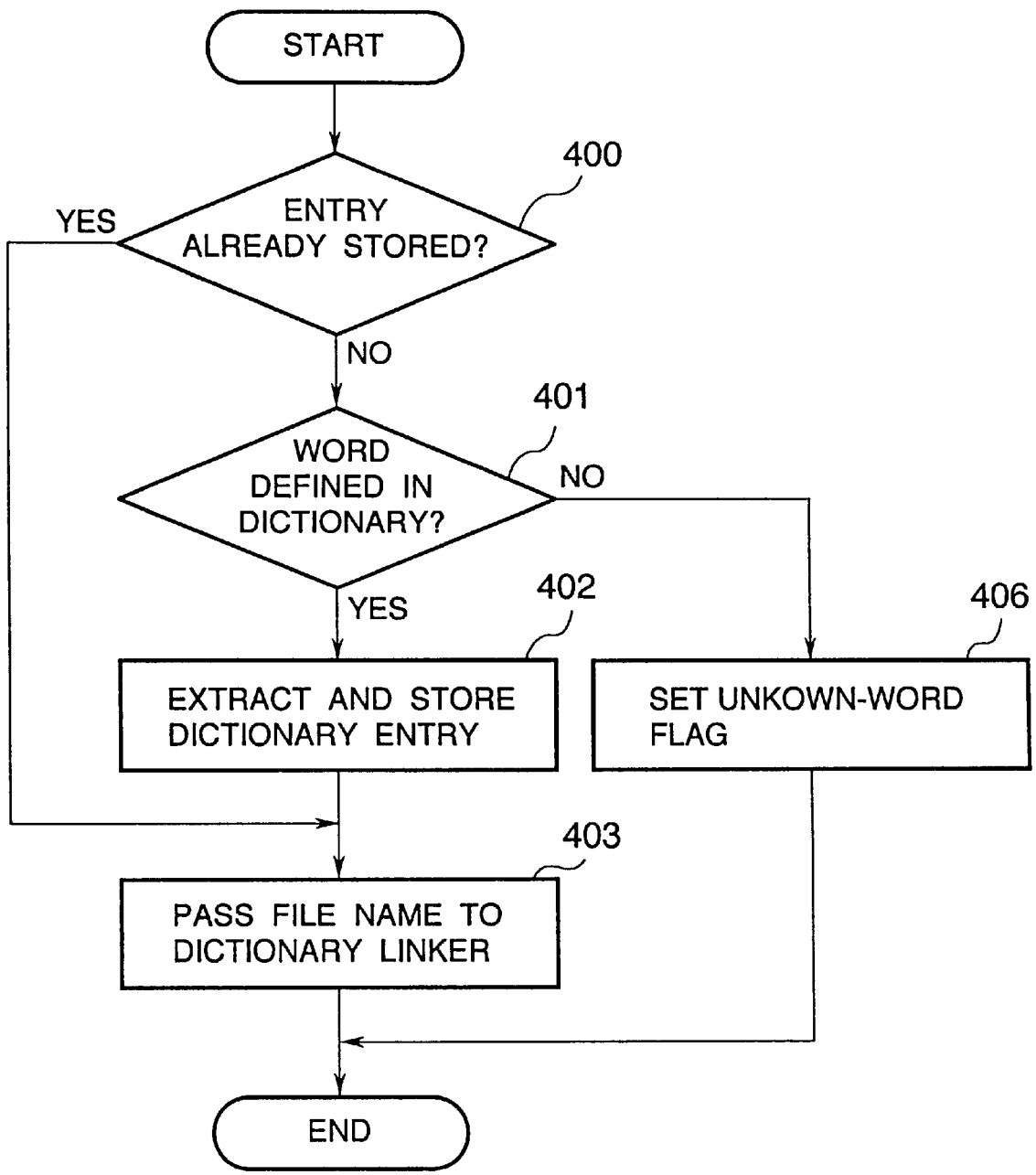
FIG. 28 is a flowchart illustrating the operation of the dictionary entry extractor in a variation of the third embodiment.
Figure 29:
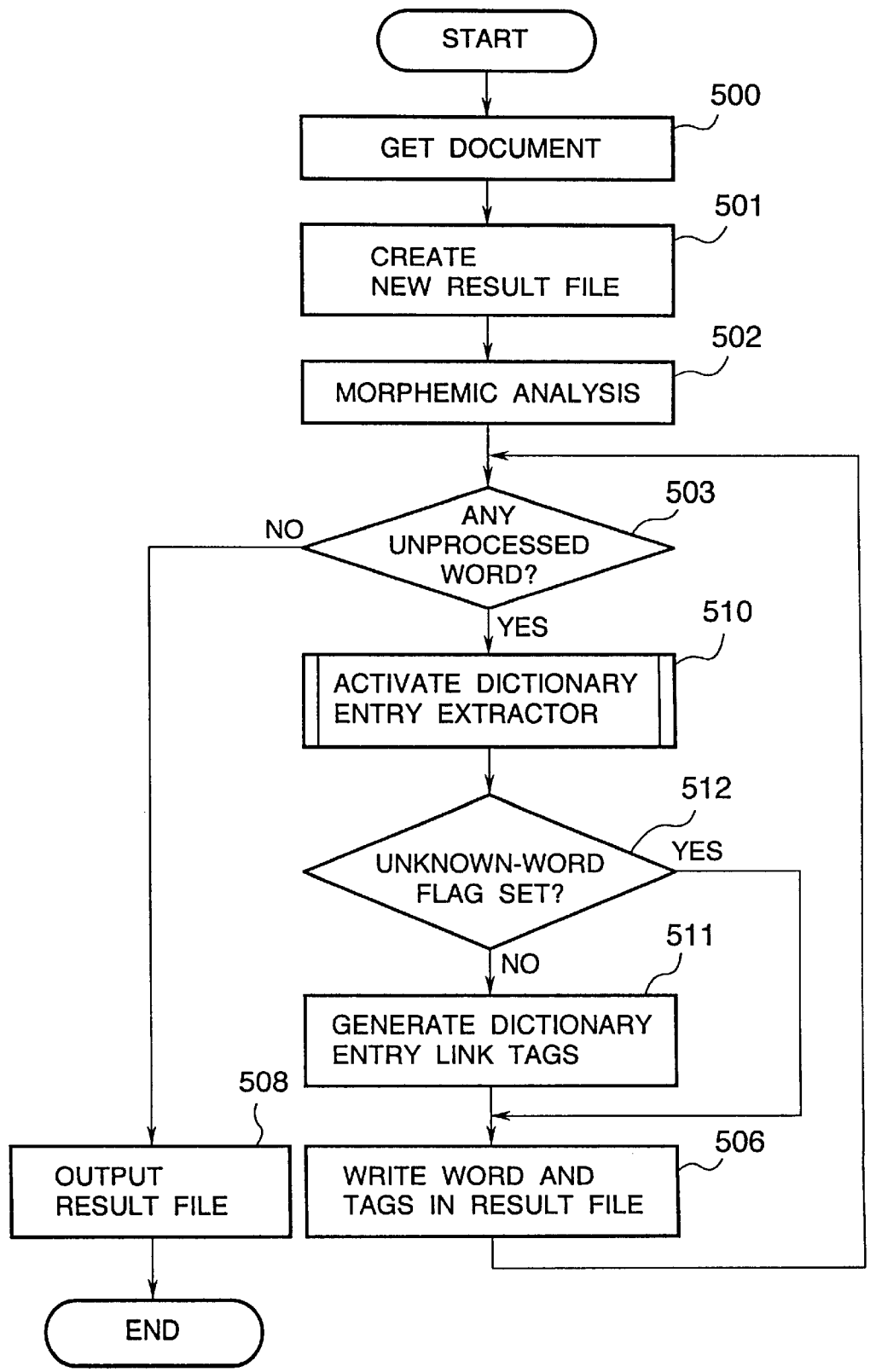
FIG. 29 is a flowchart illustrating the operation of the dictionary linker in this variation.
Figures 30, 31:
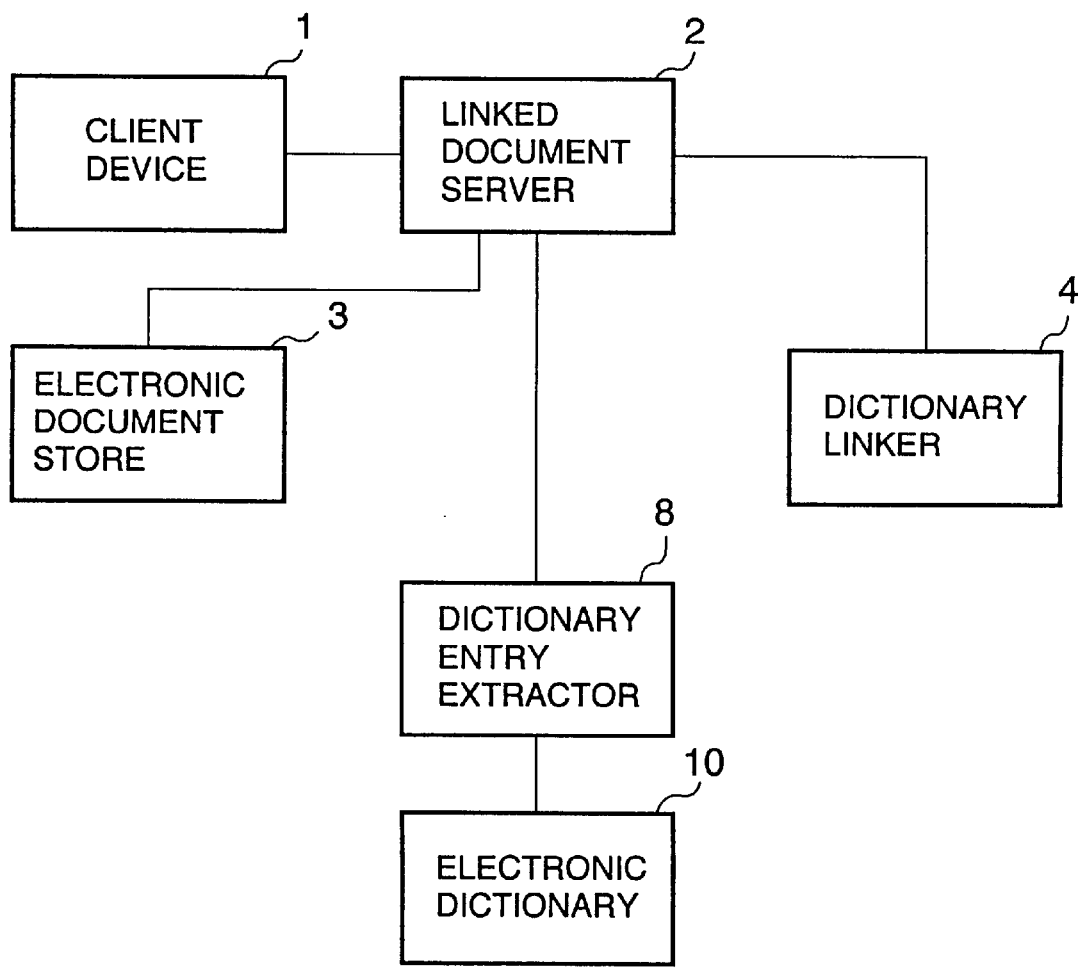
FIG. 30 illustrates part of a result file output by the dictionary linker in this variation.
FIG. 31 is a block diagram of a fourth embodiment of the invented document display system.

FIGS. 28 to 30 illustrate a variation of the third embodiment that does not create an unknown-word file in the dictionary entry store 9.

Referring to FIG. 28, upon encountering an unknown word in step 401, the dictionary entry extractor 8 sets an unknown-word flag (step 406), then terminates processing without creating any file in the dictionary entry store 9. Step 406 replaces steps 404 and 405 in FIG. 26. Steps 400, 401, 402, and 403 are the same as in FIG. 26.

Referring to FIG. 29, after having a word processed by the dictionary entry extractor 8 in step 510, the dictionary linker 4 checks the unknown-word flag (step 512). If the unknown-word flag is set, the dictionary linker 4 skips step 511, and writes the word in the result file without attached tags. If the unknown-word flag is not set, the dictionary linker 4 executes both steps 511 and 506, as in FIG. 24. The other steps in FIG. 29 are identical to the corresponding steps in FIG. 24. The unknown-word flag is cleared each time the dictionary linker 4 activates the dictionary entry extractor 8, although this is riot explicitly shown in FIGS. 28 and 29.

FIG. 30 shows the result file output by the dictionary linker 4 in this variation of the third embodiment when the dictionary mode button is selected in FIG. 14 and the word "vast" does not appear in the electronic dictionary 10. The first three lines and the fifth line in this result file are the same as in FIG. 25, but the word "vast" appears by itself on the fourth line.

When this result file is transferred to the client device 1, the user sees the display shown in FIG. 17, in which the word "vast" is riot underlined. As explained in the first embodiment, this variation has the advantage of warning the user in advance that the word cannot be looked up.

Fourth Embodiment

Referring to FIG. 31, the fourth embodiment has the same client device 1, electronic document store 3, and electronic dictionary 10 as the third embodiment, and a generally similar linked document server 2, dictionary linker 4, and dictionary entry extractor 8, but has no dictionary entry store. The dictionary entry extractor 8 communicates directly with the linked document server 2, and does not communicate with the dictionary linker 4.

Figure 32:
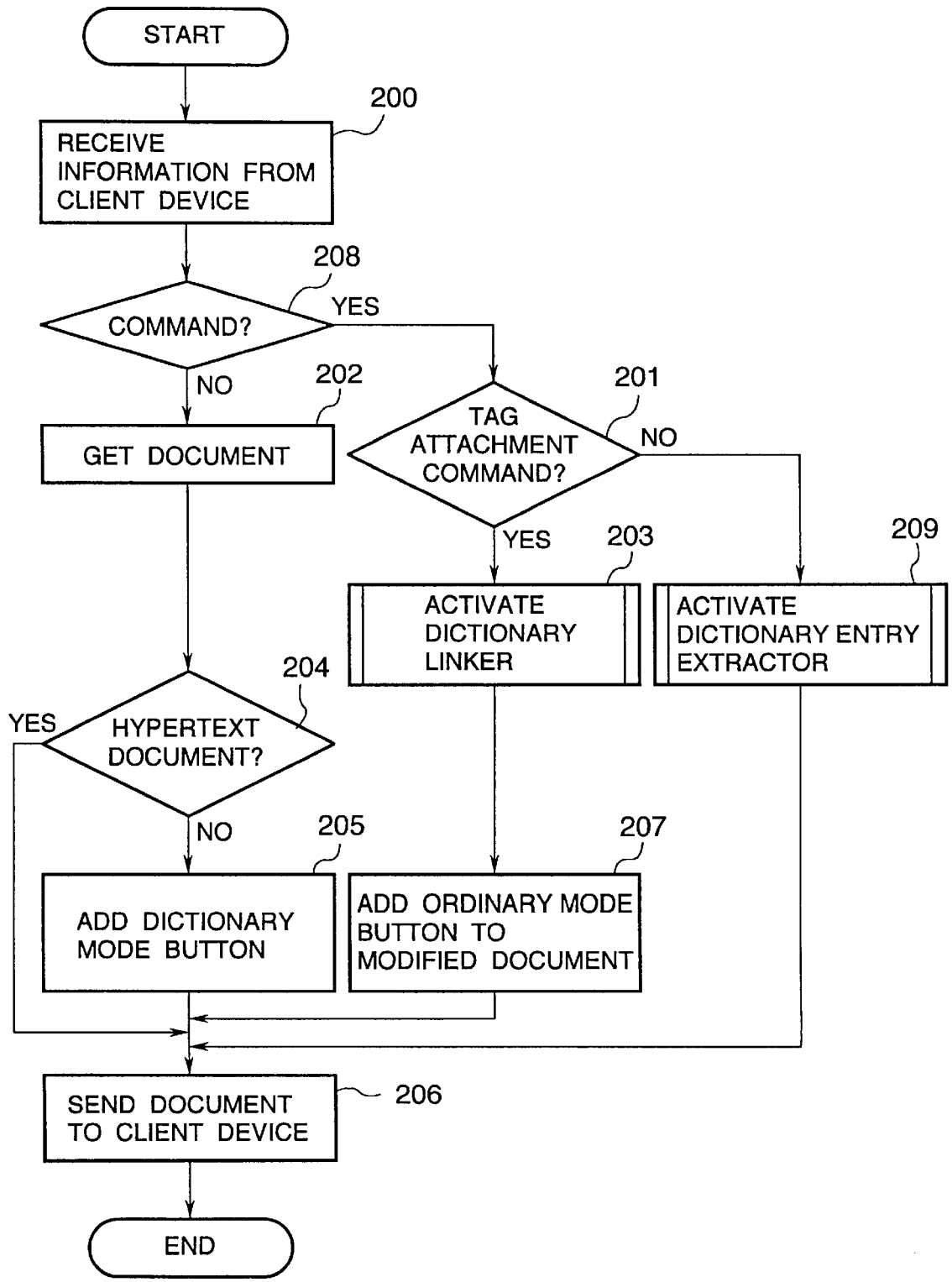
FIG. 32 is a flowchart illustrating the operation of the linked document server in the fourth embodiment.

Referring to FIG. 32, the linked document server 2 in the fourth embodiment can receive two types of commands: tag attachment commands and dictionary look-up commands. The command processing is modified accordingly. After receiving information from the client device 1 in step 200, the linked document server 2 first determines whether the received information is a command (step 208). If the received information is not a command, the linked document server 2 proceeds with the processing already described in the first embodiment (steps 202, 204, 205, and 206). If the received information is a command, the linked document server 2 proceeds to step 201 to decide whether the command is a tag attachment command.

If the command is a tag attachment command, the linked document server 2 proceeds as described in the first embodiment (steps 203 and 207). If the command is not a tag attachment command, then the command is a dictionary look-up command, which the linked document server 2 processes by activating the dictionary entry extractor 8 (step 209).

Figure 33:
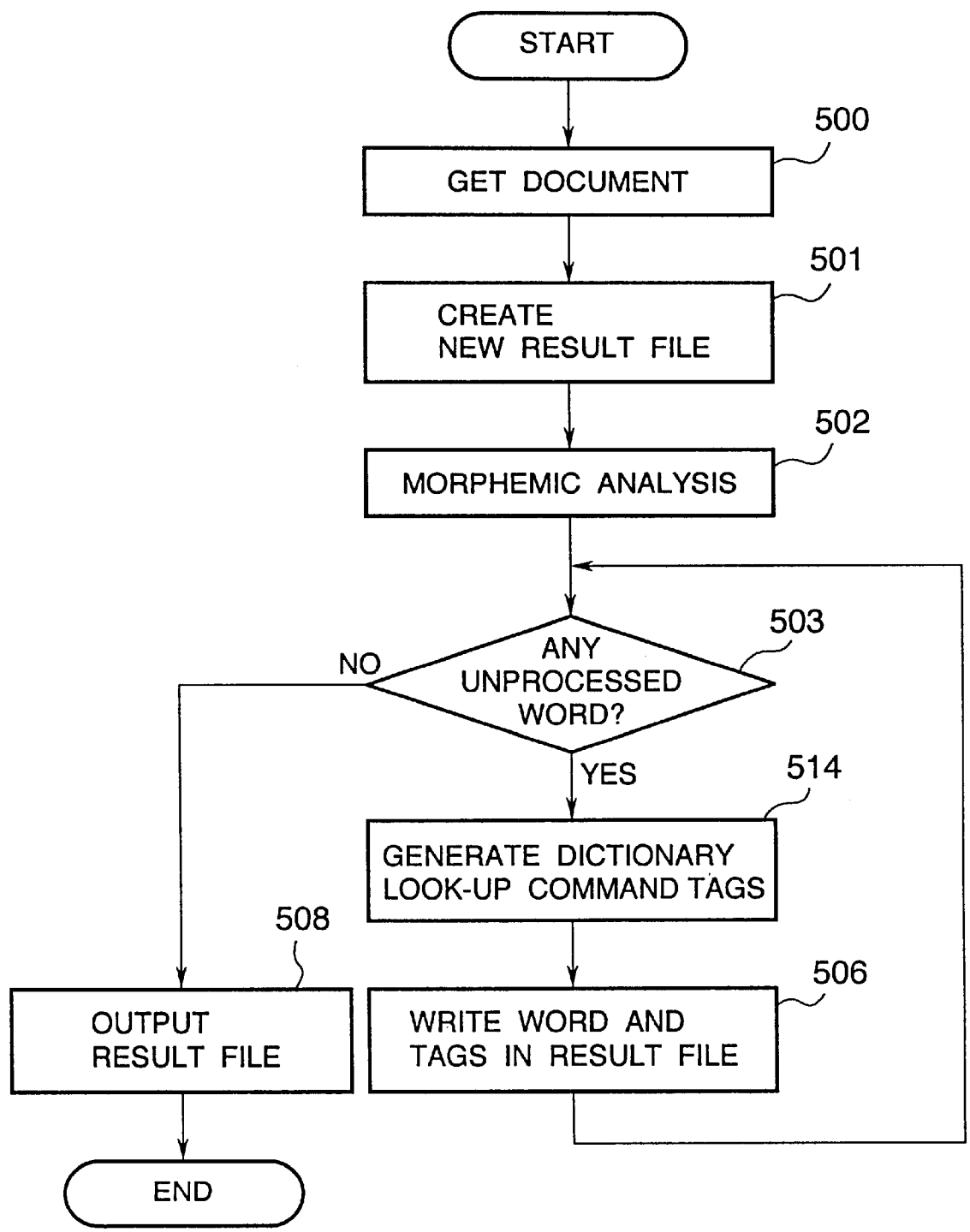
FIG. 33 is a flowchart illustrating the operation of the dictionary linker in the fourth embodiment.

Referring to FIG. 33, upon being activated by the linked document server 2, the dictionary linker 4 obtains a copy of the relevant document file, creates a result file, and performs a morphemic analysis as in the first and third embodiments (steps 500, 501, and 502). For each unprocessed word found in step 503, however, the dictionary linker 4 now attaches a dictionary look-up command tag and a closing tag (step 514), in place of the hypertext reference tags that were attached in the preceding embodiments. The word and attached dictionary look-up command tag and closing tag are then written in the result file (step 506). This process continues until dictionary look-up command tags have been attached to all words in the document, at which point the result file is output to the linked document server 2 (step 508) and the processing of the dictionary linker 4 ends.

Figures 34, 35:
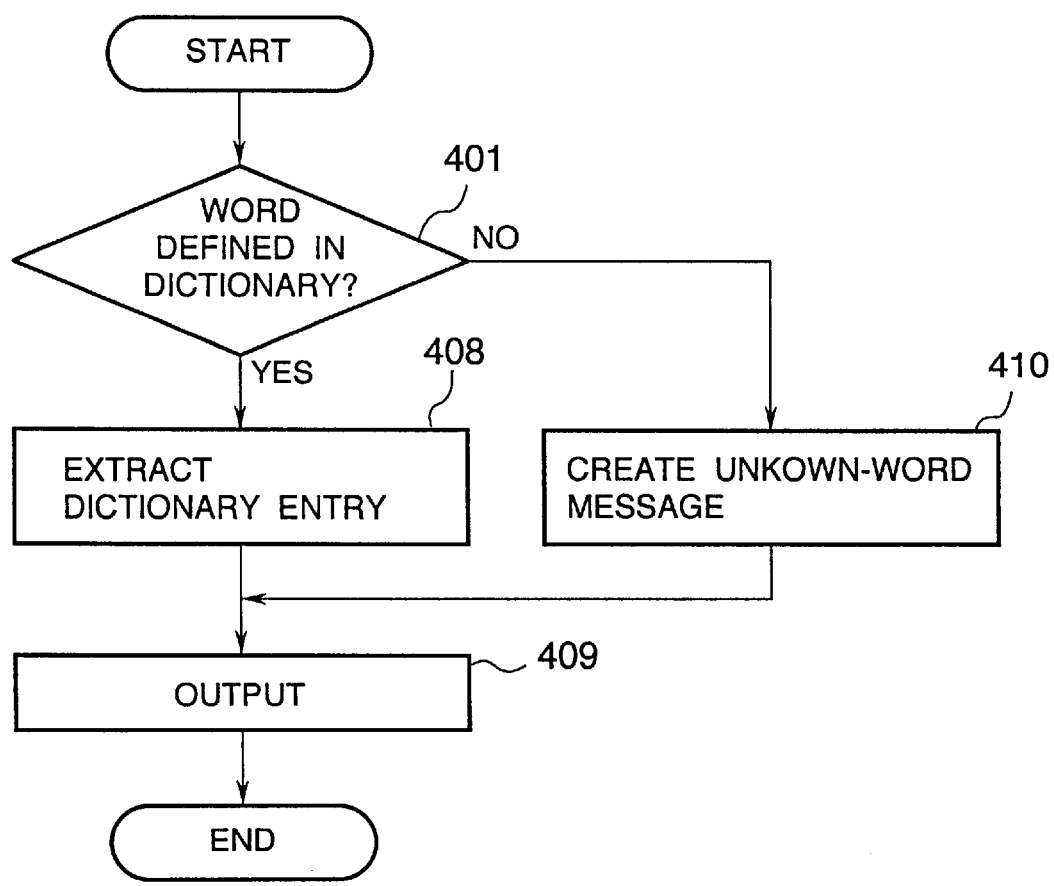
FIG. 34 illustrates part of a result file output by the dictionary linker in the fourth embodiment.
FIG. 35 is a flowchart illustrating the operation of the dictionary entry extractor in the fourth embodiment.

FIG. 34 shows an example of the result file output by the dictionary linker 4 in the fourth embodiment for the "Global Slogan" document in FIG. 14. Each dictionary look-up command begins with "/cgi-bin/pic_dic?" The question mark is followed by the word to be looked up, e.g. "we" in the first line in FIG. 34. When the command is executed, the dictionary entry extractor 8 is activated as a command processor, and the word following the question mark is passed to the dictionary entry extractor 8 as a parameter.

FIG. 35 shows the processing carried out by the dictionary entry extractor 8. Upon activation, the dictionary entry extractor 8 looks up the supplied word in the electronic dictionary 10 (step 401). If this word is defined in the electronic dictionary 10, the dictionary entry extractor 8 extracts the entire dictionary entry for the word (step 408), then outputs the entry to the linked document server 2. If the word is not defined in the dictionary, the dictionary entry extractor 8 prepares an unknown-word message (step 410), and outputs this message to the linked document server 2 (step 409). The content of the unknown-word message is, for example, a Japanese sentence stating that the particular word is not found in the dictionary. In the course of this processing, the dictionary entry extractor 8 may create a temporary file to hold the dictionary entry or unknown-word message.

Next, the overall operation of the fourth embodiment will be described, again focusing on the operations that take place when the dictionary mode button is selected in FIG. 14.

Selection of the dictionary mode button sends the same tag attachment command to the linked document server 2 as in the preceding embodiments. The linked document server 2 activates the dictionary linker 4, which quickly generates a result file by attaching dictionary look-up command tags to all of the words in the document, as illustrated in FIG. 34. This result file is displayed at the client device 1 as shown in FIG. 15, all words being underlined to indicate the presence of hypertext links.

If the user now selects the word "storehouses," for example, the client device 1 sends the linked document server 2 the attached dictionary look-up) command "/cgi-bin/pic_dic?storehouse." The linked document server 2 executes this command by activating the dictionary entry extractor 8, passing the word "storehouse" to the dictionary entry extractor 8 as a parameter. The dictionary entry extractor 8 looks up the word "storehouse" in the electronic dictionary 10 and returns the dictionary entry for this word, which is transferred to the client device 1 and displayed as in FIG. 27.

If the user selects a word such as "vast" which is not defined in the electronic dictionary 10, the dictionary entry extractor 8 creates a message such as "vast wa jisho ni arimasen," in which "vast" is the undefined word, and "wa jisho ni arimasen" are Japanese words meaning "is not in the dictionary." This message is returned to the linked document server 2, transferred to the client device 1, and displayed.

To the user, the fourth embodiment appears to operate much like the third embodiment, with the slight difference that the unknown-word message names the word that could not be found in the dictionary. In terms of speed, the display in FIG. 15 is generated more quickly than in the third embodiment, because no dictionary look-up is required. When the user selects a word in this display, however, the definition (or unknown-word message) is returned more slowly than in the third embodiment, because the dictionary entry extractor 8 must search for the word in the electronic dictionary 10. Thus the third embodiment is advantageous for users who look up a large number of words in a short document, while the fourth embodiment is advantageous for users who look up fewer words in a longer document.

From the system's point of view, the fourth embodiment has the advantage of requiring less memory, because there is no dictionary entry store, and the further advantage that no time is spent in extracting words that the user will not select for dictionary look-up. When the same word is looked up repeatedly, however, the dictionary entry extractor 8 must be activated each time, instead of only once as in the third embodiment.

Fifth Embodiment

The fifth embodiment combines the advantages of the third and fourth embodiments.

Figure 36:
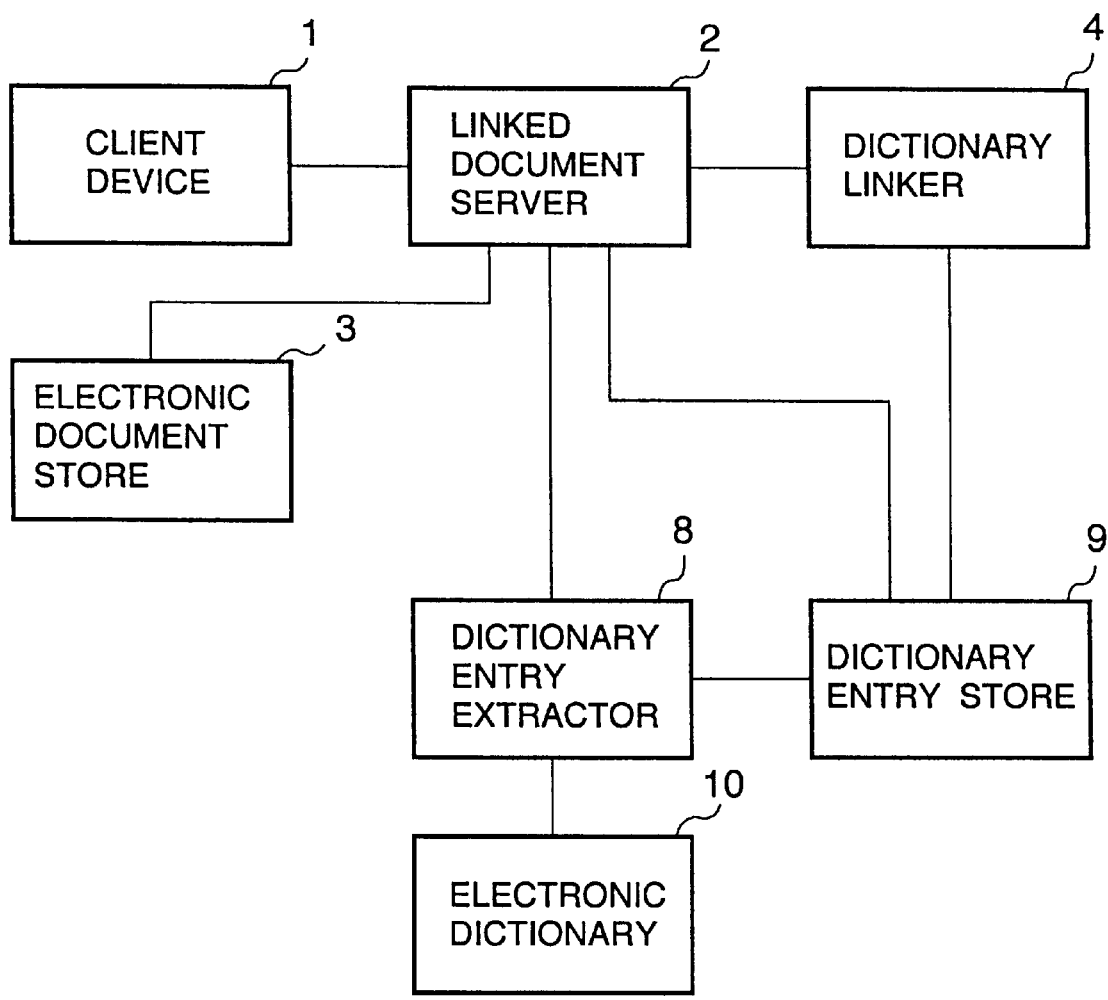
FIG. 36 is a block diagram of a fifth embodiment of the invented document display system.

Referring to FIG. 36, the fifth embodiment comprises the same client device 1, electronic document store 3, and electronic dictionary 10 as the third embodiment, and a generally similar linked document server 2, dictionary linker 4, dictionary entry extractor 8, and dictionary entry store 9. The interrelations among these elements differ from the third embodiment in that the dictionary entry extractor 8 communicates with the linked document server 2 instead of with the dictionary linker 4, and the dictionary linker 4 can access the dictionary entry store 9.

As in all of the preceding embodiments, the linked document server 2 receives information from the client device 1 and sends back documents retrieved from the electronic document store 3. As in the third embodiment, the linked document server 2 can also obtain result files from the dictionary linker 4 and dictionary entries from the dictionary entry store 9, and send these to the client device 1. As in the fourth embodiment, the linked document server 2 can activate both the dictionary linker 4 and dictionary entry extractor 8 in response to commands received from the client device 1, and can obtain dictionary entries from the dictionary entry extractor 8. These operations of the linked document server 2 in the fifth embodiment can be understood from the preceding embodiments, so further description will be omitted.

Figure 37:
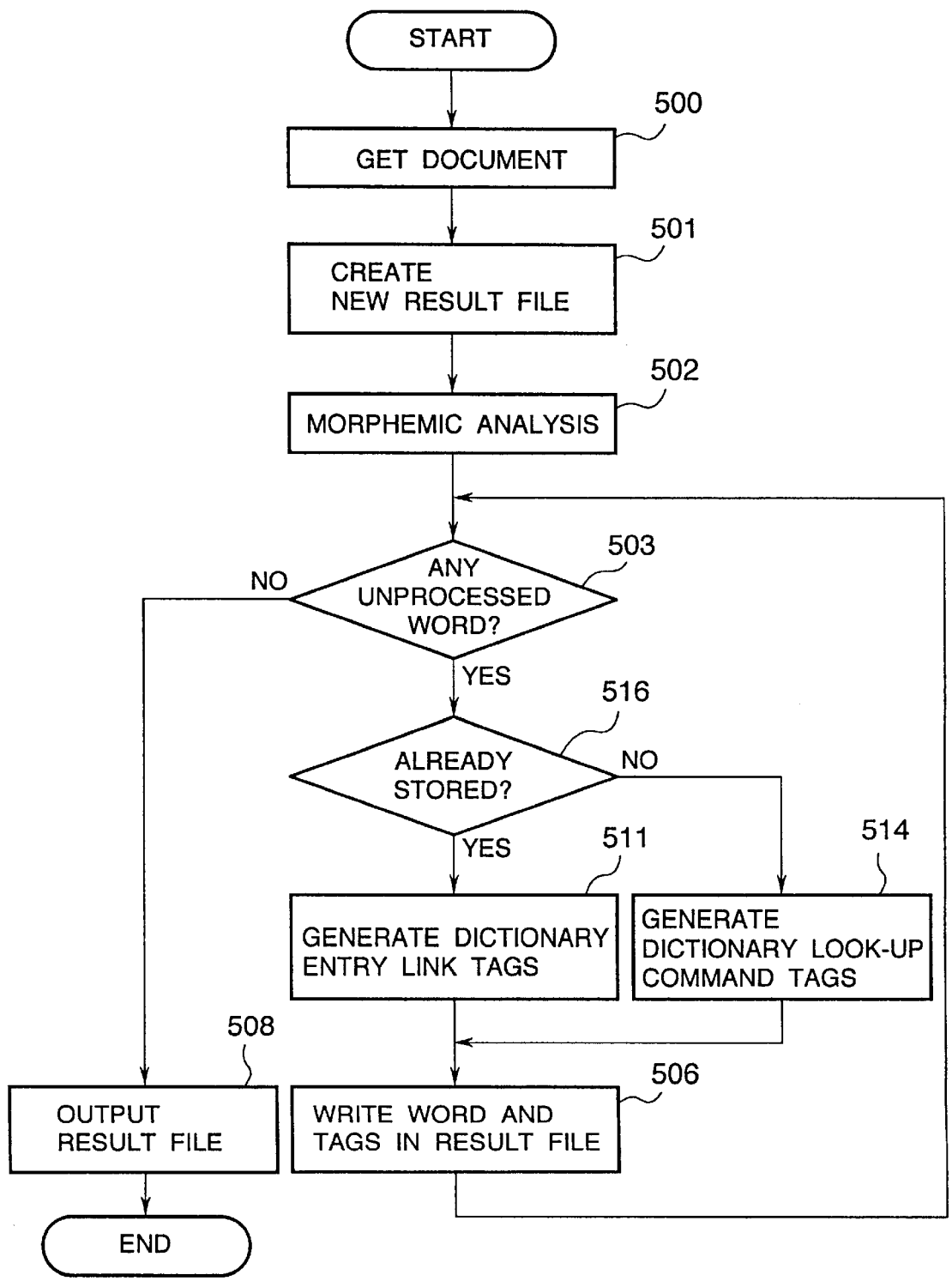
FIG. 37 is a flowchart illustrating the operation of the dictionary tinker in the fifth embodiment.

The dictionary linker 4 is activated when the linked document server 2 receives a tag attachment command. Referring to FIG. 37, the dictionary linker 4 obtains a copy of the relevant document file, creates a result file, performs a morphemic analysis, processes the words in the document file one by one, and outputs the result file when all words have been processed. These steps (steps 500, 501, 502, 503, and 508) are the same as in the third and fourth embodiments, but the processing of each word differs from the processing in those embodiments.

When an unprocessed word is found in step 503, the dictionary linker 4 first decides whether a dictionary entry for that word is already stored in the dictionary entry store 9 (step 516). If the dictionary entry of that word is already stored in the dictionary entry store 9, the dictionary linker 4 generates tags linking the word to the dictionary entry stored in the dictionary entry store 9 (step 511), and writes the word and these tags in the result file (step 506). The lines written in the result file when steps 516 and 511 are followed resemble the lines written in the third embodiment, shown in FIG. 25.

If the dictionary entry of the word is not already stored in the dictionary entry store 9, the dictionary linker 4 generates a dictionary look-up command tag (step 514), and writes the word with this dictionary look-up tag and a closing tag in the result file (step 506). The lines written in the result file when steps 516 and 514 are followed resemble the lines written in the fourth embodiment, shown in FIG. 34.

Figures 38, 39:
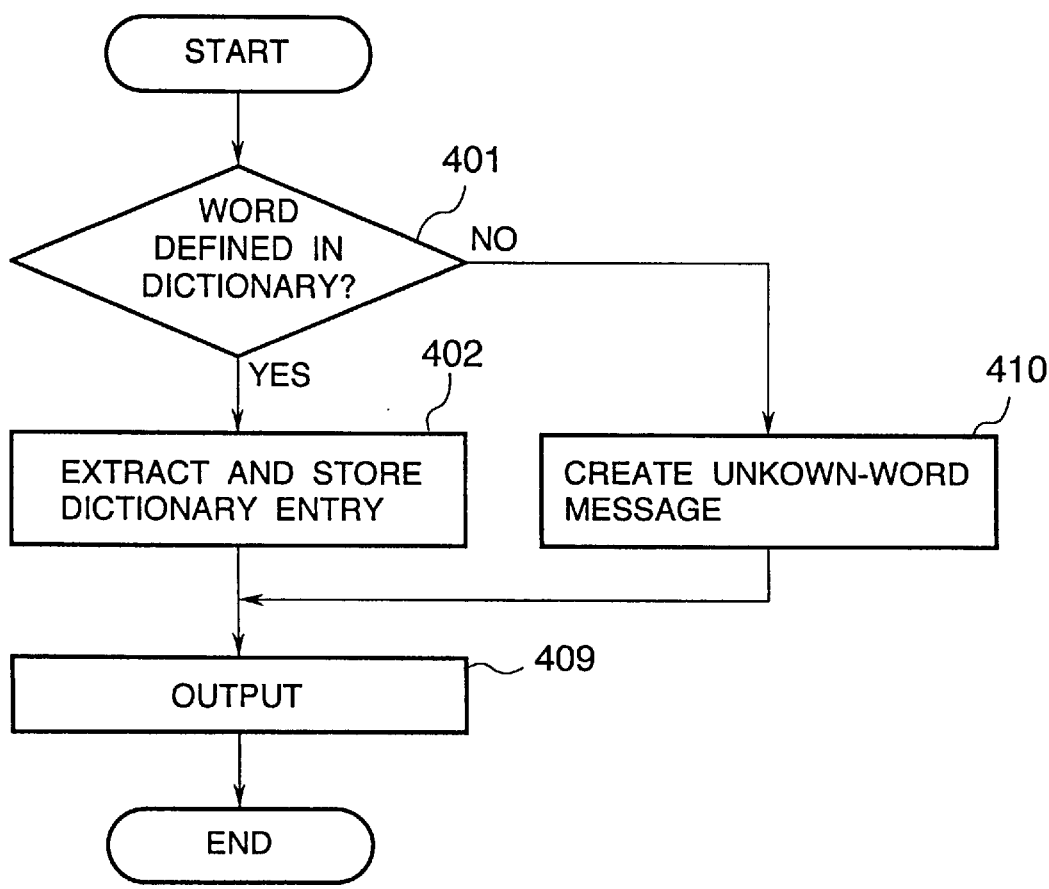
FIG. 38 illustrates part of a result file output by the dictionary linker in the fifth embodiment.
FIG. 39 is a flowchart illustrating the operation of the dictionary entry extractor in the fifth embodiment.

FIG. 38 shows an example of the result file output by the dictionary linker 4 for a document beginning "We draw on vast storehouses . . . " when dictionary entries for the words "we" and "on" have already been stored in the dictionary entry store 9, and dictionary entries for the words "draw," "vast," and "storehouses" have not been stored. The meanings of the tags are the same as in the third and fourth embodiments.

The dictionary entry extractor 8 is activated when the linked document server 2 receives a dictionary look-up command. As in the fourth embodiment, the dictionary entry extractor 8 receives a word as a command parameter. Referring to FIG. 39, the dictionary entry extractor 8 begins as in the fourth embodiment by determining whether the word is defined in the electronic dictionary 10 (step 401). If the word is defined, the dictionary entry extractor 8 extracts the dictionary entry of the word from the electronic dictionary 10 arid stores a copy of this entry as a file in the dictionary entry store 9, as in the third embodiment (step 402), then outputs the entry to the linked document server 2 (step 409). If the word is riot defined, the dictionary entry extractor 8 creates an unknown-word message as in the fourth embodiment (step 410), and outputs this message to the linked document server 2 (step 409).

The overall operation of the tagged electronic dictionary 5 can be understood from the description given above and the descriptions of the preceding embodiments. When the user selects the dictionary mode button, the dictionary linker 4 generates a result file, without performing any actual dictionary look-up. Words are looked up in the electronic dictionary 10 one by one, when their meanings are requested by the user, as in the fourth embodiment. The dictionary entries are saved in the dictionary entry store 9, however, as in the third embodiment, so that the same word will not have to be looked up in the electronic dictionary 10 again the next time the definition of the word is requested.

The result file in the fifth embodiment is output more quickly than in the third embodiment, because the electronic dictionary 10 is not, accessed and no dictionary entries are copied from the electronic dictionary 10 to the dictionary entry store 9. Output of the result file is not as fast as in the fourth embodiment, however, because the dictionary linker 4 must check the dictionary entry store 9 before generating each pair of tags.

The first time the definition of a word is requested, the fifth embodiment returns the definition at the same speed as the fourth embodiment. The definition is not returned as quickly as in the third embodiment, because a dictionary look-up command must be executed.

When the definition of the same word is requested repeatedly, however, the fifth embodiment retrieves the definition from the dictionary entry store 9, without executing a dictionary look-up command, so the definition is returned just as quickly as in the third embodiment, and faster than in the fourth embodiment.

From the point of view of system efficiency, the fifth embodiment has advantages over both the third and fourth embodiments, in that words are never looked up in the electronic dictionary 10 unnecessarily, the same word is not looked up in the electronic dictionary 10 more than once, and dictionary entries that no one wants to see are not stored unnecessarily in the dictionary entry store 9.

Sixth Embodiment

The sixth embodiment also combines the advantages of the third and fourth embodiments.

Figure 40:
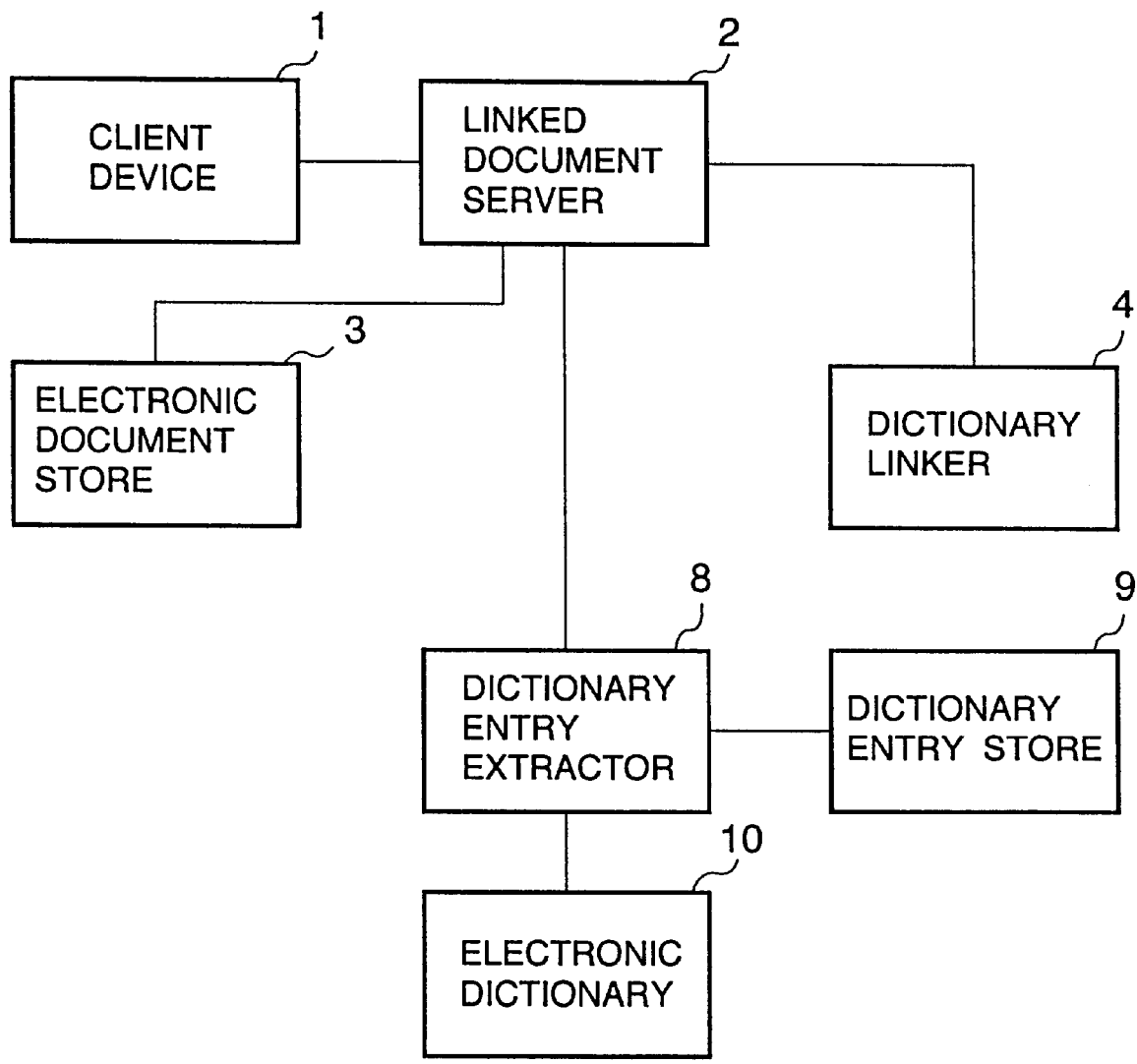
FIG. 40 is a block diagram of a sixth embodiment of the invented document display system.

Referring to FIG. 40, the sixth embodiment comprises the same client device 1, electronic document store 3, dictionary entry store 9, and electronic dictionary 10 as the third embodiment, the same dictionary linker 4 as the fourth embodiment, and a linked document server 2 and dictionary entry extractor 8 that are generally similar to the corresponding elements in the fifth embodiment.

The only difference between the linked document server 2 in the sixth embodiment and the linked document server 2 in the fifth embodiment is that the linked document server 2 in the sixth embodiment does not access the dictionary entry store 9 directly.

Figure 41:
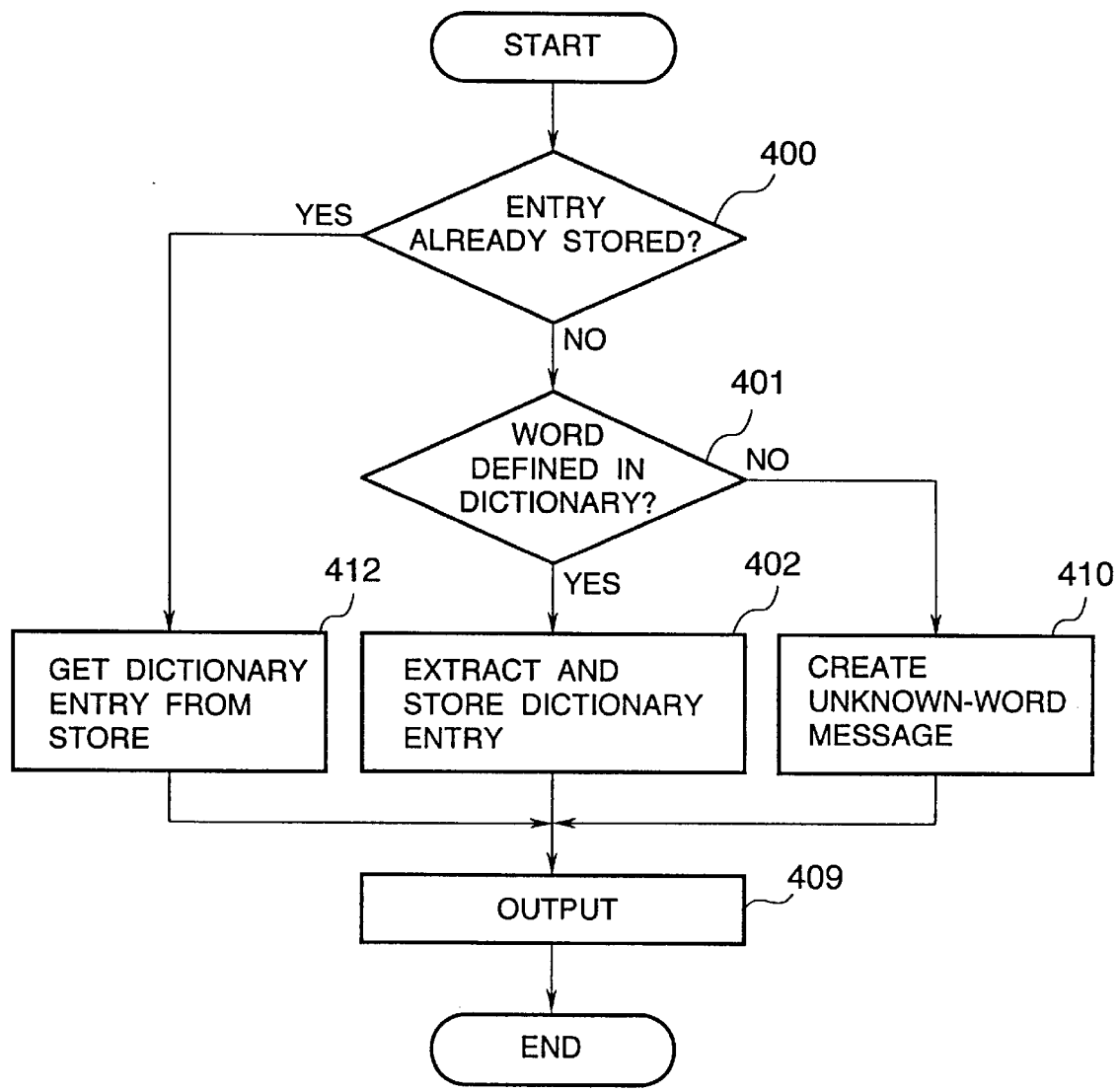
FIG. 41 is a flowchart illustrating the operation of the dictionary entry extractor in the sixth embodiment.

Referring to FIG. 41, when activated by the linked document server 2, the dictionary entry extractor 8 starts by checking whether a dictionary entry for the word supplied by the linked document server 2 as a command parameter is already stored in the dictionary entry store 9 (step 400). This step is identical to the corresponding step in the third embodiment. If the dictionary entry is already stored, the dictionary entry extractor 8 reads this dictionary entry from the dictionary entry store 9 (step 412), and outputs the dictionary entry thus read to the linked document server 2 (step 409).

If the dictionary entry is not already stored in the dictionary entry store 9, the dictionary entry extractor 8 proceeds as in the fifth embodiment to look up the word in the electronic dictionary 10 (step 401), copy its dictionary entry (if found) to the dictionary entry store 9 (step 402) or create an unknown-word message (step 410), and output the dictionary entry or unknown-word message to the linked document server 2 (step 409).

Next the overall operation of the sixth embodiment will be briefly described, starting from the point at which the user selects the dictionary mode button, thereby sending a tag attachment command to the linked document server 2.

The linked document server 2 activates the dictionary linker 4, which attaches dictionary look-up command tags to all words in the document, as in the fourth embodiment. The dictionary linker 4 operates according to the flowchart in FIG. 33, producing a result file like the one shown in FIG. 34. This file is sent to the client device 1 and displayed as in FIG. 15.

If the user now selects, for example, the word "storehouses" on the display in FIG. 15, the command "cgi-bin/pick_dic?storehouse" is sent to the linked document server 2 and executed by the dictionary entry extractor 8 according to the flowchart in FIG. 41. If the dictionary entry for "storehouse" has already been stored in the dictionary entry store 9, the dictionary entry extractor 8 quickly returns the stored entry to the linked document server 2, which sends it to the client device 1. If the dictionary entry for "storehouse" has not already been stored in the dictionary entry store 9, the dictionary entry extractor 8 obtains this entry from the electronic dictionary 10, returns the obtained entry to the linked document server 2, and also stores this entry in the dictionary entry store 9 for possible futures use.

If the user selects a word that is not defined in the electronic dictionary 10, the dictionary entry extractor 8 creates a message stating that the selected word is not in the dictionary, and returns this message instead of a dictionary entry.

The sixth embodiment thus has the same advantage as the fourth embodiment in returning a result file quickly, because the dictionary linker 4 attaches tags without accessing either the dictionary entry store 9 or the electronic dictionary 10. In this regard, the sixth embodiment is faster than the third and fifth embodiments.

In returning the definitions of individual words, the dictionary-access-ready document store 6 is generally faster than the fourth embodiment if the word has been looked up before, because the dictionary entry can be obtained from the dictionary entry store 9 instead of the electronic dictionary 10, but slower than the fourth embodiment if the word has not been looked up before, because the dictionary entry must be searched for in the dictionary entry store 9 before being obtained from the electronic dictionary 10, and stored in the dictionary entry store 9 after being obtained from the electronic dictionary 10. In both cases, the sixth embodiment is slower than the fifth embodiment. When the word has been looked up before, the sixth embodiment is also slower than the fifth embodiment, since the fifth embodiment does not require command execution in this case.

The sixth embodiment resembles the fifth embodiment in that dictionary entries are not stored in the dictionary entry store 9 until specifically requested by the user, thereby avoiding the unnecessary storage of dictionary entries that no one wants to see.

Seventh Embodiment

The seventh embodiment differs from the preceding embodiments by attaching dictionary access information to hypertext documents, as well as to other documents.

Figure 42:
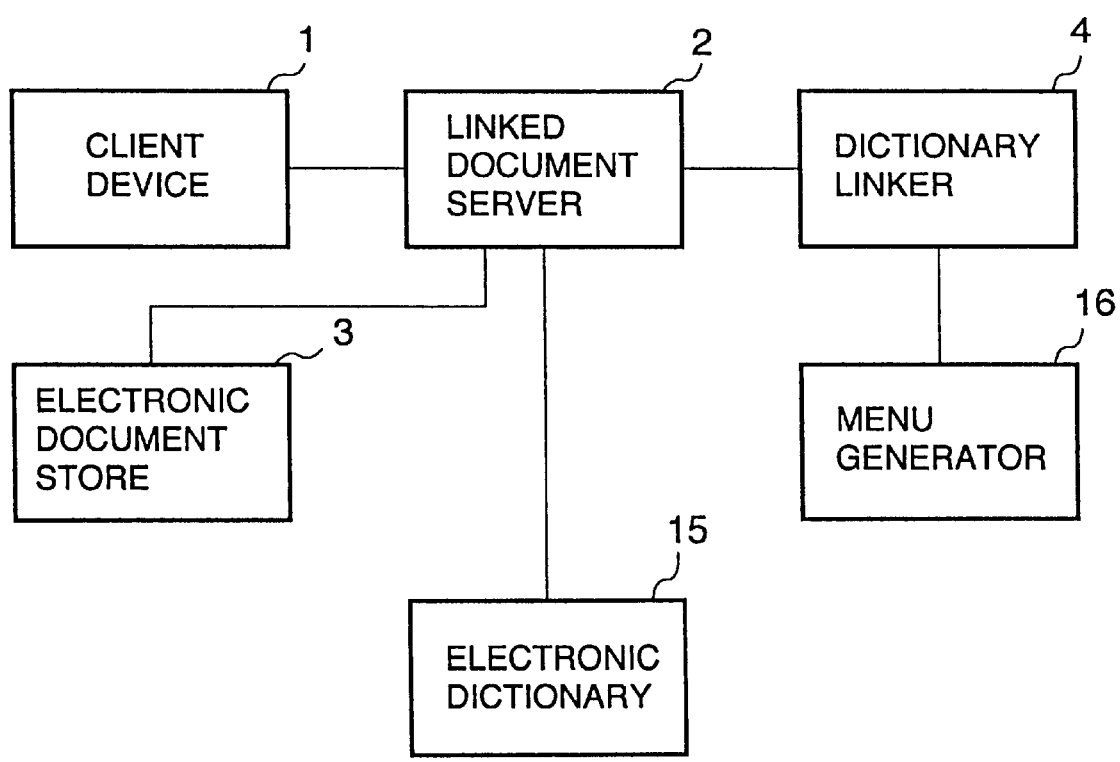
FIG. 42 is a block diagram of a seventh embodiment of the invented document display system.

Referring to FIG. 42, the seventh embodiment comprises the same client device 1 and electronic document store 3 as the first embodiment, a generally similar linked document server 2 and dictionary linker 4, an electronic dictionary 15, and a menu generator 16.

The electronic dictionary 15 comprises, for example, a commercially available electronic dictionary, together with dictionary access software equivalent to the dictionary entry extractor 8 in the fourth embodiment. When the linked document server 2 issues a dictionary look-up command and supplies a word as a command parameter, the electronic dictionary 15 returns the dictionary entry for the supplied word. A single dictionary entry can be returned, as illustrated in FIG. 27, or the electronic dictionary 15 can return dictionary entries for the supplied word and several alphabetically adjacent words, as illustrated in FIG. 16. If the supplied word is not defined in the electronic dictionary 15, the electronic dictionary 15 returns a message to that effect.

Figure 43:
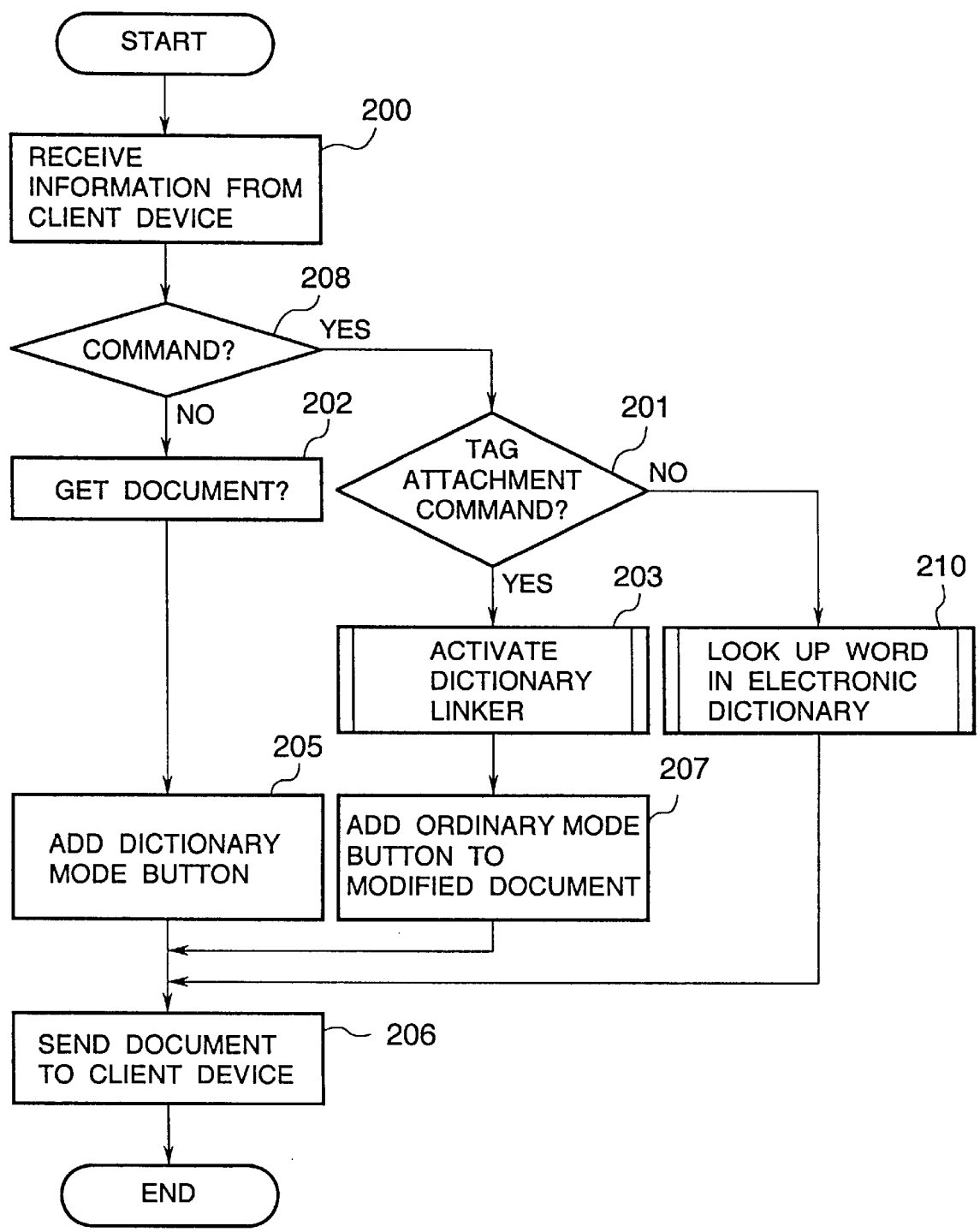
FIG. 43 is a flowchart illustrating the operation of the linked document server in the seventh embodiment.

The linked document server 2 operates as shown in FIG. 43. Upon receiving information from the client device 1 (step 200), the linked document server 2 determines whether the information is a command or a file descriptor (step 208). If the information is a file descriptor, the linked document server 2 gets the described document file from the electronic document store 3 (step 202), attaches a dictionary mode button (step 205), and sends the document back to the client device 1. Differing from the linked document server 2 in the previous embodiments, the linked document server 2 in the seventh embodiment attaches a "Dictionary mode" tag even if the document is a hypertext document, containing links to other documents.

If the information received from the client device 1 is a command, the linked document server 2 determines whether the command is a tag attachment command or a dictionary look-up command (step 201). If the command is a tag attachment command, the linked document server 2 activates the dictionary linker 4 (step 203), then receives the result file output by the dictionary linker 4, adds an ordinary mode button to the result file (step 207), and sends the result file back to the client device 1 (step 206).

If the command is a dictionary look-up command, the linked document server 2 executes the command, thereby activating the software that looks up words in the electronic dictionary 15, and obtaining the contents of a dictionary entry, or an unknown-word message, from the electronic dictionary 15 (step 210). The information obtained from the electronic dictionary 15 is then sent as a document to the client device 1 (step 206).

Figure 44:
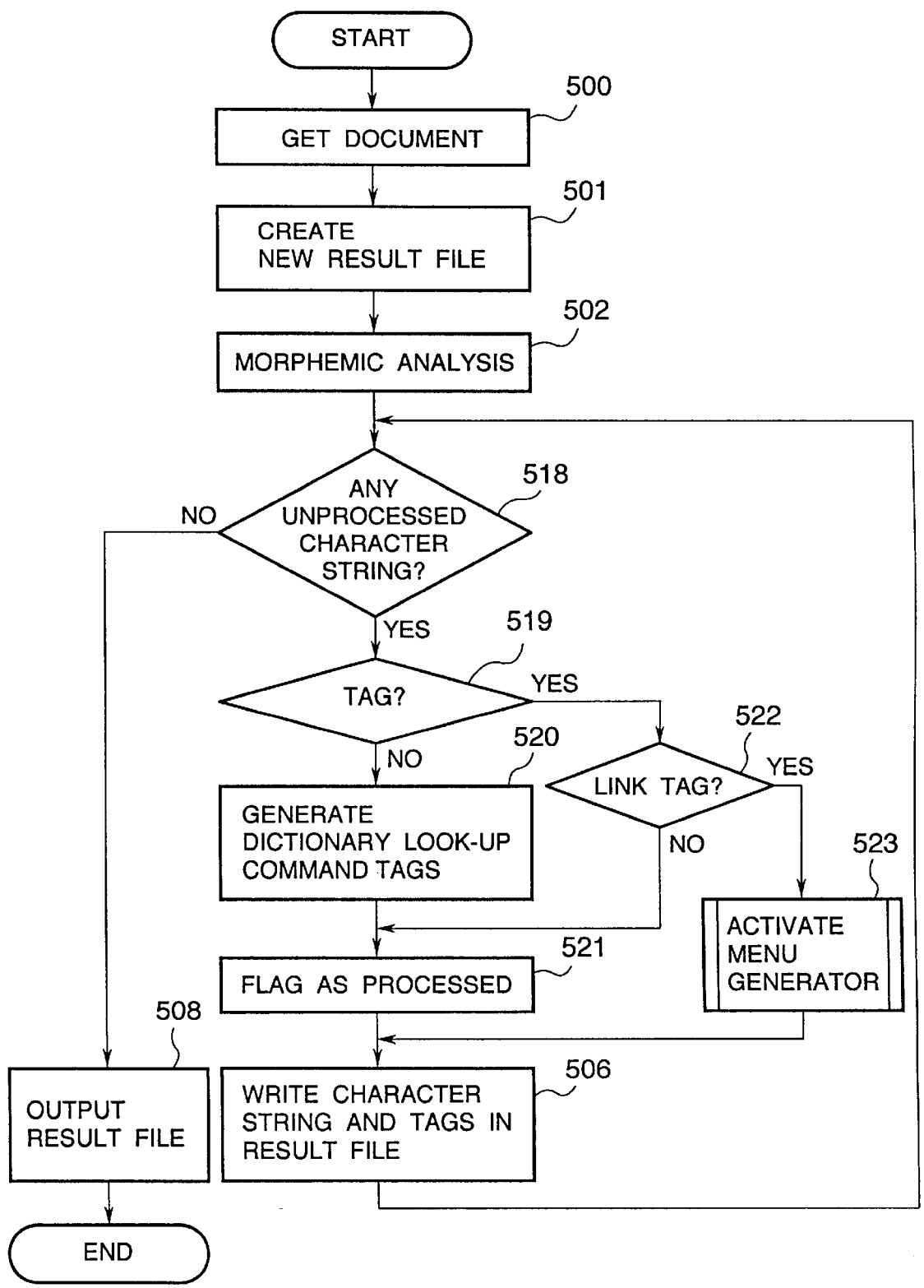
FIG. 44 is a flowchart illustrating the operation of the dictionary linker in the seventh embodiment.

When activated by the linked document server 2, the dictionary linker 4 operates as shown in FIG. 44. After obtaining the relevant document file from the linked document server 2 (step 500) and creating a result file (step 501), the dictionary linker 4 performs a morphemic analysis (step 502). If the document is a hypertext document, the morphemic analysis identifies both character strings that represent words and character strings that represent tags in the document. These character strings are then processed one by one until none are left (until a negative result is obtained in step 518), at which point the result file is output (step 508).

When an affirmative result is obtained in step 518, indicating the presence of an unprocessed character string in the document, the next step is to determine whether the character string is a word or a tag (step 519). If the character string is not a tag, i.e. if the character string is a word, the dictionary linker 4 generates a dictionary look-up command tag for the character string (step 520). For the character string "Corporate," the generated tag is, for example, <A HREF="/cgi-bin/look_up?corporate">. In this tag, "/cgi-bin/look_up" is the command that activates the dictionary access software in the electronic dictionary 15, and "corporate" is the word to be looked up, which is passed to the electronic dictionary 15 as a command parameter. The dictionary linker 4 also generates a closing tag (</A>). Next, the dictionary linker 4 flags the character string (the word "Corporate" in the example above) as having been processed (step 521), and writes the generated tags and the character string in the result file (step 506).

If the character string is a tag, giving an affirmative result in step 519, the dictionary linker 4 proceeds to determine whether the tag is a link tag, that is, an opening tag specifying a hypertext reference to another document (step 522). If the tag is not a link tag, the dictionary linker 4 simply flags the tag character string as having been processed (step 521) and writes the tag character string in the result file (step 506). If the tag is a link tag, however, the dictionary linker 4 activates the menu generator 16 (step 523), then writes the information returned by the menu generator 16 in the result file (step 506).

Figure 45:
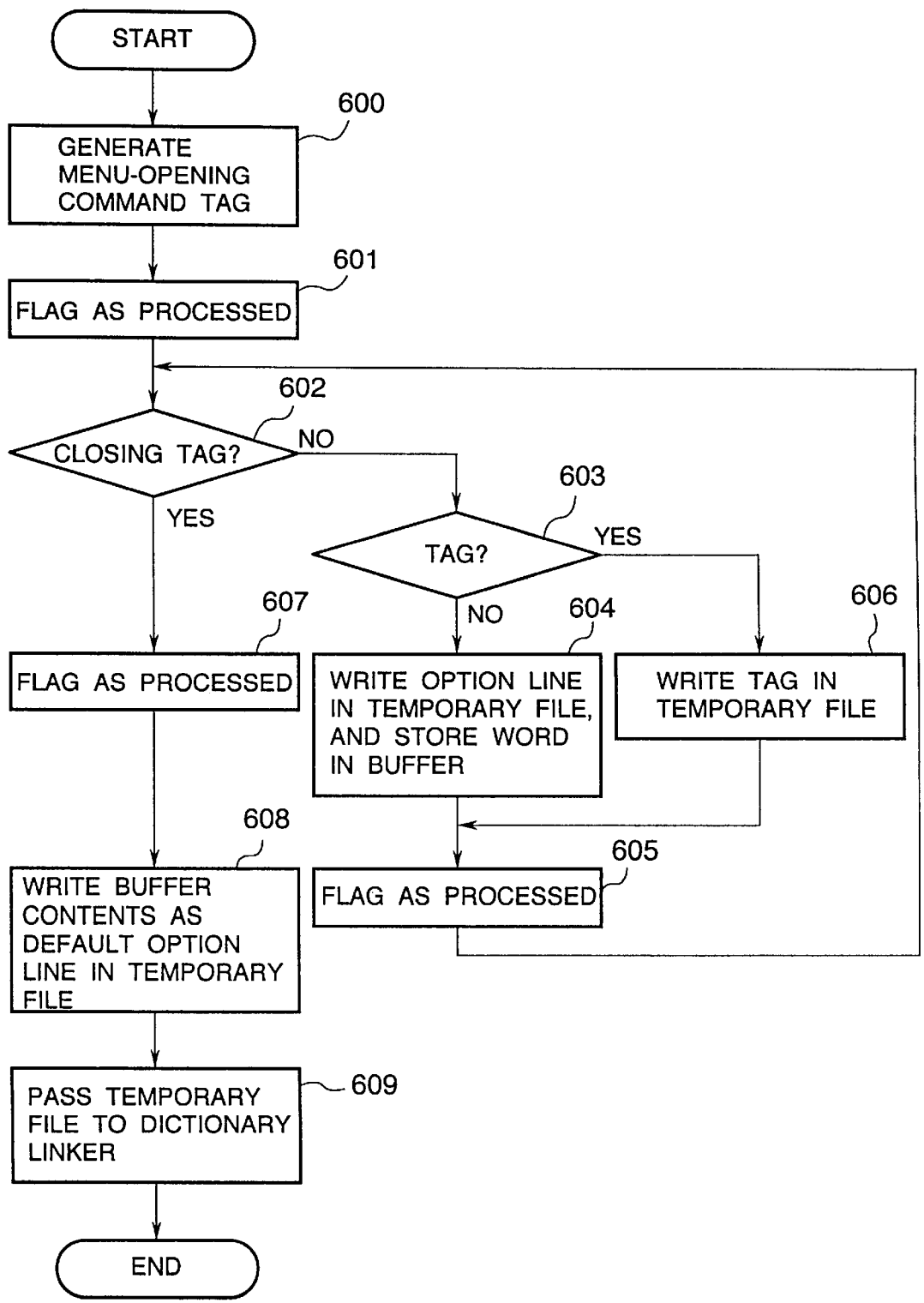
FIG. 45 is a flowchart illustrating the operation of the menu generator in the seventh embodiment.

When activated by the dictionary linker 4, the menu generator 16 receives a pointer to the opening tag found by the dictionary linker 4 to be a link tag. Referring to FIG. 45, the menu generator 16 begins by generating a menu-opening command tag that makes the hypertext reference specified in the link tag into the default menu selection, and specifies dictionary look-up for the other selections (step 600). An example will be shown later. The menu generator 16 writes the menu-opening command tag into a temporary file that will be passed back to the dictionary linker 4, then flags the opening tag as having been processed (step 601).

The menu generator 16 then examines the next character string following the opening tag, and determines whether this character string is the closing tag of the link (step 602). If the character string is not the closing tag, the menu generator 16 determines whether the character string is any type of tag (step 603). If the character string is not a tag, i.e. if the character string is a word, the menu generator 16 stores the character string in a buffer, also writes the dictionary form of the character string as an option line in the temporary file to be passed back to the dictionary linker 4 (step 604), and flags the character string as having been processed (step 605). If the character string is a tag, the dictionary linker 4 writes the character string into the temporary file (step 606) and flags the character string as having been processed (step 605). After step 605, the menu generator 16 returns to step 602 to process the next character string.

When the closing tag is encountered in step 602, the menu generator 16 flags this tag as having been processed (step 607), then writes the contents of the above-mentioned buffer as a selected-option line, describing the default option, in the temporary file (step 608), adds a menu closing tag, and passes the temporary file to the dictionary linker 4 (step 609).

Next, the overall operation of the seventh embodiment will be described in relation to the "Corporate Guidance" hypertext document shown earlier. The file descriptor of this document will be assumed to be the word "guidance."

Figures 46, 47:
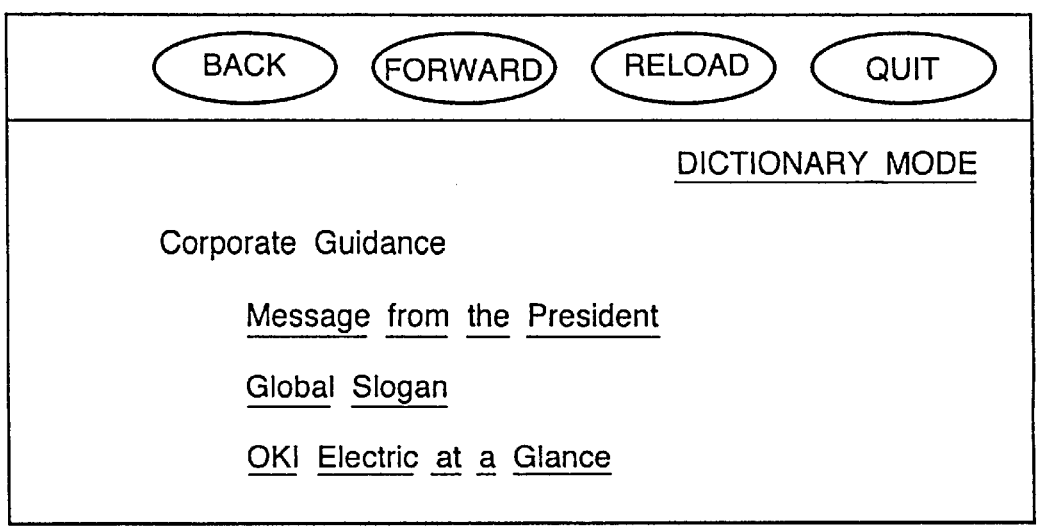
FIG. 46 illustrates part of a document file output by the linked document server in the seventh embodiment.
FIG. 47 shows how this document file is displayed by the client device.

When the user enters "guidance" on the screen shown in FIG. 12, for example, the linked document server 2 obtains the "Corporate Guidance" file from the electronic document store 3, adds a dictionary mode button, and sends the resulting document to the client device 1 in the form shown in FIG. 46. The first line 22 is the line added by the linked document server 2, comprising an opening tag containing the "/cgi-bin/into_the_dic" command, then the words "Dictionary mode," then a closing tag. The other lines contain the body of the document, including formatting tags and link tags. For example, the link tag <A HREF= "message"> is a hypertext reference to a document having the file descriptor "message" and containing a presidential message. The client device 1 displays the document as shown in FIG. 47.

If the user selects the dictionary mode button in FIG. 46, the linked document server 2 receives and executes the "/cgi-bin/into_the_dic" command, thereby activating the dictionary linker 4, which in turn activates the menu generator 16. The dictionary linker 4 and menu generator 16 together generate a result file with the contents 34 shown in FIG. 48.

The first line in the result file contents 34 comprises the tag <A HREF="/cgi-bin/look_up?corporate"> described above, followed by the word "corporate" and a closing tag (</A>). This is followed by a similar line for the word "Guidance." After a pair of formatting tags, there then appears a menu-opening command tag generated by the menu generator 16 from the tag <A HREF="message">.

The word SELECT identifies this command tag as a menu-opening tag. The name of the menu is given as "select1." Arbitrary names such as "select1," "select2," and so on can be assigned. Next, "onFocus='ref(message)'" indicates that the default menu selection is a hypertext reference to a document with the file descriptor "message." The following "onChange='lookdic(option)" indicates that if the user changes the menu selection from the default selection, the menu option selected by the user is to be looked up in the electronic dictionary 15. Specifically, "lookdic" is a function executed by the client device 1, and the word "option" indicates that a selected option is to be supplied as an argument of the function.

The next four lines are option lines written by the menu generator 16, comprising the dictionary forms of the words "Message," "from," "the," and "President," each preceded by an <OPTION> tag and followed by the notation "(dic)," indicating that this option selects the dictionary entry of the given word.

These lines are followed by a </SELECT> tag, which is a closing tag indicating the end of the "select1" menu. The result file continues with similar menus for "Global Slogan" and "OKI Electric at a Glance."

The linked document server 2 adds an ordinary mode button to this result file by adding an initial line 35 giving "guidance" as a hypertext reference, and sends the resulting document to the client device 1. The client device 1 displays the received document as shown in FIG. 49. The underlines under the words "Corporate" and "Guidance" indicate that these words can be looked up in the dictionary. The three items "Message from the President," "Global Slogan," and "OKI Electric at a Glance" are presented as buttons that call forth menus.

If the user selects the word "Corporate" with the pointing device, the linked document server 2 receives and executes the command "/cgi-bin/look_up?corporate," causing the electronic dictionary 15 to return the dictionary entry for this word. The user then sees a display similar to FIG. 16 or 27, except that the Japanese definition of "corporate" is given instead of the definition of "storehouse."

Figure 50:
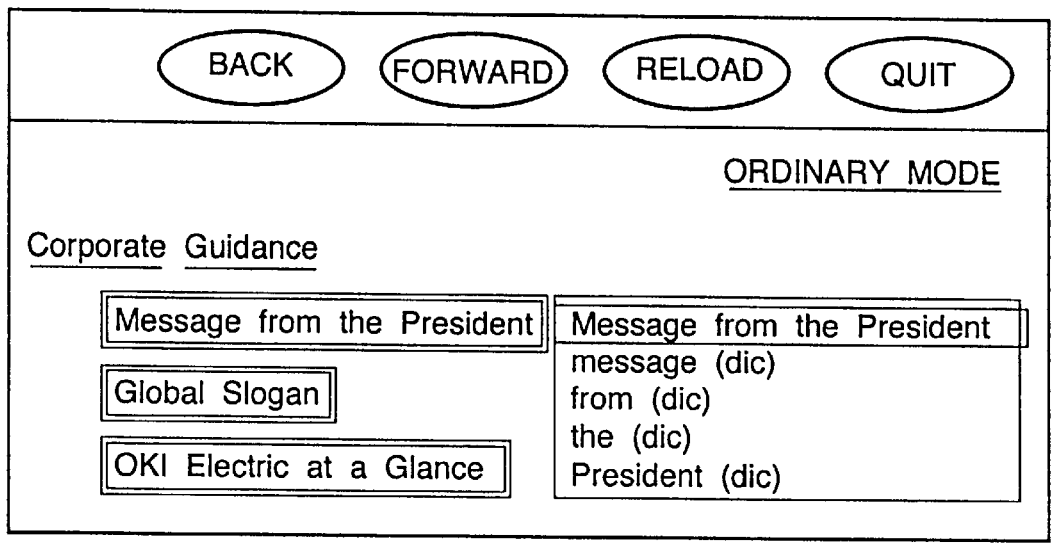
FIG. 50 shows a menu displayed when the user selects a certain button in the display in FIG. 49.

If the user selects the "Message from the President" button, however, the tags and other information shown in FIG. 48 cause the client device 1 to display a menu beside the selected button, as shown in FIG. 50. The top line "Message from the President" in this menu is highlighted to indicate that this is the default selection. If the user chooses this selection, by pressing a button on the pointing device, for example, the file descriptor "message" will be sent to the linked document server 2, which will return the corresponding document, and the user will be able to read a presidential message, as if he had selected "Message from the President" on the display in FIG. 47.

Figure 51:
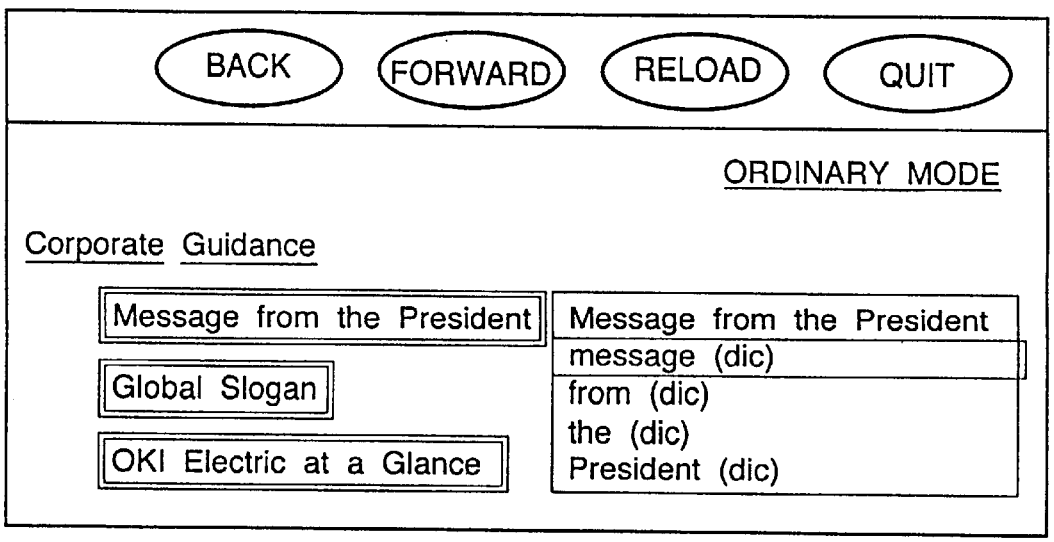
FIG. 51 shows the same menu with "message" selected for dictionary access.

If the user wants to know the Japanese meaning of the word "message," he can use the pointing device to change the menu selection as shown in FIG. 51. When this menu item is selected, the client device 1 executes the "lookdic" function shown in FIG. 48 with the word "message" as an argument. This function generates and sends to the linked document server 2 a "/cgi-bin/look_dic?message" command. By executing this command, the linked document server 2 obtains the dictionary entry for "message" from the electronic dictionary 15, and sends this dictionary entry back to the client device 1. The user then sees the Japanese definition of "message."

The seventh embodiment is similar to the fourth embodiment in that dictionary entries are looked up when specifically requested, instead of when the dictionary mode button is selected, and in that the dictionary entries and result file are not stored. By using menus as described above, however, the seventh embodiment is able to provide dictionary access from hypertext documents as well as from other documents, which is a considerable benefit for the user.

As a variation of the seventh embodiment, menu-opening tags and option tags like the ones shown in FIG. 48 can be placed in the document files stored in the electronic document store 3, thereby providing the user with quicker dictionary access to the words appearing in hypertext links. This feature helps users to move from one hypertext document to another when the documents are in a foreign language. When the user reaches a document he wants to read more thoroughly, he can select the dictionary mode button on the document to have dictionary look-up command tags added to all words in the document, in this variation, the menu generator 16 is used to generate the menu-tagged documents stored in the electronic document store 3.

Eighth Embodiment

The eighth embodiment also provides dictionary access from hypertext documents, but does so by removing the hypertext links to other documents in the dictionary-access mode.

Figure 52:
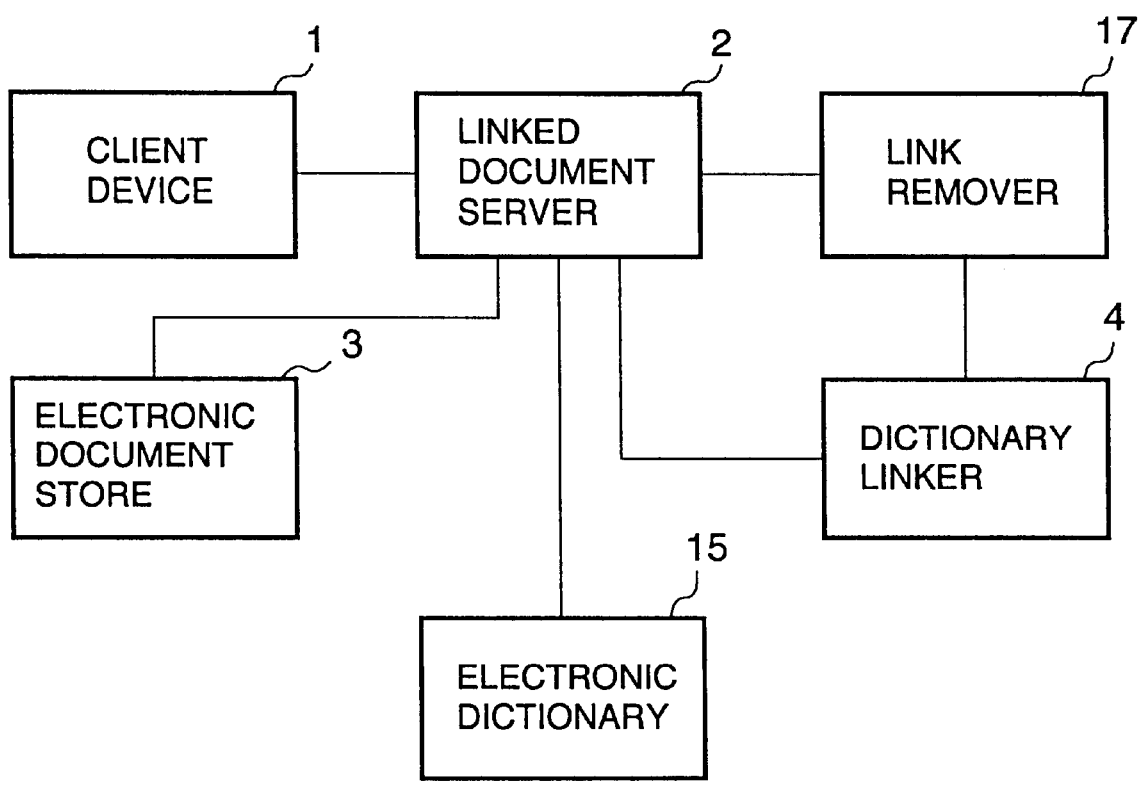
FIG. 52 is a block diagram of an eighth embodiment of the invented document display system.

Referring to FIG. 52, the eighth embodiment comprises the same client device 1, electronic document store 3, and electronic dictionary 15 as the seventh embodiment, a generally similar linked document server 2 and dictionary linker 4, and a link remover 17. The link remover 17 communicates with both the linked document server 2 and the dictionary linker 4.

The linked document server 2 in the eighth embodiment differs from the linked document server 2 in the seventh embodiment in the following regard: upon receiving a tag attachment command, instead of activating the dictionary linker 4, the linked document server 2 activates the link remover 17. The link remover 17 subsequently activates the dictionary linker 4, and the linked document server 2 obtains a result file from the dictionary linker 4 as in the seventh embodiment.

Figure 53:
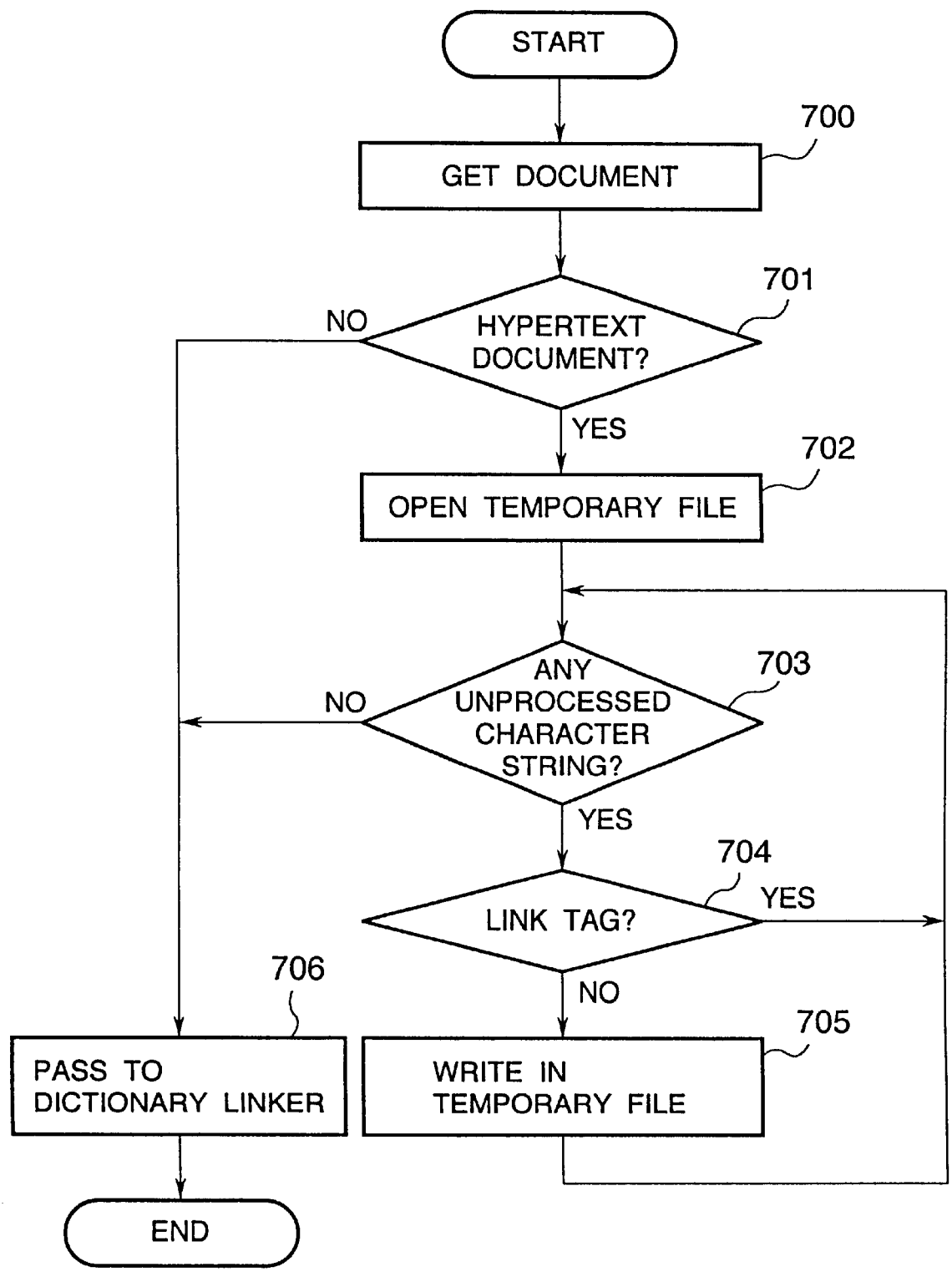
FIG. 53 is a flowchart illustrating the operation of the link remover in the eighth embodiment.

When activated by the linked document server 2, the link remover 17 operates as shown in FIG. 53. The link remover 17 first obtains a copy of the document for which the tag attachment command was issued, by having the linked document server 2 transfer the relevant document file from the electronic document store 3 (step 700). Next, the link remover 17 determines whether this document is a hypertext document (step 701).

If the document is a hypertext document, the link remover 17 opens a temporary file (step 702), then starts reading character strings from the top of the document, continuing as long as any character strings remain to be read (step 703). While reading character strings, the link remover 17 looks for a character string that is the opening or closing tag of a hypertext link to another file (step 704). When such a tag is read, the character string constituting the tag is discarded, and processing returns to step 703. Other character strings are written in the temporary file (step 705), after which processing returns to step 703.

When all character strings have been processed in this way, the temporary file consists of the entire contents of the hypertext document, except for the hypertext links. The dictionary linker 4 is then activated, and the temporary file is passed to the dictionary linker 4 (step 706).

If the document is found not to be a hypertext document in step 701, the document is passed without alteration to the dictionary linker 4 (step 706).

Upon receiving a temporary file or unaltered document from the link remover 17, the dictionary linker 4 operates essentially as in the fourth embodiment, following the flowchart in FIG. 33. The only differences between the dictionary linkers 4 in the fourth embodiment and eighth embodiment are that the dictionary linker 4 in the eighth embodiment receives the document file from the link remover 17 instead of from the linked document server 2 in step 500, and the dictionary look-up command tags generated in step 514 invoke the electronic dictionary 15, instead of the dictionary entry extractor. After generating such command tags for all words and writing the words and command tags in the result file, the dictionary linker 4 passes the result file to the linked document server 2.

Next, the overall operation of the eighth embodiment will be described, again in relation to the "Corporate Guidance" hypertext document.

When the user retrieves this document, the linked document server 2 attaches a dictionary mode button as in the seventh embodiment, and the user sees the display shown in FIG. 47. If the user selects the dictionary mode button, the link remover 17 obtains a copy of the "Corporate Guidance" document from the linked document server 2 and removes the hypertext links. Tags such as the <A HREF="message"> and </A> shown in FIG. 46 are removed, for example. The dictionary linker 4 next inserts dictionary look-up command tags. For example, the tags <A HREF="/cgi-bin/look_up?corporate"> and </A> are inserted before and after the word "Corporate," and <A HREF="/cgi-bin/look_up?message"> and </A> are inserted before and after the word "Message." As a result, the user sees the display in FIG. 54, in which each individual word in the "Corporate Guidance" document is underlined to indicate that the word can be looked up in the electronic dictionary 15.

Figure 54:
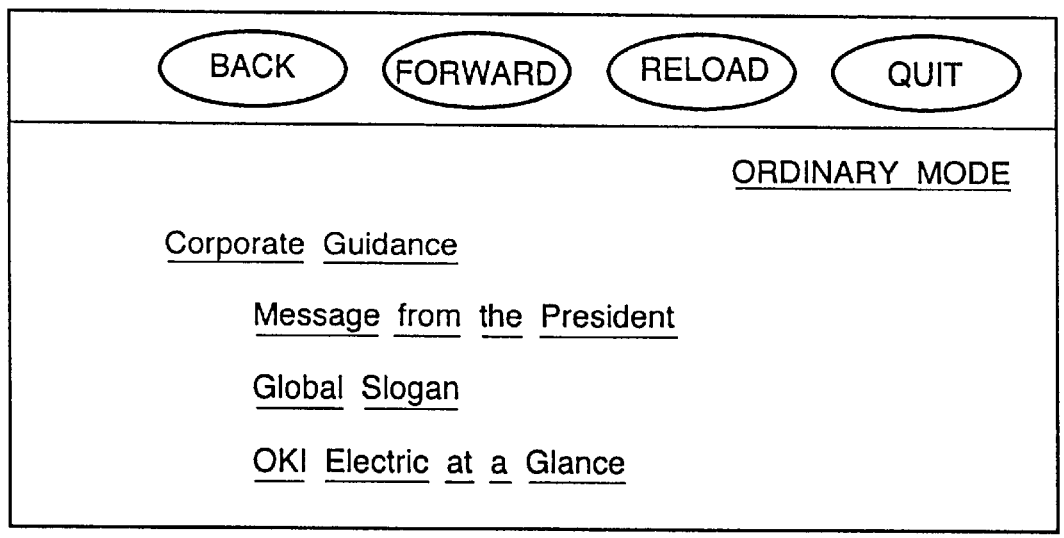
FIG. 54 illustrates a document displayed by the eighth embodiment in the dictionary-access mode.

The user can look up words by selecting them on the display in FIG. 54 with the pointing device. When all necessary words have been looked up, the user can select the ordinary mode button to return to the display in FIG. 47. From FIG. 47, the user can retrieve other documents by selecting the underlined items with the pointing device.

Compared with the seventh embodiment, the eighth embodiment is more convenient for the user to operate, in that dictionary definitions can be obtained without going through a menu selection process. The eighth embodiment is less convenient, however, in that the user cannot proceed directly from the display in FIG. 54 to another linked document.

Ninth Embodiment

The ninth embodiment attaches dictionary access information only to selected words in a non-hypertext document, instead of attaching such information to all words.

Figure 55:
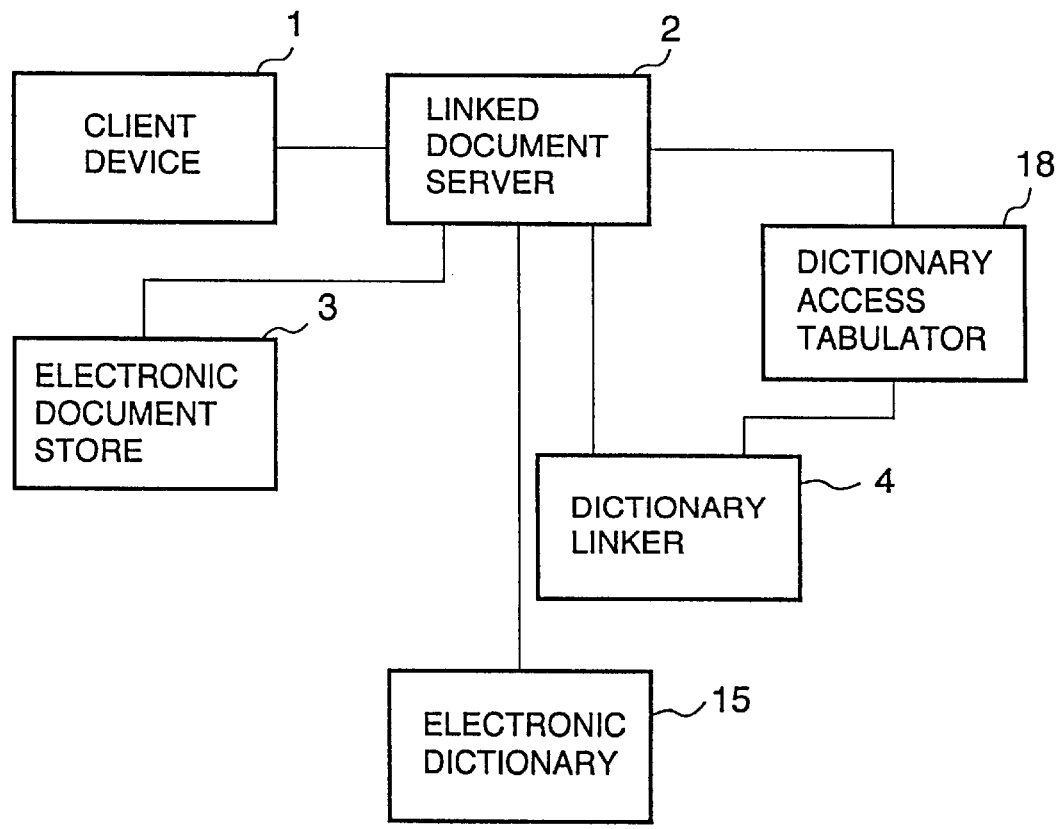
FIG. 55 is a block diagram of a ninth embodiment of the invented document display system.

Referring to FIG. 55, the ninth embodiment comprises the same client device 1, electronic document store 3, and electronic dictionary 15 as the eighth embodiment, a generally similar linked document server 2 and dictionary linker 4, and a dictionary access tabulator 18, which is coupled to the linked document server 2 and dictionary linker 4. The dictionary access tabulator 18 keeps records indicating the frequency with which dictionary definitions of different words are requested, obtaining this information from the linked document server 2, and supplies this information on request to the dictionary linker 4.

The linked document server 2, dictionary linker 4, and dictionary access tabulator 18 may all reside in the same computer system or workstation, for example, or they may reside in two or more separate systems. The functions of the dictionary access tabulator 18 may also be built into the electronic dictionary 15, in which case a separate dictionary access tabulator 18 is unnecessary.

Figure 56:
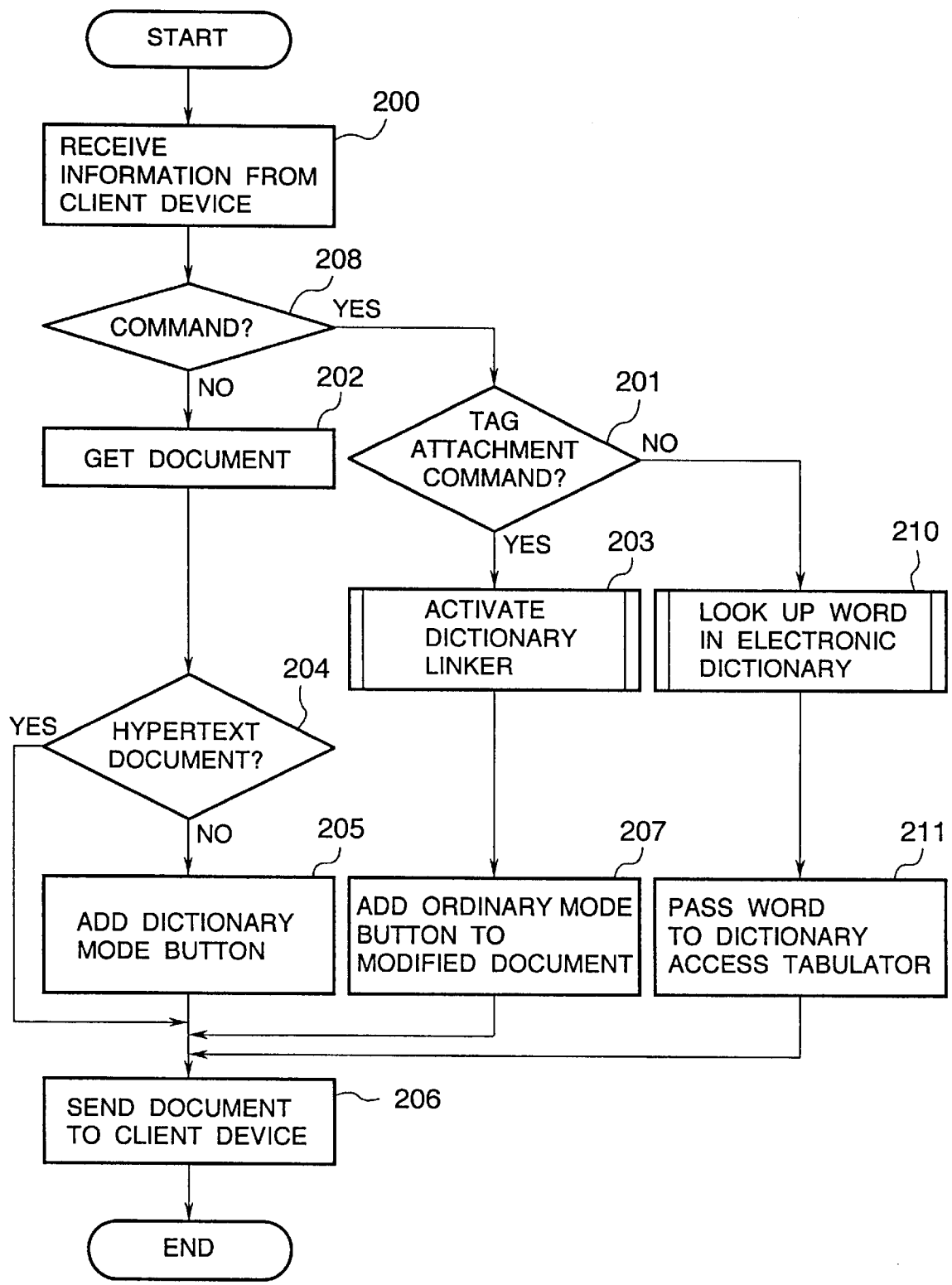
FIG. 56 is a flowchart illustrating the operation of the linked document server in the ninth embodiment.

The linked document server 2 in the ninth embodiment operates as shown in FIG. 56. When the linked document server 2 receives a file descriptor, it obtains the requested document and attaches a dictionary mode button if the document is not a hypertext document (steps 200, 208, 202, 204, and 205). When the linked document server 2 receives a tag attachment command, it activates the dictionary linker 4, and attaches an ordinary mode button to the result file output by the dictionary linker 4 (steps 200, 208, 201, 203, and 207). These steps are identical to the corresponding steps performed by the linked document server 2 in the fourth embodiment, shown in FIG. 32.

When the linked document server 2 receives a dictionary look-up command, it executes the command (step 210) as in the eighth embodiment, obtaining the dictionary entry for the requested word from the electronic dictionary 15, or an unknown-word message if the word is not in the dictionary. In addition, the linked document server 2 passes the word to the dictionary access tabulator 18 (step 211).

After step 205, 207, or 211 in FIG. 56, the linked document server 2 sends the document or dictionary entry obtained from the above processing to the client device 1 (step 206).

Figure 57:
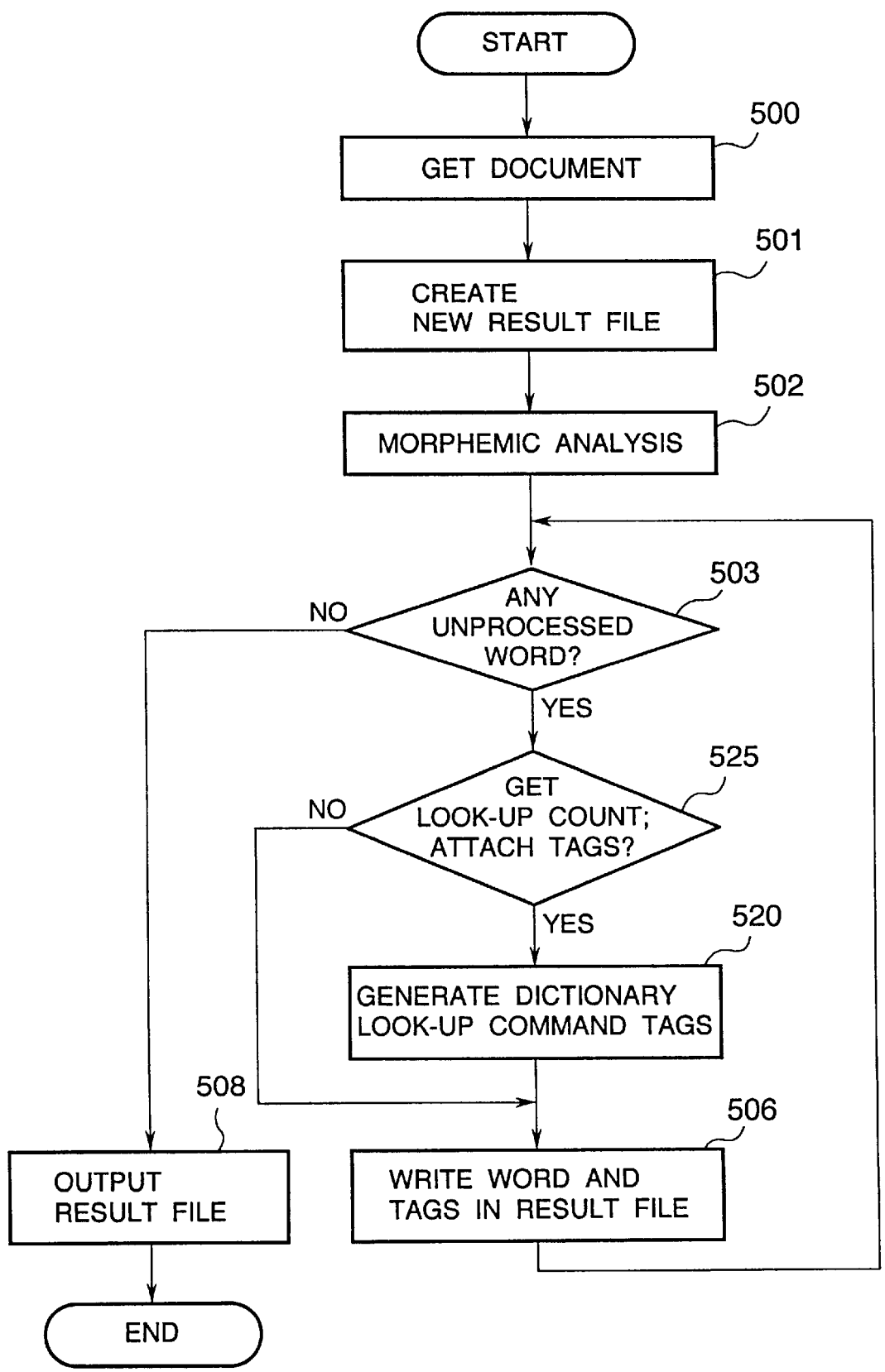
FIG. 57 is a flowchart illustrating the operation of the dictionary linker in the ninth embodiment.

When activated by the linked document server 2, the dictionary linker 4 operates as shown in FIG. 57. As in the first embodiment, after obtaining a copy of the document to be tagged (step 500), creating a result file (step 501), and performing a morphemic analysis (step 502), the dictionary linker 4 processes words one by one until no unprocessed words remain (giving a negative result in step 503), then outputs the result file to the linked document server 2 (step 508).

When an affirmative result is obtained in step 503, indicating the presence of an unprocessed word, the dictionary linker 4 sends the word to the dictionary access tabulator 18 together with a command asking the dictionary access tabulator 18 to indicate the number of times the word has been looked up in the past, receives this information from the dictionary access tabulator 18, and decides whether to attach dictionary access information to the word (step 525). This decision can be made, for example, according to a threshold: dictionary access information is attached to words that have been looked up at most N times in the past, and is not attached to words that have been looked up more than N times in the past, where N is a non-negative integer. The threshold value N may vary according to the part of speech. For example, the value of N could be set equal to zero for articles, conjunctions, pronouns, and prepositions, and to ten for nouns, verbs, adjectives, and adverbs, in this case, the dictionary linker 4 will stop attaching dictionary access information to articles, conjunctions, pronouns, and prepositions after these words have been looked up once, but will continue attaching dictionary access information to nouns, verbs, adjectives, and adverbs until these words have been looked up eleven times.

When the dictionary linker 4 decides in step 525 to attach dictionary access information to a word, it generates a dictionary look-up command tag and a corresponding closing tag (step 520), and writes the word and these tags in the result file (step 506). When the dictionary linker 4 decides not to attach dictionary access information, step 520 is skipped, and only the word is written in the result file in step 506. After step 506, the dictionary linker 4 returns to step 503 to process the next word.

Next, the operation of the dictionary access tabulator 18 will be described with reference to FIGS. 58, 59, and 60.

Figures 58, 59:
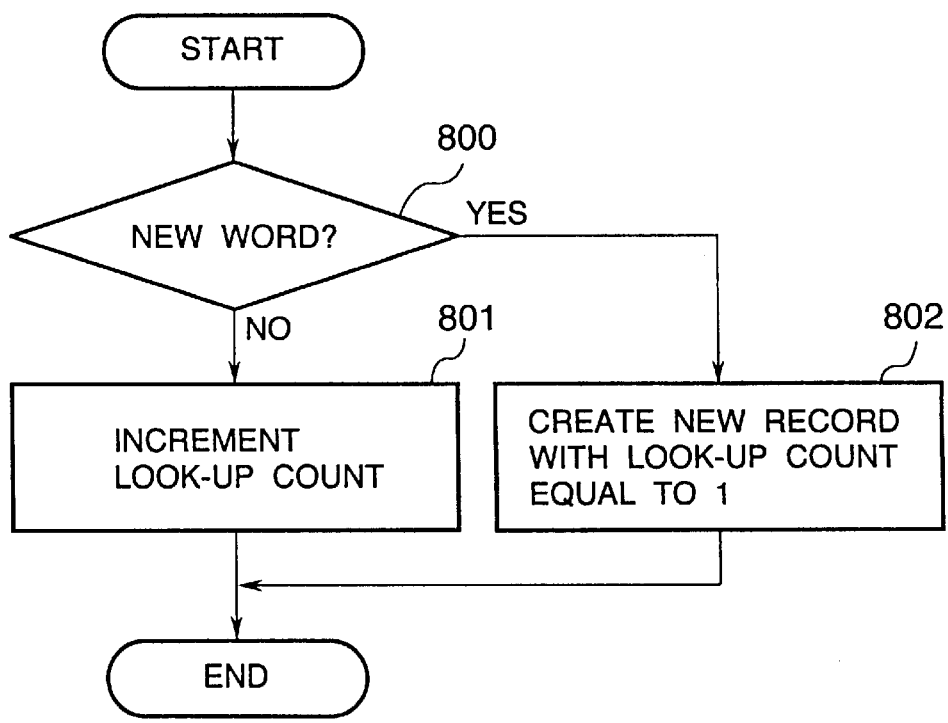
FIG. 58 illustrates part of a table maintained by the dictionary access tabulator in the ninth embodiment.
FIG. 59 is a flowchart illustrating the operation of the dictionary access tabulator in the ninth embodiment.

The dictionary access tabulator 18 maintains a table of word look-up records as illustrated in FIG. 58. Each record comprises a word and the number of times the word has been sent to the dictionary access tabulator 18 from the linked document server 2; that is, the number of times the linked document server 2 has received a dictionary look-up command for the word. This number of times will be referred to as the look-up count. The table in FIG. 58 indicates that the word "we" has been looked up once, for example, and the word "draw" three times.

When supplied with a word by the linked document server 2, the dictionary access tabulator 18 operates as shown in FIG. 59. First, the dictionary access tabulator 18 determines whether the word is a new word, meaning a word that does not already appear in the table of word look-up counts (step 800). If the supplied word already appears, the dictionary access tabulator 18 increments its look-count by one (step 801). If the supplied word does not already appear, the dictionary access tabulator 18 creates a new record in the table of word look-up counts, listing the supplied word with a look-up count of one (step 802).

Figures 60, 61:
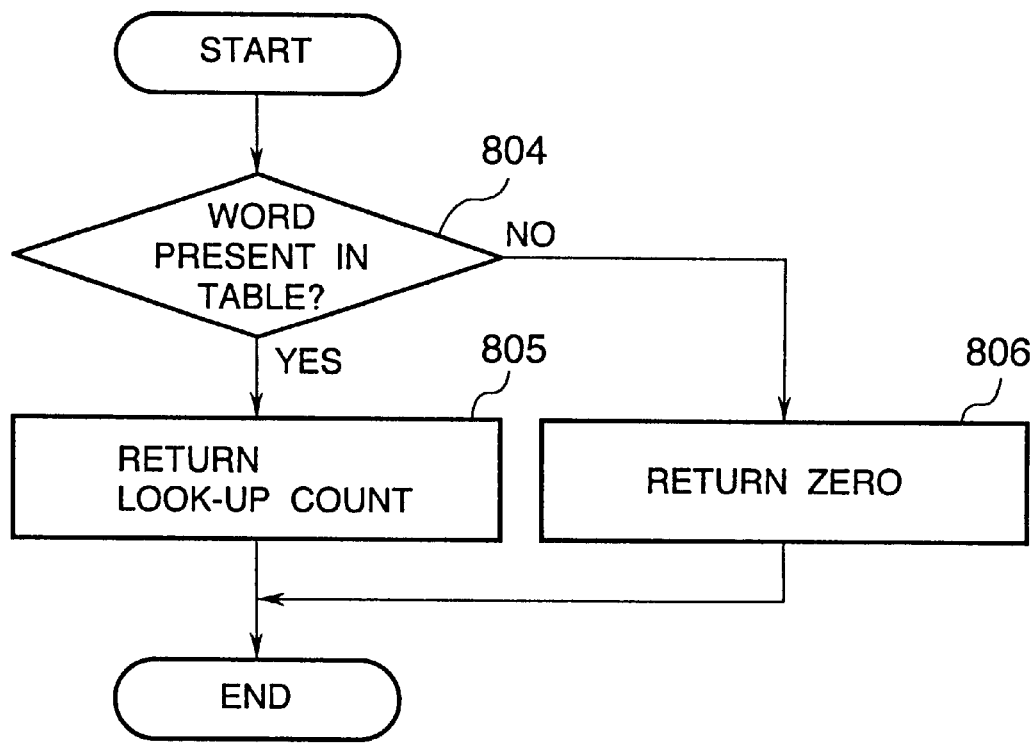
FIG. 60 is another flowchart illustrating the operation of the dictionary access tabulator in the ninth embodiment.
FIG. 61 illustrates part of a result file output by the dictionary linker 4 and linked document server 2 in the ninth embodiment.

When supplied with a word by the dictionary linker 4, the dictionary access tabulator 18 operates as shown in FIG. 60. First, the dictionary access tabulator 18 determines whether the word appears in the table of word look-up counts (step 804). If the supplied word appears, the dictionary access tabulator 18 returns its look-up count to the dictionary linker 4 (step 805). If the word does not appear, the dictionary access tabulator 18 returns a look-up count of zero to the dictionary linker 4 (step 806).

Next, the overall operation of the ninth embodiment will be described.

Starting from the initial screen shown in FIG. 12, if the user enters the file descriptor of the "Corporate Guidance" document, then selects the hypertext link to the "Global Slogan" document, he will see first the display in FIG. 13 (without a dictionary mode button, because the "Corporate Guidance" document is a hypertext document), then the display in FIG. 14 (with a dictionary mode button, because the "Global Slogan" document is not a hypertext document).

If the user selects the dictionary mode button on the display in FIG. 14, the linked document server 2 activates the dictionary linker 4, which generates a result file according to the look-up counts maintained by the dictionary access tabulator 18. The linked document server 2 adds an ordinary mode button, and sends this file back to the client device 1.

FIG. 61 shows an example of the result file returned by the linked document server 2 to the client device 1 when the word look-up count table has the contents shown in FIG. 58, and the threshold values of zero and ten are used as described above. The first line in FIG. 61 is the ordinary mode button added by the linked document server 2. The next line contains only the word "We," because the look-up count (one) for this word exceeds the threshold value (zero) for pronouns. The next line contains the word "draw" together with a dictionary look-up command tag and closing tag, because the look-up count (three) for this word does not exceed the threshold value (ten) for verbs. Other lines are generated similarly by the dictionary linker 4. The client device 1 displays this result file as shown in FIG. 62.

Figures 62, 63:
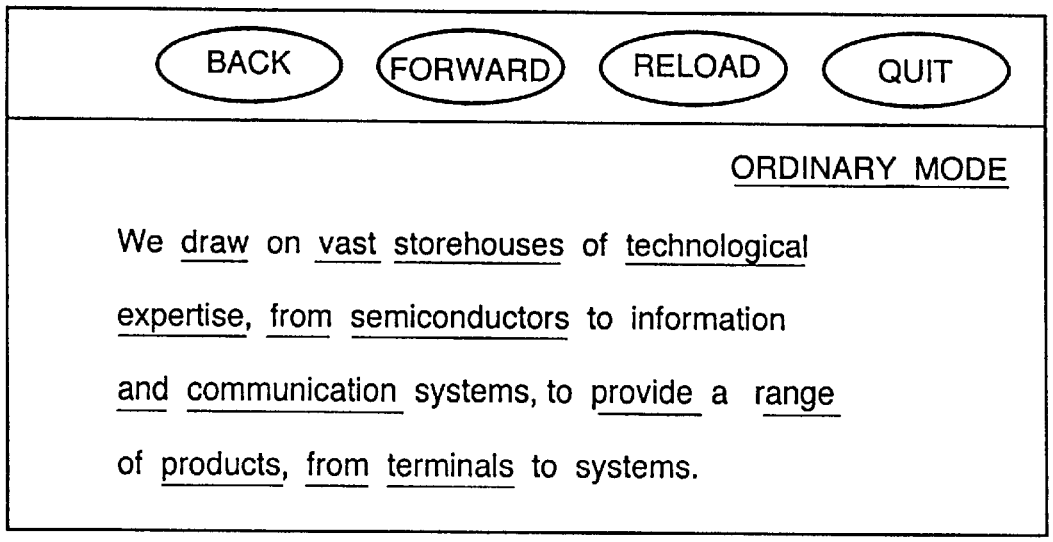
FIG. 62 illustrates the document In FIG. 14 displayed in dictionary-access mode by the ninth embodiment.
FIG. 63 illustrates part of a result file output by the dictionary linker 4 in a variation of the ninth embodiment.

The user can now look up the underlined words in FIG. 62 by selecting them with the pointing device. If the user selects the word "storehouses," for example, he will obtain a Japanese definition as shown in FIG. 16 or 27. If the user selects the word "We," however, no definition will be returned and the display in FIG. 62 will remain unchanged, because no dictionary access tag is attached to this word.

By not underlining words that the user has already looked up a certain number of times, the system reminds the user that he (presumably) already knows these words. More significantly, as the user looks up more and more words, the amount of tag attachment processing that must be carried out by the dictionary linker 4 gradually decreases, and the system's response to selection of the dictionary mode button becomes faster.

Next, a variation of the ninth embodiment will be described. In this variation, the dictionary linker 4 attaches dictionary access information to all words in the document, regardless of their look-up counts, but also attaches tags that vary the way in which each word is displayed, depending on the look-up count of the word. For example, words that have not been looked up before can be displayed in the color blue, words that have been looked up from one to five times in the color green, and words that have been looked up more than five times in the color red.

FIG. 63 shows a hypothetical result file generated by the dictionary linker 4 in this case. The tag <FONT=BLUE> in the first line indicates that the words between this tag and the following closing tag </FONT> are to be displayed in the color blue. The word "We" is accordingly displayed in blue. Green and red are specified similarly. In this case the color red informs the user that the word "vast" has been looked at least six times in the past, suggesting that this might be a word worth learning. The display colors thus provide the user with information that can help the user to decide which words to look up.

Instead of changing the colors in which the words are displayed, the dictionary linker 4 can indicate look-up counts in various other ways. For example, the colors of the underlines below the words can be altered, or italic and bold fonts can be used.

Tenth Embodiment

The tenth embodiment adds a learning function to the ninth embodiment. The tenth embodiment keeps track of both the number of times a word is tagged for dictionary access and the number of times the word has been looked up, and stops tagging words that have been frequently tagged but rarely looked up.

Figure 64:
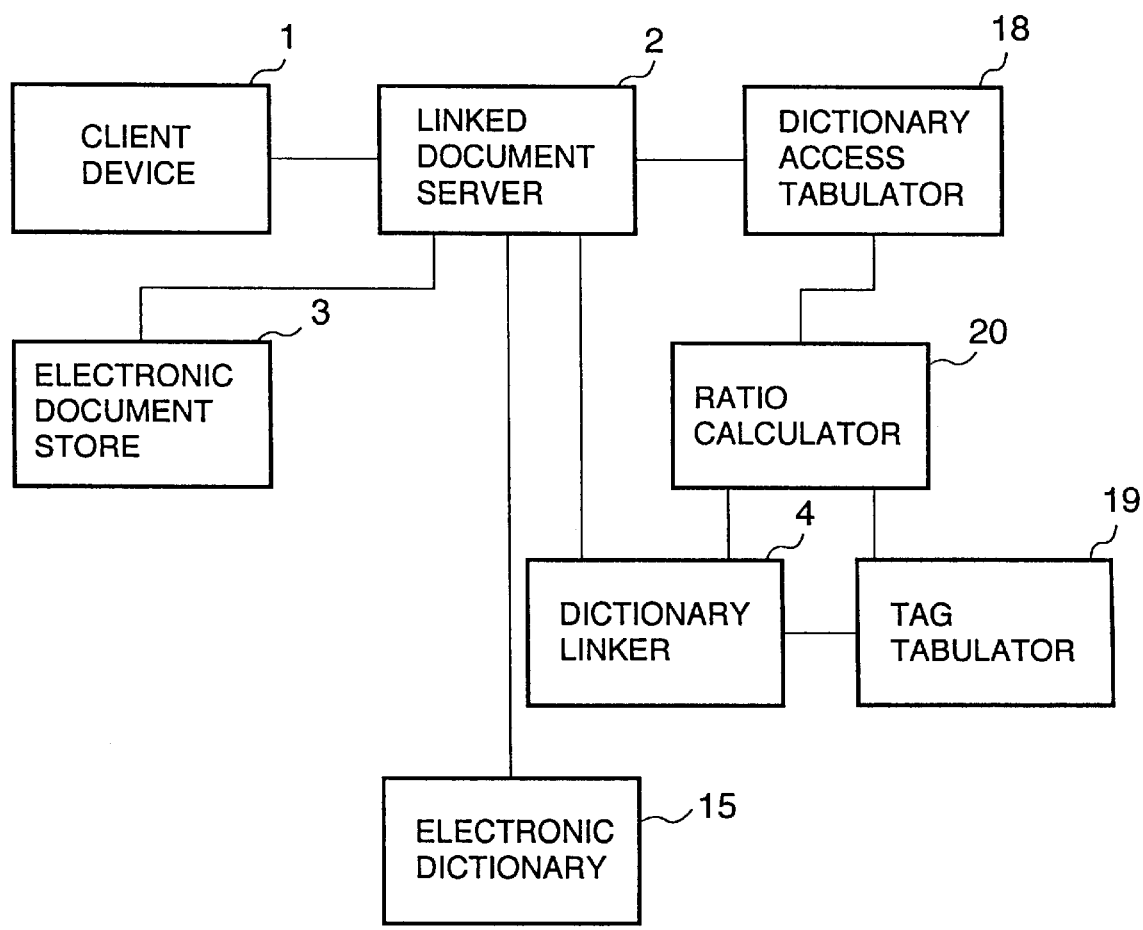
FIG. 64 is a block diagram of a tenth embodiment of the invented document display system.

Referring to FIG. 64, the tenth embodiment comprises the same client device 1, linked document server 2, electronic document store 3, electronic dictionary 15, and dictionary access tabulator 18 as the ninth embodiment, and a generally similar dictionary linker 4. The tenth embodiment also comprises a tag tabulator 19, which is linked to the dictionary linker 4, and a ratio calculator 20, which is linked to the dictionary linker 4, dictionary access tabulator 18, and tag tabulator 19.

Figure 65:
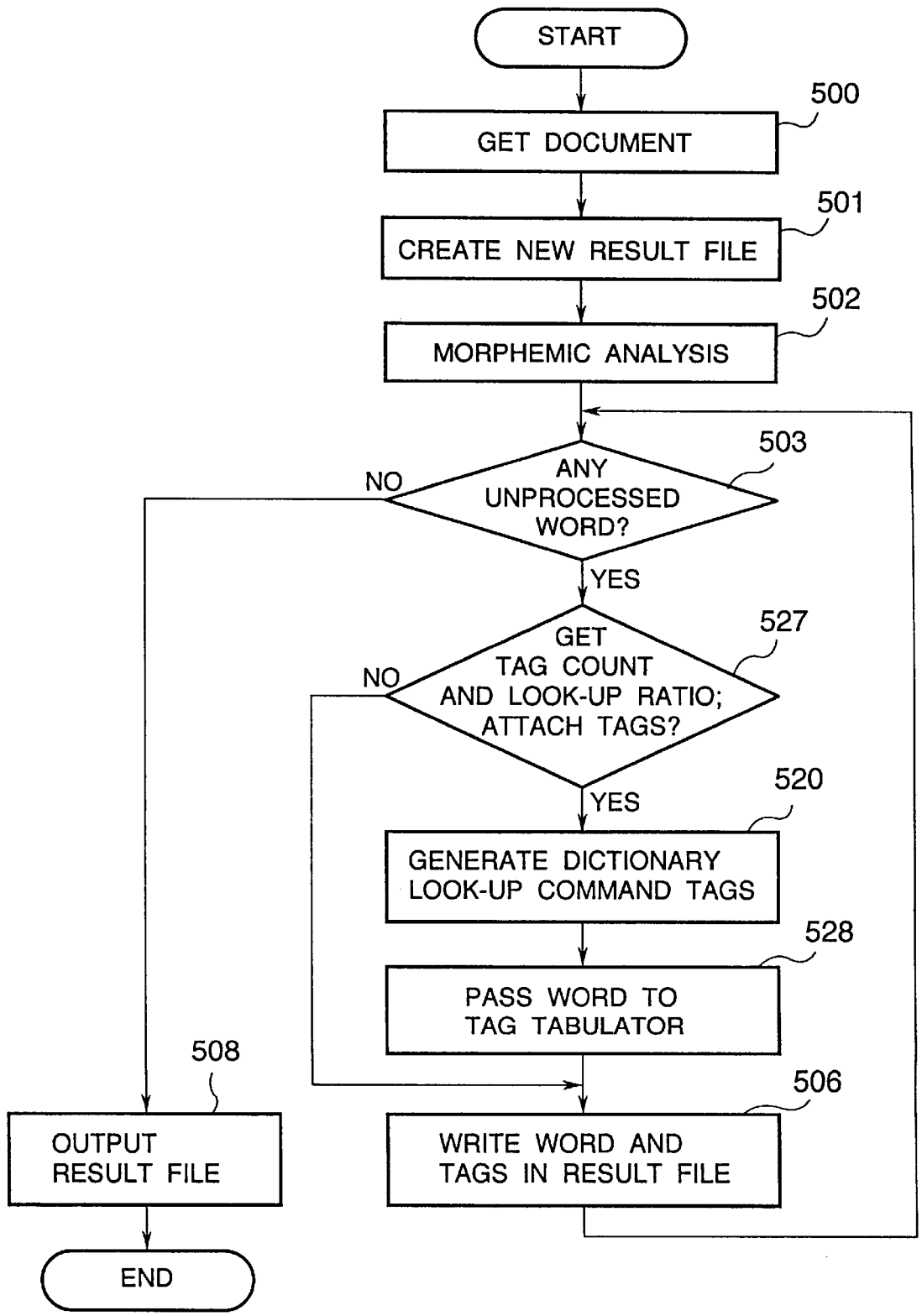
FIG. 65 is a flowchart illustrating the operation of the dictionary linker in the tenth embodiment.

The dictionary linker 4 in the tenth embodiment operates like the dictionary linker 4 in the ninth embodiment, but with two differences. Referring to FIG. 65, one difference is that the dictionary linker 4 in the tenth embodiment decides whether to attach dictionary access information to each word on the basis of a tag count and look-up ratio supplied from the ratio calculator 20 (step 527), instead of on the basis of a look-up count supplied from the dictionary access tabulator 18. The tag count indicates the number of times the word, or a word with the same dictionary form, has been tagged in the past. The look-up ratio indicates what proportion or those times have resulted in actual look-up of the word by the user.

Specifically, the dictionary linker 4 compares the tag count with a first threshold value and the look-up ratio with a second threshold value. If the tag count is equal to or less than the first threshold value, or the look-up ratio is greater than the second threshold, the dictionary linker 4 decides to attach dictionary access information. If the tag count is greater than the first threshold value and the look-up ratio is equal to or less than the second threshold value, the dictionary linker 4 decides not to attach dictionary access information. For example, the dictionary linker 4 can decide to attach dictionary access information unless the word has been tagged more than five times already, but has not been looked up more than three-tenths of the time.

The other difference is that, when the dictionary linker 4 decides to attach dictionary access information, after generating the necessary tags in step 520, the dictionary linker 4 passes the dictionary form of the word being tagged to the tag tabulator 19 (step 528).

The other steps shown in FIG. 65 are identical to the corresponding steps performed by the dictionary linker 4 in the ninth embodiment, shown in FIG. 57, so a step-by-step description will be omitted.

The operation of the tag tabulator 19 is analogous to the operation of the dictionary access tabulator 18, described in the ninth embodiment, so explanatory drawings will be omitted. The tag tabulator 19 maintains a table of records indicating the number of times the dictionary sinker 4 has attached dictionary access information to different words. The table is similar to the table of look-up counts shown in FIG. 58, except that the values indicate tag counts instead of look-up counts. When sent a word by the dictionary linker 4, the tag tabulator 19 searches for the word in the table of tag counts, increments the tag count of the word if the word already appears in the table, and enters the word in a new record with a tag count of one if the word does not appear. When sent a word by the ratio calculator 20, the tag tabulator 19 returns the tag count of the word if the word appears in the table, and returns a tag count of zero of the word does not appear.

Figure 66:
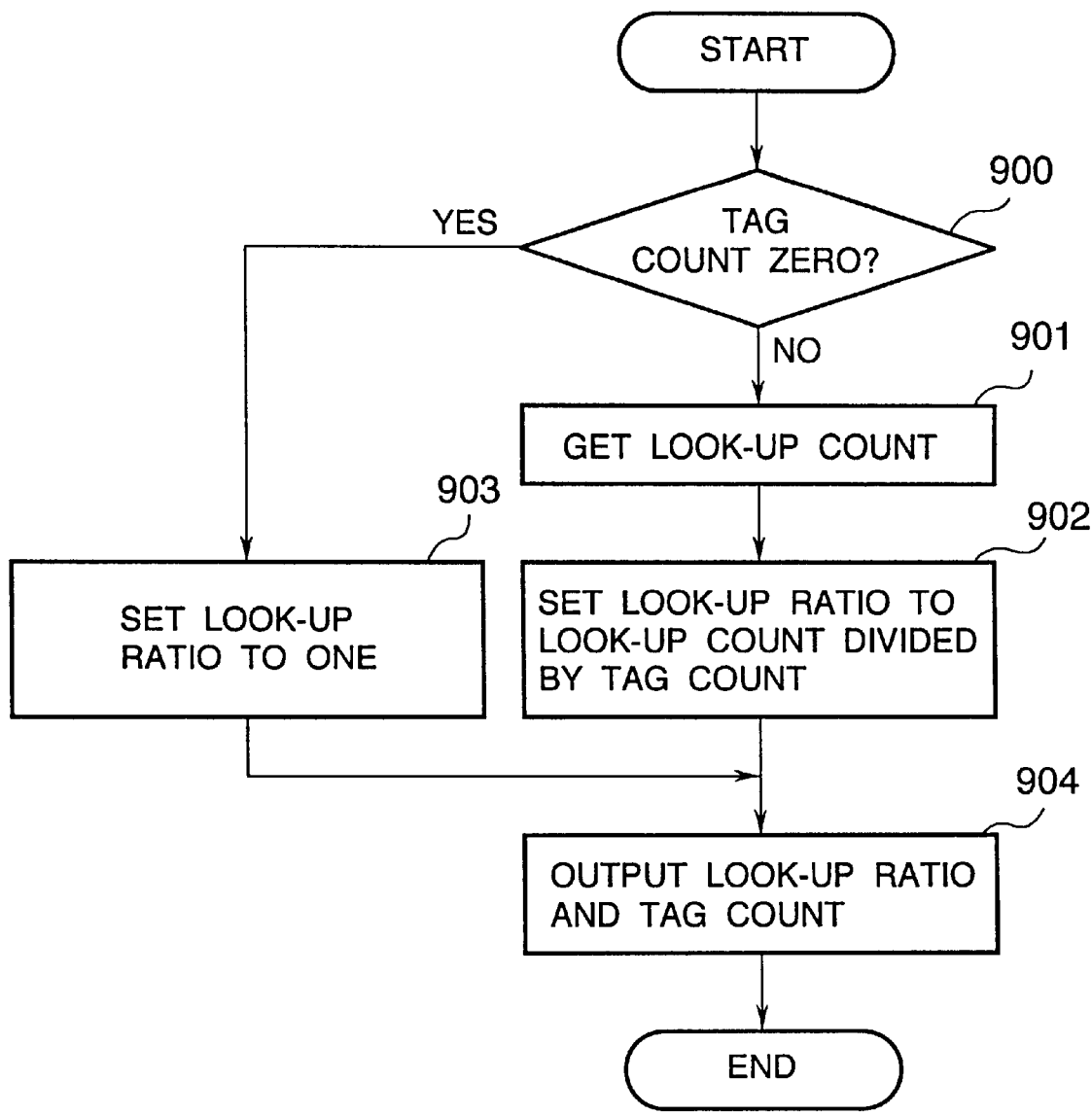
FIG. 66 is a Flowchart illustrating the operation of the ratio calculator In the tenth embodiment.

FIG. 66 illustrates the operation of the ratio calculator 20 when supplied with a word from the dictionary linker 4. The ratio calculator 20 begins by sending this word to the tag tabulator 19, receiving the tag count of the word, and deciding whether the tag count is zero (step 900). If the tag count is not zero, the ratio calculator 20 sends the word to the dictionary access tabulator 18 and receives the look-up count of the word (step 901). The look-up count is then divided by the tag count to obtain the look-up ratio (step 902). The look-up ratio is a number between zero and one, inclusive. For example, if a word has been tagged five times and never looked up, its look-up ratio is zero. If the word has been tagged five times and looked up five times, its look-up ratio is one.

If the word has been looked up more often than tagged, which may occur if a user looks up a word repeatedly in the same place in the same document, the look-up ratio is arbitrarily set to one. The look-up ratio is also set to one if the tag count is zero (step 903). After step 902 or step 903, the ratio calcuator 20 sends both the tag count and the look-up ratio to the dictionary linker 4 (step 904).

The overall operation of the tenth embodiment is similar to the overall operation of the ninth embodiment, but more responsive to the user's look-up behavior. If the user does not look up a word even though the word is tagged repeatedly, presumably because the user already knows the word, the system will stop tagging the word as soon as its tag count passes the first threshold value. If the user looks the word up a few times, then stops looking it up, presumably because he has learned the meaning of the word, the system will again stop tagging the word, as soon as the tag count exceeds the first threshold value and the look-up ratio falls to the second threshold value. If the user keeps looking the word up from time to time, however, the system will continue to tag the word as long as the look-up ratio remains above the second threshold value.

As a variation of the tenth embodiment, the dictionary access tabulator 18 and tag tabulator 19 can be adapted to clear the tables of look-up counts and dictionary access tag counts periodically, thereby re-initializing both tables to an empty state. The reason for doing so is that if the tables are not cleared, then once the dictionary linker 4 decides not to tag a given word, it is likely to continue deciding not to tag that word indefinitely, even if in the meantime the user forgets the meaning of the word and would like to look it up again.

Alternatively, the tenth embodiment can be adapted to clear the look-up and tag counts of individual words that have not been looked up for a certain period of time to zero, or to adjust the tag count to a value that makes the look-up ratio greater than the second threshold value, so that the word can be tagged again when it appears in a document. If the user still does not look the word up, the intervals at which the look-up and tag counts are cleared or adjusted can be gradually lengthened.

The tenth embodiment can also be adapted to display tagged words in different colors according to their look-up ratios, or otherwise alter the display of the words to indicate how frequently they have been looked up, as in the variation of the ninth embodiment described above.

When the ninth embodiment or tenth embodiment is practiced in a system that serves multiple users, the dictionary access tabulator 18 and tag tabulator 19 can be adapted to maintain separate tables for each user, so that the words made available for dictionary look-up by one user will not be affected by the past look-up behavior of other users. This feature can easily be implemented in systems that require a user to present a user name or other identifying information when accessing the system.

Alternatively, a single table of look-up counts and a single table of tag counts can be maintained for all users. In this case, in deciding which words to tag for a given user, the system can make use of information gained from the look-up behavior of other users. For example, the system can quickly learn to omit the tagging of the English articles ("a," "an," and "the") and other common words that everyone knows.

As a further variation, the invented document display system can maintain a fixed list of words that are not to be tagged, in place of the tables of look-up counts and tag counts. More generally, the system can maintain a table of conditions specifying how individual words are to be tagged for dictionary access, and how these words are to be displayed. The system may have various specialized dictionaries, for example, and may be adapted to tag specialized terminology for access to the appropriate specialized dictionary, using different colors to indicate to the user that the tags lead to different dictionaries.

The embodiments described above do not exhaust the ways in which the invention can be practiced. The features of different embodiments can be combined to obtain new embodiments. For example, the second and third embodiments can be combined, and many other combinations are possible.

Needless to say, the invention is riot limited to giving Japanese definitions of English words. Definitions of words in any language can be given in any other language. Definitions of words can also be given in the same language as the words themselves.

The electronic dictionaries employed in the invention are not limited to dictionaries that simply give words arid their definitions. The dictionary entries may also indicate the pronunciation of the word, possibly by means of synthesized speech, in which case the client device 1 should be equipped with facilities for audio output. Dictionary entries may also be illustrated with pictures, in which case the client device 1 should be adapted to display such pictures. Dictionaries that give, for example, short biographies of famous people, may also be used, in addition to dictionaries giving the meanings of words.

When the invention is practiced using a plurality of electronic dictionaries, various means can be used to select a particular dictionary. One known method assigns certain key words to each dictionary, and selects the dictionary having the most key words in the document for which the dictionary mode button was pressed. Another possible method is to select the dictionary on the basis of the contents of tags appearing in the document. Thus a tag indicating an author's name could be used to select a biographical dictionary.

The description of the present invention has referred to words as being defined in an electronic dictionary. The term "defined" should be interpreted broadly enough to include the descriptions given in biographical dictionaries and other such dictionaries.

The ordinary mode button and dictionary mode button do not have to be displayed in the positions shown in the drawings, and do not have to be added by the linked document server 2. For example, the client device 1 can be adapted to display these buttons beside the "Forward" and "Back" and other buttons at the top of the screen. The ordinary mode button and dictionary mode button can be displayed as underlined words, as shown in the drawings, or they can be made to resemble physical buttons, or they can be displayed as icons or any other recognizable control items.

The ordinary mode button can be omitted. The user can return to the ordinary mode by selecting the "Back" button.

As noted earlier, the invention can be practiced in a computer communication network in which there are multiple client devices, multiple linked document servers, and multiple electronic document stores located at different sites. In this case, a linked document server can attach dictionary mode buttons to documents retrieved from other sites, enabling words in a document to be looked up regardless of the location from which the document is obtained.

The invention can also be practiced in a system that is not networked, or a system in which documents are not linked to one another by hypertext references. For example, the invention can be used to enable words in arbitrary text files to be looked up, by adding dictionary look-up commands or pointers to those files. These commands or pointers need not be contained in hypertext tags, but can be embedded in other forms, such as attribute information.

The dictionary entries returned to the client device do not have to give both the accessed word and its definition, as shown in the drawings. The definition alone can be given.

The invention can also be adapted to generate a result file with embedded dictionary access information automatically when a document is first retrieved, so that the user does not have to select the dictionary mode button each time he needs to look up a word. For example, the client device can be adapted to send a tag attachment command to the linked document server together with the file descriptor of each document to be retrieved.

Those skilled in the art will recognized that further modifications are possible within the scope claimed below.

What is claimed is:

1. A method of displaying an electronic document to a user on a device enabling the user to select items such as character strings in the electronic document, comprising:

attaching dictionary access information to character strings in said electronic document;

displaying said electronic document with said dictionary access information attached, said character strings being visibly marked to indicate presence of said dictionary access information without displaying said dictionary access information itself; and displaying an entry from an electronic dictionary, if the user selects a character string to which said dictionary access information is attached, said entry defining said charater string; and removing, from said electronic document, hypertext links to other electronic documents, before said step of attaching dictionary access information.

2. The method of claim 1, wherein said electronic dictionary comprises hypertext link information enabling entries in said electronic dictionary to be individually retrieved by hypertext links from other documents, and said dictionary access information comprises hypertext links pointing to said entries in said electronic dictionary.

3. The method of claim 1, wherein said dictionary access information comprises commands for looking up said character strings in said electronic dictionary, and said displaying an entry from said electronic dictionary is carried out by executing one of said commands.

4. The method of claim 1, further comprising extracting entries from said electronic dictionary; and storing the entries thus extracted in a dictionary entry store separate from said electronic dictionary.

5. The method of claim 4, wherein extracting entries and storing the entries are carried out when said dictionary access information is attached, and said dictionary access information comprises hypertext links pointing to individual entries in said dictionary entry store.

6. The method of claim 4, wherein extracting entries and storing the entries are carried out when the user selects character strings defined by the entries.

7. The method of claim 6, further comprising checking said dictionary entry store when dictionary access information is attached, wherein said dictionary access information comprises hypertext links pointing to entries already present in said dictionary entry store, and dictionary look-up commands for obtaining entries not already present in said dictionary entry store from said electronic dictionary.

8. The method of claim 1, further comprising:

attaching menu information to items in said electronic document having hypertext links to other documents; and displaying a menu, when the user selects one of said items in said electronic document having hypertext links to other documents, said menu allowing the user to select character strings in said item for display of their dictionary entries, as well as allowing the user to select access to a document to which said item is linked by a hypertext link.

9. The method of claim 1, wherein said dictionary access information is attached only to character strings defined in said electronic dictionary.

10. The method of claim 1, further comprising displaying a message stating that the character string selected by the user is not found in the electronic dictionary, if the user selects a character string not defined in said electronic dictionary.

11. The method of claim 10, further comprising keeping first records indicating how frequently different character strings with attached dictionary access information have been selected by the user.

12. The method of claim 11 wherein, in said displaying said electronic document with said dictionary access information attached, said character strings are displayed in different ways responsive to said first records.

13. The method of claim 11, further comprising deciding, according to said first records, whether to attach said dictionary access information to the individual character strings in said electronic dictionary.

14. The method of claim 11, further comprising keeping second records indicating how frequently different character strings have been displayed with attached dictionary access information.

15. The method of claim 14 wherein, in said displaying said electronic document with said dictionary access information attached, said character strings are displayed in different ways responsive to said first records and said second records.

16. The method of claim 14, further comprising deciding, according to said first records and said second records, whether to attach said dictionary access information to the individual character strings in said electronic dictionary.

17. The method of claim 16, wherein said first records comprise first counts indicating numbers of times respective character strings have been looked up, said second records comprise second counts indicating numbers of times said dictionary access information has been attached to respective character strings, and said deciding comprises further:

calculating a ratio of one of said first records to one of said second counts;

comparing said ratio with a first threshold; and comparing said one of said second counts with a second threshold.

18. The method of claim 17, wherein said dictionary access information is attached when said ratio exceeds said first threshold, and said dictionary access information is also attached when said one of said second counts does not exceed said second threshold.

19. The method of claim 1, further comprising:

adding to said electronic document a control item enabling the user to select a dictionary-access mode; and displaying said electronic document with said control item, wherein said attaching of dictionary access information and displaying said electronic document with said dictionary access information attached are carried out when the user selects said dictionary-access mode.

20. The method of claim 19, further comprising:

storing said electronic document with said dictionary access information attached in a dictionary-access-ready document store; and retrieving said electronic document with said dictionary access information attached from said dictionary-access-ready document store if said dictionary-access mode is selected again.

21. A document display system having a client device for displaying electronic documents to a user, receiving commands from the user, and enabling the user to select character strings in said electronic document, comprising:

an electronic dictionary coupled to said client device, having a plurality of entries stored on an electronically accessible medium;

a dictionary linker coupled to said client device, operable to attach dictionary access information to character strings in an electronic document displayed by said client device, responsive to a command received by said client device from the user, said dictionary access information causing said client device to retrieve and display an entry from said electronic dictionary when the user selects a character string to which said dictionary access information is attached; and a link remover coupled to said dictionary linker, operable to remove hypertext links from electronic documents before said dictionary linker attaches said dictionary access information to character strings in said electronic documents.

22. The system of claim 21, further comprising a dictionary-access-ready document store, coupled to said dictionary linker, operable electronic documents together with dictionary access information attached thereto by said dictionary linker.

23. The system of claim 21, also comprising a linked document server coupled between said client device and said dictionary linker, operable to supply said electronic documents to said client device, activate said dictionary linker responsive to said command, receive said dictionary access information from said client device when the user selects a character string to which said dictionary access information is attached, obtain said entry, and supply said entry to said client device.

24. The system of claim 23, wherein said electronic dictionary has hypertext link information enabling said entries to be retrieved from hypertext documents, and said dictionary access information comprises hypertext links pointing to the entries in said electronic dictionary.

25. The system of claim 23, also comprising a dictionary entry extractor coupled to said electronic dictionary, operable to extract entries from said electronic dictionary.

26. The system of claim 25, wherein said dictionary access information comprises commands causing said linked document server to activate said dictionary entry extractor.

27. The system of claim 25, also comprising a dictionary entry store coupled to said dictionary entry extractor, for storing the entries extracted by said dictionary entry extractor from said electronic dictionary.

28. The system of claim 27 wherein, when the user selects a character string to which dictionary access information is attached, if a corresponding entry is already stored in said dictionary entry store, said dictionary entry extractor is operable to obtain said corresponding entry from said dictionary entry store, and if a corresponding entry is not already stored in said dictionary entry store, said dictionary entry extractor is operable to extract a corresponding entry from said electronic dictionary, supply said entry to said client device, and store said corresponding entry in said dictionary entry store.

29. The system of claim 27 wherein, when said dictionary linker is operable to attach dictionary access information to a character string, said dictionary entry extractor is operable to extract a corresponding entry from said electronic dictionary and store said entry in said dictionary entry store, unless said entry is already stored in said dictionary entry store, and wherein said dictionary access information comprises a hypertext link to the corresponding entry store din said dictionary entry store.

30. The system of claim 27 wherein, when said dictionary linker attaches dictionary access information to a character string, said dictionary linker is operable to check said dictionary entry store, attach a hypertext link, pointing to a corresponding entry in said dictionary entry store, as said dictionary access information if said corresponding entry is already stored in said dictionary entry store, and attach a command for activating said dictionary entry extractor, as said dictionary access information, if said corresponding entry is not already stored in said dictionary entry store.

31. The system of claim 21, further comprising a menu generator coupled to said dictionary linker, wherein:

when said dictionary linker is attaching said dictionary access information, if said dictionary linker encounters an item to which a hypertext link is already attached, said dictionary linker is operable to activate said menu generator, and said menu generator is operable to generate menu information for displaying a menu allowing the user to select retrieval and display of an electronic document indicated by said hypertext link and also allowing the user to select dictionary access for character strings in said item;

said dictionary linker is operable to attach said menu information to said item; and said client device is operable to display said menu when the user selects said item.

32. The system of claim 21, wherein said dictionary linker is operable to attach said dictionary access information only to character strings defined in said electronic dictionary.

33. The system of claim 21, wherein said client device is operable to display a message indicating that no dictionary entry is present, if the user selects a character string not defined in said electronic dictionary.

34. The system of claim 21, further comprising a dictionary access tabulator coupled to said dictionary linker, for keeping records about past selections, by the user, of character strings to which said dictionary access information was attached.

35. The system of claim 34, wherein said dictionary linker uses the records kept by said dictionary access tabulator in deciding whether to attach said dictionary access information to said character strings.

36. The system of claim 34, wherein said dictionary linker, in attaching said dictionary access information, uses the records kept by said dictionary access tabulator by attaching attribute information causing said client device to display said character strings in different ways indicating to the user how frequently said character strings have been previously selected.

37. The system of claim 34, wherein the records kept by said dictionary access tabulator comprises first counts indicating how frequently said character strings are selected by the user.

38. The system of claim 37, further comprising a tag tabulator coupled to said dictionary linker, operable to keep second counts indicating how frequently said dictionary access information has been attached to said character strings.

39. The system of claim 38, wherein said dictionary linker uses said first counts and said second counts in deciding whether to attach said dictionary access information to said character strings.

40. The system of claim 39, further comprising:

a ratio calculator coupled to said dictionary linker, operable to calculate ratios of said first counts to said second counts; wherein said dictionary linker uses said ratios and said second counts in deciding whether to attach said dictionary access information to said character strings.

41. The system of claim 40, wherein said dictionary linker is operable to compare said ratios with a first threshold, compare said second counts with a second threshold, and attach said dictionary access information to character strings the rations of which exceed said first threshold, and to character strings the second counts of which do not exceed said second threshold.

42. The system of claim 21 wherein, when said dictionary linker attaches said dictionary access information to character strings in said electronic document, said client device is operable to display said electronic document with the character strings to which said dictionary access information is attached visibly marked to indicate that said dictionary access information is present, without displaying said dictionary access information itself.

* * * * *